US012525346B2

(12) United States Patent
Toleti et al.

(10) Patent No.: US 12,525,346 B2
(45) Date of Patent: Jan. 13, 2026

(54) VIRTUAL CARE SYSTEMS AND METHODS

(71) Applicant: AndorHealth, LLC, Orlando, FL (US)

(72) Inventors: Raj Toleti, Orlando, FL (US); Balavignesh Thirumalainambi, Ridgewood, NJ (US); Chandini Toleti, Windermere, FL (US); Ela Patel, Winter Park, FL (US); Sahitya Gande, Monroe, NJ (US); Sonia Shah, Orlando, FL (US); Jack Gilmore, Windermere, FL (US); Chanakya Toleti, Windermere, FL (US)

(73) Assignee: ANDORHEALTH, LLC, Orlando, FL (US)

( * ) Notice: Subject to any disclaimer, the term of this patent is extended or adjusted under 35 U.S.C. 154(b) by 327 days.

(21) Appl. No.: 17/882,425

(22) Filed: Aug. 5, 2022

(65) Prior Publication Data
US 2023/0045394 A1  Feb. 9, 2023

Related U.S. Application Data

(60) Provisional application No. 63/231,538, filed on Aug. 10, 2021, provisional application No. 63/230,489, filed on Aug. 6, 2021.

(51) Int. Cl.
*G16H 40/67* (2018.01)
*H04W 64/00* (2009.01)

(52) U.S. Cl.
CPC .......... *G16H 40/67* (2018.01); *H04W 64/006* (2013.01)

(58) Field of Classification Search
None
See application file for complete search history.

(56) References Cited

U.S. PATENT DOCUMENTS

| | | | | |
|---|---|---|---|---|
| 10,892,060 B1* | 1/2021 | Silverstein | ......... | G06Q 30/0281 |
| 2012/0290311 A1* | 11/2012 | Tara | ........................ | G16H 40/20 |
| | | | | 705/2 |
| 2014/0358574 A1* | 12/2014 | Tara | ........................ | G06Q 10/06 |
| | | | | 705/2 |
| 2015/0213217 A1* | 7/2015 | Amarasingham | ...... | G16H 50/30 |
| | | | | 705/2 |
| 2015/0281927 A1* | 10/2015 | Fiedler | .................... | H04W 4/90 |
| | | | | 455/404.1 |

(Continued)

FOREIGN PATENT DOCUMENTS

KR       2019-0024572 A  *  3/2019  ............. G16H 40/67

OTHER PUBLICATIONS

Shepherd et al. Medical Portals: Web-Based Access to Medical Information, Proceedings of the 33rd Hawaii International Conference on System Sciences—2000, 0-7695-0493-0/00 $10.00 (c) 2000 IEEE.*

*Primary Examiner* — David J Stoltenberg
(74) *Attorney, Agent, or Firm* — Kelly G. Swartz; Widerman Malek, PL

(57) ABSTRACT

A virtual care system can include a location module configured to receive location information associated with a device from the device, and a graphical user interface (GUI) module configured to generate a medical provider user interface accessible via the device. The medical provider user interface can be contextually generated based on the location information and includes interface characteristics associated with the location information.

12 Claims, 63 Drawing Sheets

(56) References Cited

U.S. PATENT DOCUMENTS

| | | | |
|---|---|---|---|
| 2016/0210442 A1* | 7/2016 | Ethington | G16H 10/20 |
| 2017/0055122 A1* | 2/2017 | Barron | H04W 64/00 |
| 2017/0148306 A1* | 5/2017 | Wolfson | H04W 4/02 |
| 2017/0249823 A1* | 8/2017 | Espinoza | G08B 21/0446 |
| 2017/0337339 A1* | 11/2017 | Cronin | G16H 40/63 |
| 2018/0113987 A1* | 4/2018 | Zhu | G16H 40/63 |
| 2018/0227700 A1* | 8/2018 | Baca | H04W 4/029 |
| 2019/0043613 A1* | 2/2019 | Gallagher | G16H 10/60 |
| 2019/0355481 A1* | 11/2019 | Lamb | G06N 20/00 |
| 2020/0126677 A1* | 4/2020 | Meglic | G16H 80/00 |
| 2020/0185100 A1* | 6/2020 | Francois | G06Q 10/0631 |
| 2020/0265932 A1* | 8/2020 | Ginsburg | G06F 3/0482 |
| 2021/0057111 A1* | 2/2021 | Barkol | H04L 51/046 |
| 2021/0183502 A1* | 6/2021 | Silverstein | G16H 40/20 |
| 2021/0233655 A1* | 7/2021 | Silverstein | G16H 40/20 |
| 2021/0304881 A1* | 9/2021 | White | G16H 40/20 |
| 2021/0319914 A1* | 10/2021 | Roh | G16H 40/67 |
| 2021/0407682 A1* | 12/2021 | Crossen | G16H 20/10 |
| 2022/0284994 A1* | 9/2022 | Ellis | G16H 10/20 |

\* cited by examiner

| ↙ Registration Dashboard | | | | | | | | | | | |
|---|---|---|---|---|---|---|---|---|---|---|---|
| ‹ Notifications | | | | | | | | | | | |
| Message Delivery Failed | ○ | | | | | | | | | | |
| | | VISIT TYPE | ▸ PATIENT NAME | WAIT TIMES | DOB | ▸ ACCT. NUMBER | ▸ DEPARTMENT | ▸ PROVIDER | ▸ APPT. TYPE | ▸ TIME | E & B | ▸ INSURANCE CO-PAY | BALANCE | iPAD AUTH # |
| Collection Summary | | | | | | | | | | | |
| | | ⊗ | John Doe | | 05/05/1985 | C94FB03-3C0R- | | | | 08:15 AM | ☐ | $0.00 | $0.00 | |
| • Card | | ⊗ | Jane Smith | | 03/03/2004 | 5p34d4b-dc45- | | | | 10:00 AM | ☐ | $0.00 | $0.00 | |
| • Cash | | ⊗ | Test1 | | 02/02/2004 | 0474b259-3027-4 | | | | 10:30 AM | ☐ | $0.00 | $0.00 | |
| • Check | | | | | | | | | | | |
| Reports | | | | | | | | | | | |
| Daily Reconciliation Report | ⊖ | | | | | | | | | | |
| Appt Requests | | | | | | | | | | | |
| Total Appointments | 5 | | | | | | | | | | |
| Appointments assigned to location | 5 | | | | | | | | | | |
| Appointments assigned to you | 0 | | | | | | | | | | |

Fig. 4A

Admission Discharge

| Name | DOB | Member # | Labs Available | PCP Notified | Follow Up Scheduled | Admitted | Discharged | Status |
|---|---|---|---|---|---|---|---|---|
| Marilin Hutchens | 11/21/1948 | +1(954) 395-5501 | EKG | Dr. Jacob Smith | Action Required | 06/19/2021 10:52 AM | | Admitted |
| Debra Smith | 05/13/1961 | +1(727) 943-9429 | EKG | Dr. Bryan Sanders | Action Required | 06/22/2021 3:04:00 PM | | Admitted |
| Jen Smith | 11/21/1948 | +1(954) 395-5506 | EKG | N/A | N/A | | | Registered |

Showing [10 ▾] records of 300

Filter

Add filter

Status
Basic Filtering
☑ Select all
☐ Admitted
☐ Registered

Admitted
All

Discharged
All

| Virtual Rounding | | | | | | | | | | |
|---|---|---|---|---|---|---|---|---|---|---|
| Patient Name | Age | Diagnosis | Hospital | Department | Room | LOS | Attending Provider | RN | | Status |
| Jon Smith | 34 | Hypoxia | Bot General | ED | 1008 | 1 day | Philip Corvo | Sally Evans | | IN PROGRESS |
| Gary Jones | 54 | Stroke | Bot General | ED | 2118 | 1 day | Christian Pettker | Pam Brown | | IN PROGRESS |
| Marlin Hutchens | 56 | CHF | Bot General | ED | 1728 | 1 day | Joshua Briscoe | Sally Evans | | JOIN |
| Brooke Hall | 37 | Hypoxia | Bot West | ED | 1719 | 2 days | Jeffrey Topal | Juan Lopez | | JOIN |
| Stan Baii | 43 | Stroke | Bot East | ED | 1001 | 1 day | Steven Fleischman | Pam Brown | | JOIN |
| Kate Win | 26 | Pneumonia | Bot General | ED | 4410 | 2 days | Bayode Afolalu | Polly Weibley | | JOIN |
| Joe Nowl | 89 | Hypoxia | Bot General | ED | 2316 | 1 day | Sheikh Hoq | Andrea Echeverry | | JOIN |
| Bill Guys | 32 | Stroke | Bot General | ED | 3310 | 3 days | Sadia Gazi | Jose Rivera | | JOIN |
| Angie Rar | 31 | Pneumonia | Bot West | ED | 1004 | 2 days | Michael Alperovich | Chang Lu | | JOIN |
| Dan Fall | 68 | Stroke | Bot West | ED | 1034 | | Patrick Benton | Rebecca Nolan | | JOIN |

Showing 10 records of 300

Fig. 7

Welcome, Marlin Hutchens!

Here are a couple things you can do in this room.

- You can call for a nurse
- Add family members to your Virtual visits
- For any general questions just ask your AI Assistant

Marlin Hutchens

Last check in
8/09/2021 3:18 PM

[ Request Call ]   DEVICE ID 283IIN

○ Device Active

Call Nurse

[ Call Nurse Station ]

Invite Family Member

[ Invite Family Member ]

Upcoming Events

| Event | Name | Date | Time |
|---|---|---|---|
| Video Consult | Joshua Briscoe, MD | 08/10/2021 | 3:00 PM |

---

Bot General Hospital Patient Discharge Form

Hello, before meeting with your physician please answer the preliminary questions below.

*Do you have any questions related to your care?
○ Yes  ● No

*Questions about:
[ My Condition ▸ ]

*Are you experiencing any new or worsening symptoms today?
○ Yes  ● No

*Do you feel well enough to be discharged?
● Yes  ○ No

*indicates a required field.

[ Continue ]

📎 Type your message                    ➤

CHF Remote Patient Monitoring

Q Search                                                                                                                                                  × ☰

| NAME | DATE OF BIRTH | GENDER | CELL PHONE | PCP NAME | PROGRAM DAY | WEIGHT | BP | REPORTED CONCERNS | STATUS |
|---|---|---|---|---|---|---|---|---|---|
| Martin Hutchens | 02/07/1965 | MALE | (407) 555-1234 | Joshua Briscoe, MD | 12 | 184 | 170/101 | 2 | HIGH PRIORITY |
| Douglas Paine | 01/01/1962 | MALE | (331) 555-4321 | Joshua Briscoe, MD | 3 | 194 | 150/82 | 2 | HIGH PRIORITY |
| Thomas Walker | 01/01/1975 | MALE | (404) 543-1250 | Joshua Briscoe, MD | 12 | 172 | 161/96 | NONE | LOW PRIORITY |
| Anna Hernandez | 01/01/1966 | FEMALE | (407) 987-6543 | Keegan Mullins, MD | 25 | 189 | 163/90 | NONE | LOW PRIORITY |
| James McGill | 01/01/1951 | MALE | (407) 202-3457 | Keegan Mullins, MD | 29 | 165 | 152/74 | N/A | COMPLETE |
| Claudia Baker | 01/01/1944 | FEMALE | (555) 345-6789 | Joshua Briscoe, MD | 18 | 134 | 154/86 | N/A | COMPLETE |

Fig. 11

Chat | Recent Contacts | Attending Physician ▼

▸ Recent
ThinkBot
Sent a card  7/8

ThinkBot  Chat  ThinkBot  About

ThinkBot  11:03 AM

Please review new lab information for Mr. Hutchens. Information about latest labs, and more, click the tabs below or ask me more.

See Med List | Get EKG | Get Labs

Electrocardiogram Result
Patient Name: MARLIN HUTCHENS
Result Date: 06/23/2021

| Test | Prior | Recent |
|---|---|---|
| Sodium: | 139 mmol/L | 139 mmol/L |
| Potassium: | 4.1 mmol/L | 4.6 mmol/L |
| Chloride: | 104 mmol/L | 103 mmol/L |
| CO2: | 26 mmol/dL | 28 mmol/L |
| BUN: | 20 mg/dL | 23 mg/dL |
| Creatinine: | 1.32 mg/dL | 1.18 mg/dL |
| BUN/Creatinine: | 16.9 | 17.4 |
| Glucose: | 92 mg/dL | 96 mg/dL |
| Anion Gap: | 9 mmol/L | 6 mmol/L |
| Calcium: | 8.6 mg/dL | 8.9 mg/dL |

Forward | Reviewed

Type a new message

| Patient Information | |
|---|---|
| Account # | BOT8210040 |
| MRN | BOT669243999 |
| Date of Birth | 04/19/1965 |
| Cell Phone | +16692439999 |
| Admission Data | 08/10/2021 |
| Estimated Discharge Date | 08/11/2021 |
| Patient Svc | OR1_O5SAMD |
| PCP Physician Name | Joshua Briscoe, MD |
| Questions | |

HUTCHENS, MARLIN

HIGH PRIORITY
LOW PRIORITY
NON-COMPLIANT
GRADUATE FROM PROGRAM

Fig. 20

Create and configure your user roles for your organization.

User roles can be tied to either a site or even further, a department. Users can be added to these roles, and certain settings of the role can be modified such as the role capacity or if the role needs to be always occupied. Roles can be assigned to groups and can further configure messages Roles

| Sites | Departments | Roles – SLA |
|---|---|---|
| Q Search  × | Q Search  × | Q Search  Add |
| SLA ⊘ | Critical Care ○ | |
| Anderson ○ | Emergency ○ | |
| Bethlehem ○ | General Surgery ○ | |
| Easton ○ | Internal Medicine ○ | |
| Geisinger ○ | Neurology ○ | |
| Lehighton ○ | Pediatrics ○ | |
| Miners ○ | Surgical Critical Care ○ | |

Roles
Teams
Messaging

[Wireframe mockup: "Teams" configuration screen]

- Roles
- Teams
- Messaging

Teams

Create and configure your teams.
Based off of a combination of users and roles, Teams can be added as distribution groups for messages. These Teams can be toggled on/off and be enabled within Teams through configuration.

Save

New Team

Name: SLA Critical Care
Description: Lorem ipsum dolor sit amet, consectetuer adipiscing elit, sed diam nonummy nibh euismod
Teams settings:
- Enable Team
- Enable Team within Teams Team
- Team Members
  - SITES
  - SLA
  - Departments
    - Critical Care Search
- Site
- Department
- Role
- User Search
- Critical Care
- Emergency
- General Surgery
- Internal Medicine
- Neurology
- Pediatrics
- Surgical Critical Care

VIRTUAL CARE SYSTEMS AND METHODS

CROSS-REFERENCE TO RELATED APPLICATIONS

This application claims priority to and the benefit of U.S. Provisional Application Nos. 63/230,489, filed Aug. 6, 2021, and 63/231,538, filed Aug. 10, 2021, the entire contents of which are herein incorporated by reference in their entirety.

FIELD

This disclosure relates to virtual care systems and methods.

BACKGROUND

As the healthcare industry shifts towards an increasingly virtual environment, hospitals must rely on fragmented technologies to accomplish various capabilities corresponding to and communicate with clinicians within the five pillars of virtual healthcare. In the current workflow, physicians are required to utilize different, outdated, and disconnected platforms to determine which patients need treatment, communicate with patients and other clinicians, and monitor patient information. Clinicians must manually submit patient information and curate their own daily patient schedule. When patients are admitted at a hospital or schedules a visit with their clinicians, the clinicians have a limited amount of time to analyze patient information prior to their visits for the day due to the disconnected workflows and systems in place. Moreover, clinicians' patient listings are not coordinated specific to the type of care provided or location.

Consequently, clinicians lack oversight over their complex schedule, which makes the process of providing care a challenge. Time lost switching between platforms and interacting with a variety of services can inconvenience providers and increase overhead costs for health systems and hospitals alike. This results in a reduction in the amount of time a clinician spends with the patient.

Furthermore, in traditional systems, care team members must navigate multiple applications and databases to locate, contact, or collaborate with other health care providers. The tedious nature of the current system leads to significant loss of patient-provider interaction time and provider-provider collaboration. Such efforts can also create confusion and miscommunication between the necessary care providers and can cause problems when communicating information with the patient. When patients arrive with a situation where help from a specific physician is required, they must wait for a care provider who is ready and available to help. Patients waiting for a care provider can result in wastage of time and miscommunication. Moreover, most systems do not allow immediate information updates to be sent to all necessary members for the patient's care (family, translators, physicians, etc.). This allows for miscommunication and misdirection which can be detrimental to the patient's wellbeing and can cause potential harm.

The current fragmented virtual health system creates 20% or more patient abandonment on average, while addressing fewer care gaps, increasing physician burnout, and increasing frequency of medical errors due to lack of real time clinical collaboration. In summary, the current systems increase costs, reduce quality of care, and prevent adoption of virtual health technologies.

Such conventional methods and systems have generally been considered satisfactory for their intended purpose. However, there is still a need in the art for improved virtual care systems and methods. The present disclosure provides a solution for this need.

SUMMARY

In accordance with at least one aspect of this disclosure, a virtual care system can include a location module configured to receive location information associated with a device from the device, and a graphical user interface (GUI) module configured to generate a medical provider user interface accessible via the device. The medical provider user interface can be contextually generated based on the location information and includes interface characteristics associated with the location information.

The system can include a plurality of geofences in predefined locations. The location module can be configured to locate the location information to a respective geofence of the plurality of geofences. The plurality of geofences can include a hospital geofence defined around at least a portion of a hospital, and a remote geofence defined outside of the hospital geofence. In certain embodiments, the plurality of geofences can include an office geofence defined around a medical office.

The location information can include one or more of a GPS location, a preset physical device location associated with a MAC address, or a preset network location based on an IP address. Any other suitable a priori information or dynamic information to determine a location of physical device is contemplated herein.

The GUI module can be configured such that when the device connects to the GUI module and is located within the hospital geofence, the medical provider user interface is automatically generated to have a hospital context dashboard having a patient rounding list and/or inpatient data associated with hospital inpatients at the hospital. The GUI module can be configured such that when the device connects to the GUI module and is located within the remote geofence or office geofence, the medical provider user interface is automatically generated to have a remote context dashboard having a remote patient list and/or remote monitoring data associated with remote patients that are not at the hospital. In certain embodiments, the GUI module can be configured to allow manual switching and/or navigation by the user between the hospital context dashboard and the remote context dashboard.

The GUI module can be configured to generate the medical provider user interface based on one or more of a user role, a user shift, and/or patient attributes in addition to the location information. For example, a certain type of physician or nurse (e.g., neuro) at the end of their shift may see a different list or interface than a similar type of physician earlier in the shift, and/or from a different type of physician or nurse (e.g., cardiac).

The system can further include a patient data module configured to receive patient data from one or more databases to provide patient data to the hospital context dashboard and the remote patient dashboard. The one or more databases can include an electronic medical records (EMR) system.

The GUI module can be configured to populate and dynamically update the hospital context dashboard and/or the remote context dashboard with the patient data such that displayed patient data updates when a patient is admitted, overseen, transferred, discharged, or moved to remote monitoring. The GUI module can be configured to provide priority based lists to a user based on the user role.

The system can include a care team module configured to automatically and dynamically build a custom care team for each patient, each member of the care team selected from a plurality of users in a user database, based on one or more of a location of each user, shift data of each user, role data of each user, the skill attributes of each user, a time of day and/or date, and a patient attributes. In certain embodiments, the care team module can be configured to build a custom care team for each patient according to patient specific symptoms.

In certain embodiments, the system can include a patient information module configured to generate a patient portal for receiving patient and/or symptom information. The patient information module can be configured to create and send a link to the patient portal to a patient mobile device.

In certain embodiments, the system can include a role module configured to receive schedule information for each user. The role module can be configured to output role data and shift data to the care team module based on the schedule information.

In certain embodiments, the system can include a messaging module configured to send messages to each user based on the user role data. The messaging module can be configured to receive at least one of an escalation response, forwarding response, or a delegation response from the user, and to forward the message to another user based on the role data.

In accordance with at least one aspect of this disclosure, a non-transitory computer readable medium can include computer executable instructions for performing a method. The method can include tracking a patient electronic medical record (EMR) for updates using a virtual care system, receiving an admission record from the EMR indicative of the patient being admitted to a hospital, and sending an admission notification to a primary care provider of a patient upon receiving the admission notification. The admission notification can include a hyperlink configured to redirect the primary care physician device to a website having admission details. The method can also include forming a care team by automatically selecting a plurality of care team members from a user database based on roles of each user, and providing a virtual rounding list to a device of a care team member. The virtual rounding list includes the patient. Each patient on the list can be selectable to provide information on a selected patient and/or a videoconferencing link to connect the care team member to a patient device. The method can include receiving a discharge record from the EMR, and sending a discharge notification to the primary care provider. The method can include remotely monitoring the patient after discharge via one or more remote monitoring devices and/or patient feedback.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 4A and 4B show a screenshot of an embodiment of a virtual assistant, wherein the virtual assistant pulls data from heath record databases for the clinician, wherein FIG. 4A shows a registration window and FIG. 4B shows a patient admission status window showing registration, admission, and discharge status (e.g., an urgent care patient list);

FIGS. 5A, 5B, 5C, and 5D schematically show community collaboration with a primary care provider (PCP) or other physician or care team member (e.g., as defined by roles disclosed below), wherein FIG. 5A schematically illustrates an admission notification text message sent to the PCP with a hyperlink to access a portal having patient admission data, wherein FIG. 5B shows is an embodiment of a screenshot of a admission information interface that the user is provided with when clicking the admission notification link, wherein FIG. 5C schematically illustrates a lab notification text message sent with a hyperlink to access a portal having lab data for the patient, wherein FIG. 5D schematically shows an embodiment of a push notification (e.g., for a teleconferencing app such as Microsoft® Teams) instead of or in addition to the text message of FIG. 5C;

Figure 6C:
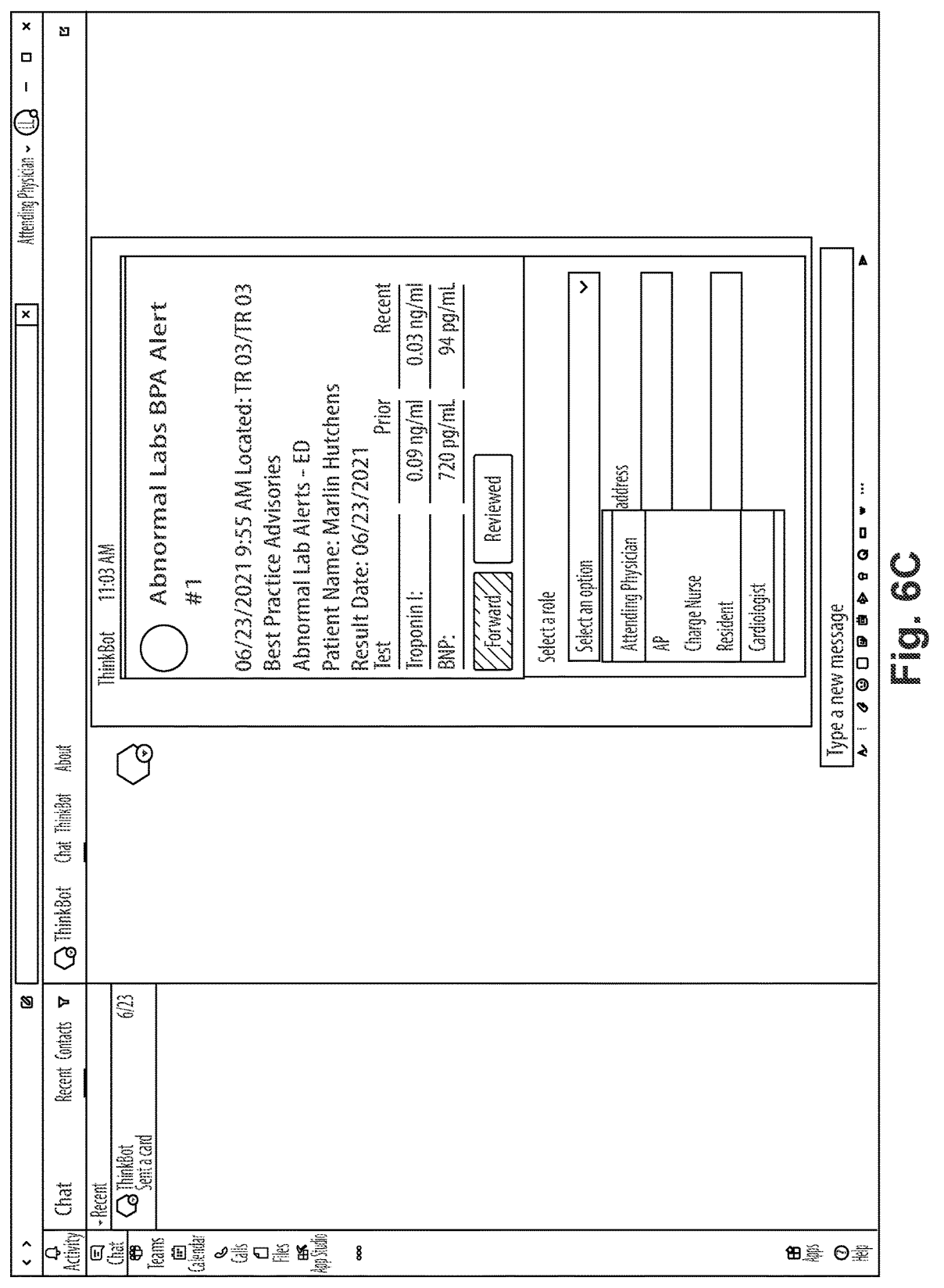

FIGS. 6A, 6B, 6C, and 6D show embodiments of Secure Clinical Communication, wherein the system allows clinicians to exchange confidential information regarding patient status, wherein individual results can be sent to individual team members to review (e.g., as shown in FIGS. 6A and 6B), wherein a user can review or forward to another care team member to handle review (e.g., shown in FIGS. 6C and 6D);

FIG. 7 is a screenshot showing an embodiment of a virtual rounding platform, wherein the system shows a virtual rounding patient list (e.g., for inpatients);

FIG. 8 is a screenshot showing an embodiment of a discharge questionnaire such that the virtual assistant evaluates patient status for discharge;

FIGS. 9A and 9B illustrate patient monitoring functionality, wherein FIG. 9A is a screenshot of an embodiment of a patient status page such that the system can allow clinicians to view real-time status of each patient from the patient list (e.g., of FIG. 7), wherein FIG. 9B shows a clinician connecting with the patient via a teleconference app (e.g., by clicking on a "join" button on the patient status page);

FIG. 11 shows a screen shot of an embodiment of a RPM patient list;

FIGS. 14A, 14B, and 14C schematically show patient self-schedule, wherein FIG. 14 shows the follow up message sent by the user (e.g., the doctor) with a hyperlink to the system scheduler, wherein FIG. 14B shows an embodiment of a screenshot of an automatic scheduler provided by the system (e.g., when the patient clicks the hyperlink from the message in FIG. 14A) such that the system can allow patients to schedule their own visits with their physician and/or care team, and wherein FIG. 14C shows a confirmation page.

FIG. 16 shows a virtual assistant secure communication such that the virtual assistant pulls patient data for the care team to discuss and collaborate in a secure messaging platform provided by the system, for example;

FIG. 17 shows an embodiment of a screenshot of a patient summary page such that the system can display summary information after patient has completed the entire treatment through the system, and the patient status can be edited from high or low priority to graduate of the program to remove the patient from RPM;

FIGS. 18A, 18B, 18C, and 18D schematically depict an embodiment of a workflow associated with and enabled by the system of FIG. 1, wherein FIG. 18A shows the workflow in the emergency department setting, wherein FIG. 18B shows the workflow in the inpatient setting, wherein FIG. 18C shows the workflow in the patient's home setting, and wherein FIG. 18D shows the workflow in an ambulatory setting;

FIG. 20 shows the embodiment of a role interface of FIG. 19, showing a pane having selectable options for departments within the site such that when creating a role, the user can select a department in the organization site;

FIG. 22 shows the embodiment of the role interface of FIG. 19, showing a popup pane for creating a new role and adding users to a role;

FIG. 23 shows the embodiment of FIG. 19, showing users added to the new role;

FIGS. 25A and 25B is a screenshot of an embodiment of a team interface wherein a user can create teams using roles and users, wherein FIG. 25A shows choosing sites and FIG. 25B shows choosing departments for a new team such that when creating a new team, the user can select the organization site and the department within it;

FIGS. 26A, 26B, and 26C show a screenshot of the embodiment of FIGS. 25A and 25B, showing choosing from existing roles in FIG. 26A such that when creating the new team, the user can choose from existing roles created and add them to the team, wherein FIG. 26B shows choosing from existing users associated with those roles (e.g., all users), and FIG. 26C shows the created team;

FIGS. 28A, 28B, 28C, and 28D show the embodiment of FIG. 27, showing choosing a trigger type for the selected message type;

FIG. 29 shows the embodiment of FIG. 27 showing choosing the outreach type and message content;

FIGS. 30A, 30B, 30C, and 30D show the embodiment of FIG. 27, showing the outreach assignment and escalation pathway, wherein FIG. 30A shows selection of the site, wherein FIG. 30B shows selection of a team to receive the message type, wherein FIG. 30C shows selection of certain roles for message delivery, wherein FIG. 30D shows selection of hierarchy, frequency, and time of each message;

FIGS. 31A and 31B illustrate an embodiment of an escalation interface associated with the message, shown having a site selection and role selection menu for a user to escalate to;

FIGS. 32A and 32B illustrate an embodiment of an delegation interface associated with the message, shown having a site selection and role selection menu for a user to delegate to; and FIG. 33A-33H schematically depict an embodiment of a workflow associated with the and enabled by the system of FIG. 1, wherein FIG. 33A shows a creation of enterprise taxonomy portion, wherein FIG. 33B shows a create and configure roles portion, wherein FIG. 33C shows a create and configure teams portion, wherein FIG. 33D shows a virtual rounding portion, wherein FIG. 33E shows a remote patient monitoring portion, wherein FIG. 33F shows a virtual visits portion, wherein FIG. 33G shows a community collaboration portion, and wherein FIG. 33H shows a secure clinical messaging portion.

DETAILED DESCRIPTION

Figure 1:
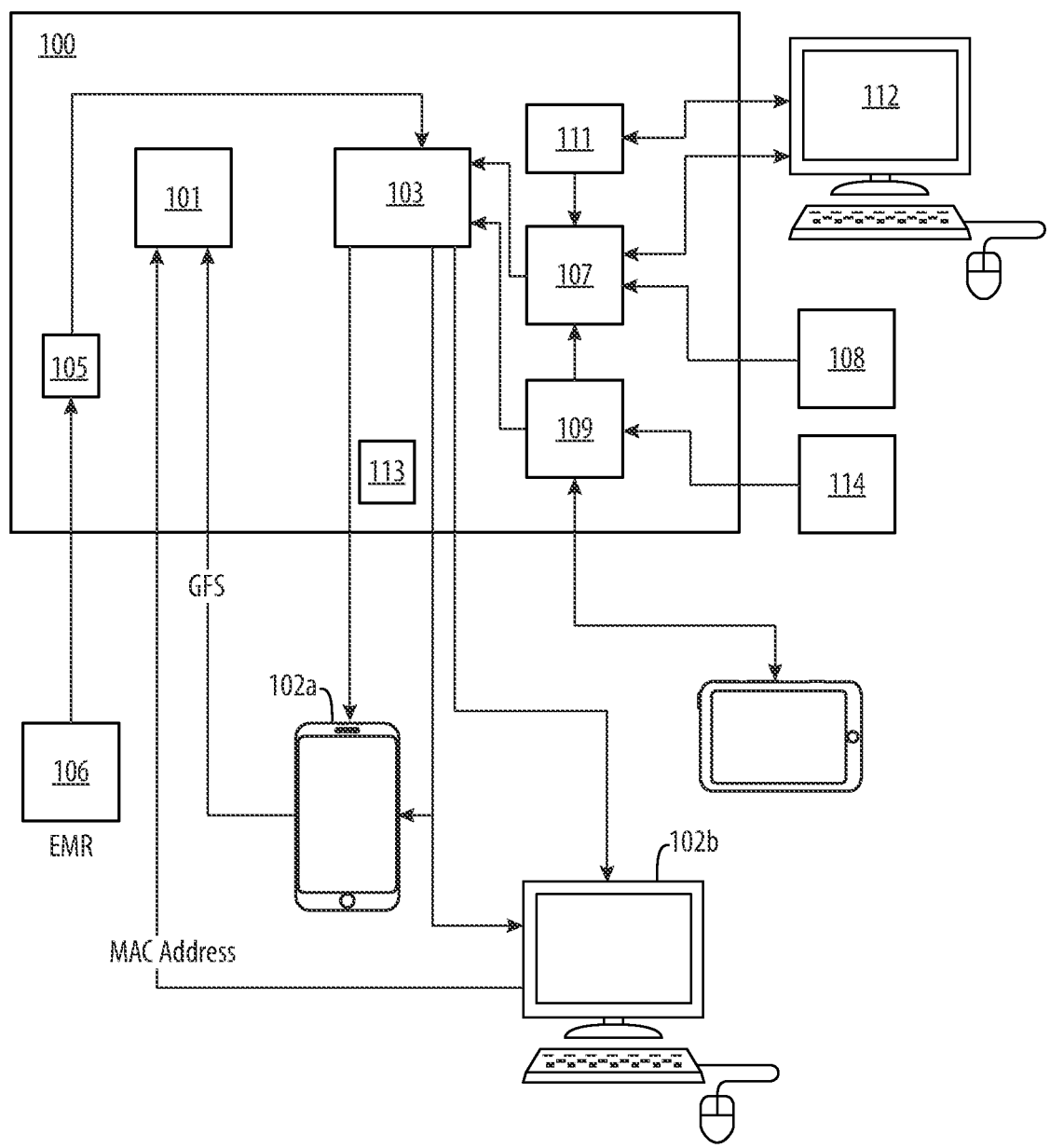
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-33H.

In accordance with at least one aspect of this disclosure, referring to FIG. 1, a virtual care system 100 can include a location module 101 configured to receive location information associated with a device 102a, 102b from the device 102a, b. The system 100 can also include a graphical user interface (GUI) module 103 configured to generate a medical provider user interface accessible via the device 102a, b (e.g., SAAS accessible via a web browser or app). For example, the medical provider user interface can include one or more automatically curated patient lists (e.g., separate inpatient and remote monitoring), patient data associated with each patient, teleconferencing associated with each patient (e.g., for inpatient rounding or remote monitoring), or remote monitoring data for each remote monitored patient. The medical provider user interface can be contextually generated based on the location information and includes interface characteristics associated with the location information.

Figure 2:
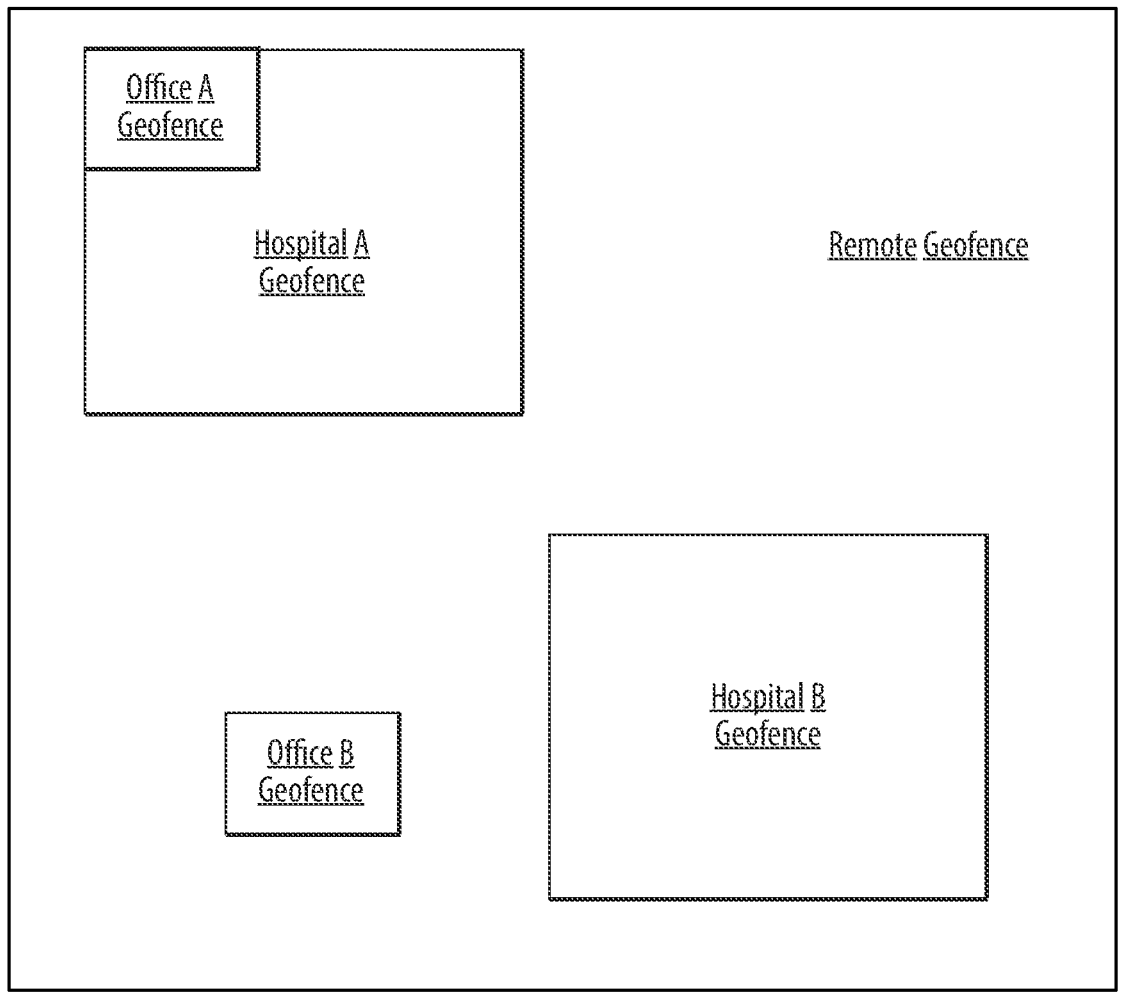
FIG. 2 is a schematic diagram of an embodiment of a geofence arrangement in accordance with this disclosure.
Figure 3A:
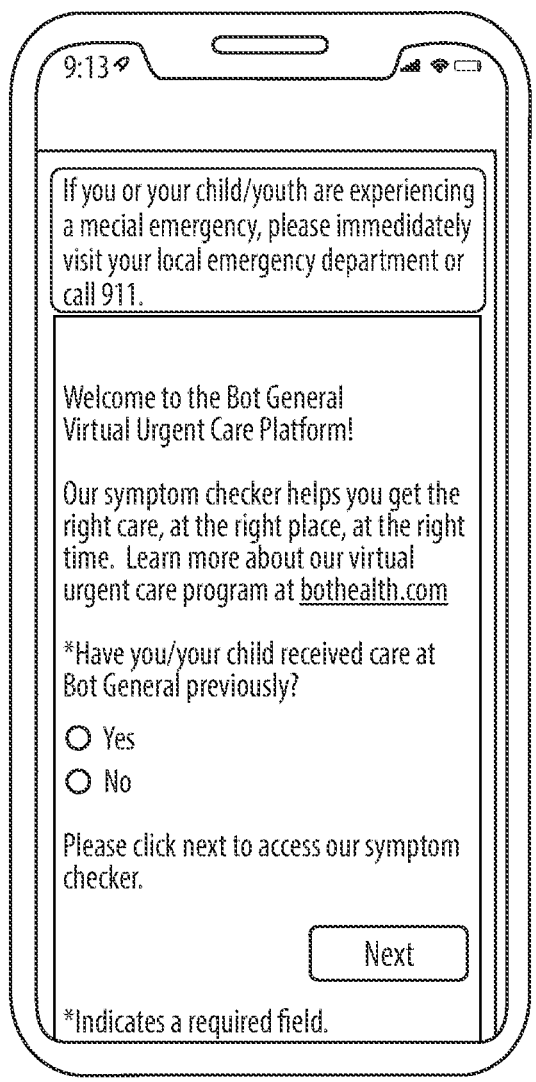
FIGS. 3A, 3B, 3C, and 3D show screenshots of an embodiment of a self-assessment triage interface that the patient is provided with after going to the emergency department and/or being admitted (e.g., via a website on a mobile device)
Figure 3B:
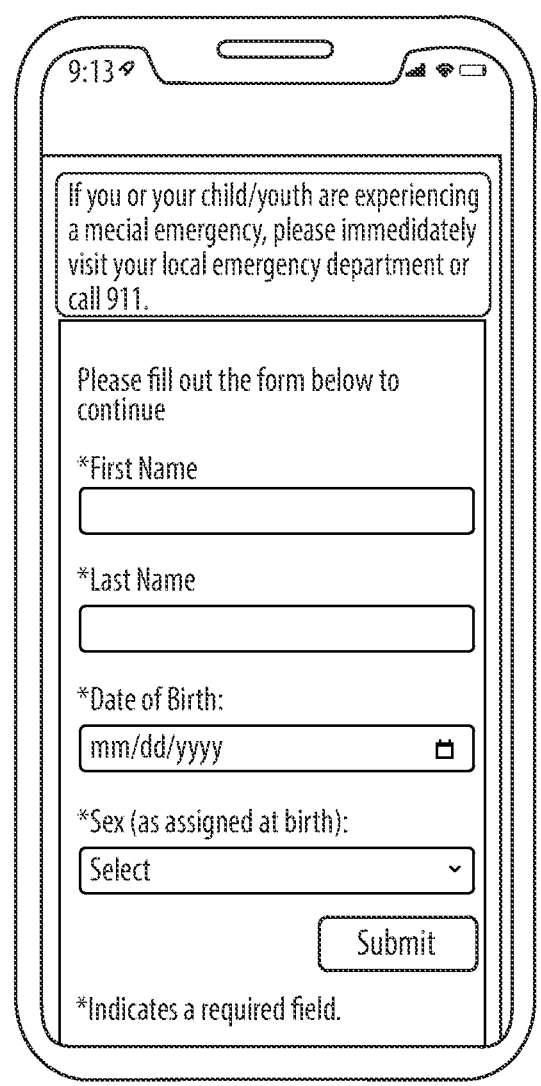
Figure 3C:
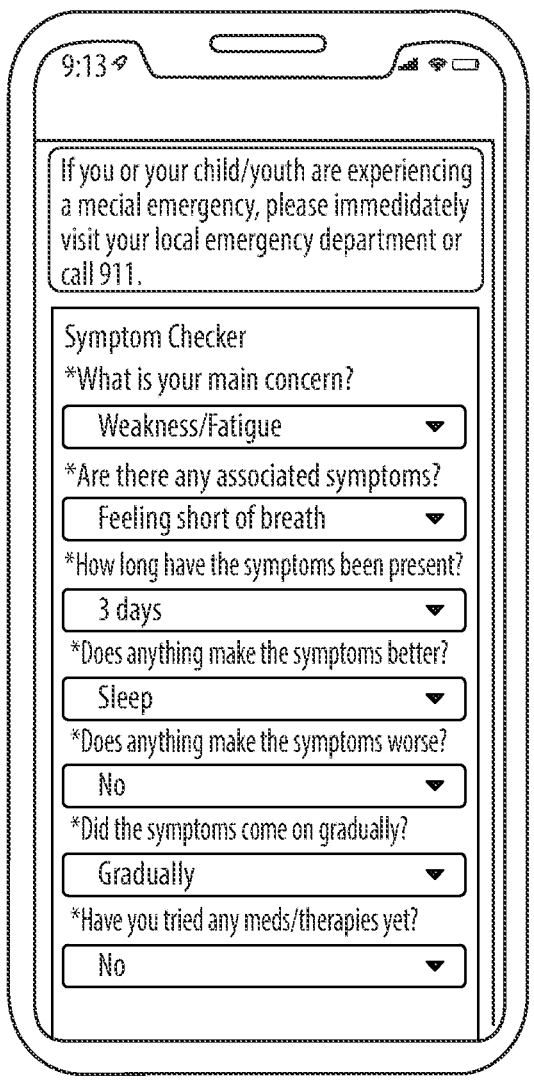
Figure 3D:
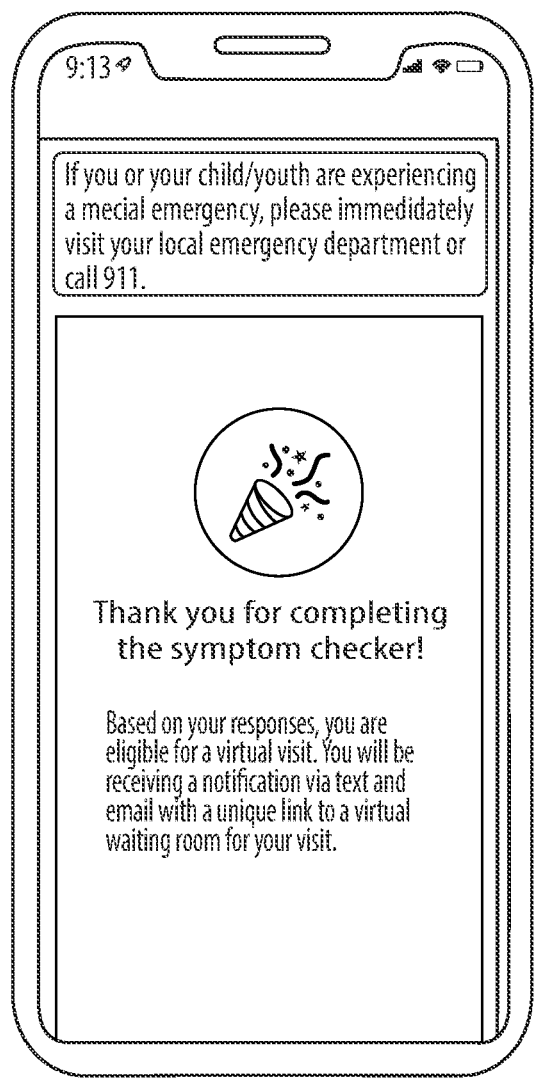

Referring additionally to FIG. 2, the system 100 can include a plurality of geofences (e.g., defined by the location module 101) in predefined locations. The location module 101 can be configured to locate the location information to a respective geofence of the plurality of geofences. The plurality of geofences can include a hospital geofence (e.g., Hospital A, Hospital B) defined around at least a portion of a hospital (e.g., the entire perimeter or a portion thereof), and a remote geofence (e.g., Remote) defined outside of the hospital geofence. In certain embodiments, the plurality of geofences can include an office geofence (e.g., Office A, Office B as shown) defined around a medical office (e.g., internal to or external to a hospital). The remote geofence can be define as any area not within a hospital geofence, and/or not within an office geofence. Any suitable demarcation of the various geofences is contemplated herein. Any other suitable additional geofences are contemplated herein. While the geofences are shown as 2 dimensional spaces, the geofences can be 3-dimensional and/or location specific within a structure (e.g., which wing or ward of a hospital the device is in to effect what the provider is presented with).

As shown, the device 102a can be a user mobile device (e.g., a phone, tablet, or laptop, for example). In certain embodiments, the device 102b can be a desktop computer within a known location. In certain embodiments, the location information can include one or more of a GPS location (e.g., transmitted by the device), a preset physical device location associated with a MAC address (e.g., transmitted by the device), or a preset network location based on an IP address (e.g., associated with the device). Any other suitable a priori information or dynamic information to determine a location of a physical device is contemplated herein.

The GUI module 103 can be configured such that when the device 102a, 102b connects to the GUI module 103 and is located within the hospital geofence (e.g., Hospital Geofence A or B as shown in FIG. 2), the medical provider user interface is automatically generated to have a hospital context dashboard (e.g., as shown in FIG. 7) having a patient rounding list and/or inpatient data associated with hospital inpatients at the hospital (e.g., showing patients at the respective hospital the device 102a is located). The GUI module 103 can be configured such that when the device 102a connects to the GUI module 103 and is located within the remote geofence or office geofence, the medical provider user interface is automatically generated to have a remote context dashboard (e.g., as shown in FIG. 11) having a remote patient list and/or remote monitoring data associated with remote patients that are not at the hospital (e.g., patients being remote monitored at home). In certain embodiments, the GUI module 103 can be configured to allow manual switching and/or navigation by the user between the hospital context dashboard (e.g., as shown in FIG. 7) and the remote context dashboard (e.g., as shown in FIG. 11) such that the user can always manually access whichever patients lists and/or data that is desired. However, geolocation based presentation of contextually accurate information can save significant aggregate time and wasted computing power/data transfer associated with a user having to navigate from a login screen to the desired data, for example.

In certain embodiments, the GUI module 103 can be configured to generate the medical provider user interface (e.g., the patient list shown to each user) based on one or more of a user role, a user shift, and/or patient attributes in addition to the location information. For example, a certain type of physician or nurse (e.g., neuro) at the end of their shift may see a different patient list or interface (e.g., remotely monitored patients instead of inpatients) than a similar type of physician or nurse earlier in the shift, and/or from a different type of physician or nurse (e.g., cardiac). For example, a cardiac doctor may see a different patient list then a dermatologist or a neuro doctor depending on patients that are being monitored for certain conditions. In certain embodiments, a patient list can change and update as a function of the time of day.

The system 100 can further include a patient data module 105 configured to receive patient data from one or more databases (e.g., an electronic medical records (EMR) system 106) to provide patient data to the hospital context dashboard and the remote patient dashboard. The one or more databases can include an electronic medical records (EMR) system 106, for example.

The GUI module 103 can be connected to (and/or include) the patient data module 105 to receive patient data therefrom. The GUI module 103 can be configured to populate and dynamically update the hospital context dashboard and/or the remote context dashboard with the patient data such that displayed patient data updates when a patient is admitted, overseen, transferred, discharged, or moved to remote monitoring. For example, the EMR system 106 can push updates to the patient data module 105.

In certain embodiments, the GUI module 103 can be configured to provide priority based lists to a user based on the user role. For example, a certain provider can see a certain sorting of patients based on the type of provider the user is.

The system 100 can include a care team module 107 configured to automatically and dynamically build a custom care team for each patient. Each member of the care team can be selected from a plurality of users in a user database 108 (e.g., an employee database), based on one or more of a location of each user (e.g., real time or assumed location), shift data of each user (e.g., based on employee schedules), role data of each user (e.g., defined user roles, e.g., as shown in FIGS. 19-24), the skill attributes of each user (e.g., the type of physician or nurse), a time of day and/or date (based on employee schedules and shift times), and a patient attributes (e.g., symptoms and/or conditions). In certain embodiments, the care team module can be configured to build a custom care team for each patient according to patient specific symptoms. In certain embodiments, the care team module can use artificial intelligence/machine learning to select a care team for a particular patient.

In certain embodiments, the care team module 107 can output information to the GUI module 103 to display information or communication options relating to team members to the user. In certain embodiments, the care team module 107 can control which users see which patient information. In certain embodiments, the care team module 107 can be connected to the patient data module 105 (e.g., directly and/or through the GUI module 103) to receive patient data information from the patient data module 105 and filter the information for the built care team users such that the GUI module 103 outputs certain patient information to only assigned care team members. In certain embodiments, the care team module 107 can be accessible via the medical provider interface or via a standalone care team interface (e.g., as shown in FIGS. 25A-26C) for certain users (e.g., an administrator account on admin device 112) to allow a user to build and define care teams (e.g., as shown in FIGS. 25A-26C).

In certain embodiments, the system 100 can include a patient information module 109 configured to generate a patient portal (e.g., a form or other suitable interface) for receiving patient and/or symptom information. The patient information module 109 can be configured to create and send a link to the patient portal to a patient mobile device 110, for example. The patient information module 109 can be operatively connected to the GUI module 103 to provide the GUI module with patient information (e.g., symptoms reported by the patient). The GUI module 103 can be configured to (e.g., using artificial intelligence/machine learning) to integrate the patient information from the patient information module 109 and the patient data module 105 into the medical provider interface (e.g., providing alerts and/or priority levels based on reported symptoms from a patient). In certain embodiments, the care team module 107 can be connected to the patient information module 109 such that reported symptoms through the patient information module 109 can be provided to the care team module 107 such that the care team module builds 107 and/or modifies the care team as a function of reported symptoms.

In certain embodiments, the patient information module 109 can alternatively or additionally be configured to receive remote monitoring signals from a remote monitoring device 114 (e.g., a blood pressure monitor, a heart monitor, etc.) to provide sensed patient data to the GUI module 103 and/or care team module 107. The care team module 107, the patient data module 109, and/or any other suitable portion of the system can be configured to automatically evaluate the sensed patient data (e.g., using artificial intelligence) and cause a message to be sent to one or more care team members and/or a primary care physician where the sensed patient data is abnormal or otherwise indicative of a need for care team member review (e.g., high blood pressure above a threshold, cardiac arrhythmia, etc.).

In certain embodiments, the system 100 can include a role module 111 configured to receive schedule information for each user (e.g., from a user database 108). The role module 111 can be configured to output role data and shift data to the care team module 107 based on the schedule information. A user (e.g., an administrator on admin device 112) can be configured to access, create, and modify roles via a role interface (e.g., as shown in FIGS. 19-24).

In certain embodiments, the system 100 can include a messaging module 113 configured to send messages to each user based on the user role data. For example, the messaging module 113 can send a text message, a push notification, a teleconferencing app notification, or other suitable communication to a user based on their role and/or care team membership (e.g., as shown in FIGS. 27-30D). In certain embodiments, the messaging module 113 can provide a messaging configuration interface (e.g., as shown in FIGS. 27-30D) accessible by a user (e.g., an administrator from device 112) to allow a user to configure message triggers, content, and what roles/teams receive the messages. The system 100 can send a message when a trigger is met (e.g., when patient provided information or remote sensor data indicates a need for review).

In certain embodiments, the messaging module 113 can be configured to receive at least one of an escalation response, forwarding response, or a delegation response from the user, and to forward the message to another user based on the role data (e.g., as shown in FIGS. 31A-32B). For example, the messaging module 113 can provide an interactive message allowing a user to confirm review of the data, or escalate, forward, or delegate the review of the data. In this regard, the system 100 can be configured to allow a user to automatically forward the message to another care team member or a supervisor, or to manually forward the message to anyone else.

Embodiments can include any suitable computer hardware and/or software module(s) to perform any suitable function (e.g., as disclosed herein). Any suitable modules of the system (e.g., as disclosed herein, e.g., as described above) can be hosted on the same or different hardware, and/or be integrated together as software and/or hardware in any suitable combination. Any suitable demarcation or combination of modules is contemplated herein.

In accordance with at least one aspect of this disclosure, a non-transitory computer readable medium can include computer executable instructions for performing a method. In certain embodiments, as shown in FIGS. 3A-3D, the method can include providing a patient with an urgent care symptom checker interface (e.g., on a user device 110, for example) configured to allow a patient to input symptoms and data to check in. As shown in FIGS. 4A and 4B, the method can include providing a registration and patient status interface to a user (e.g., an urgent care patient list).

Figure 5A:
Figure 5B:
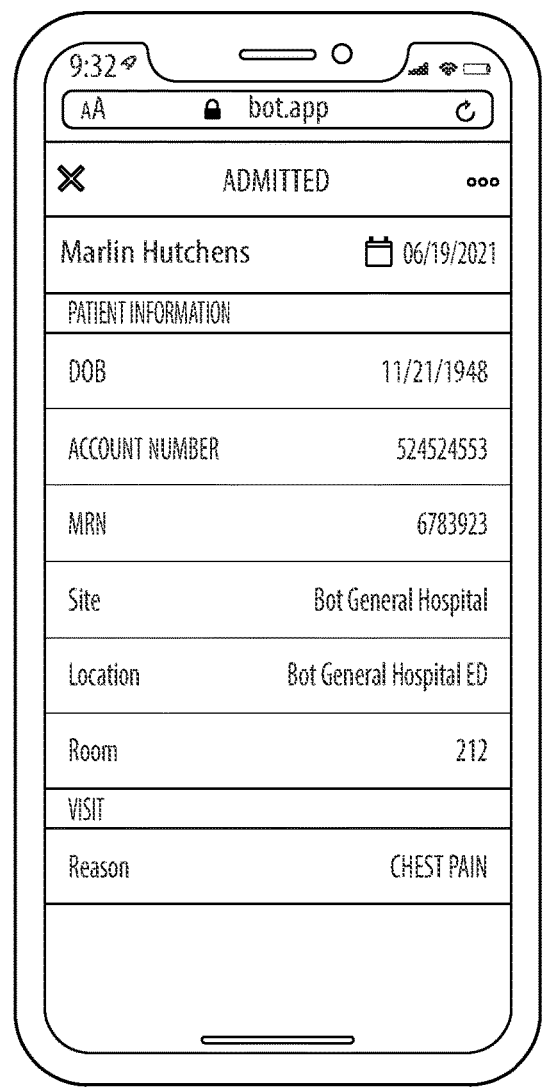
Figure 5C:
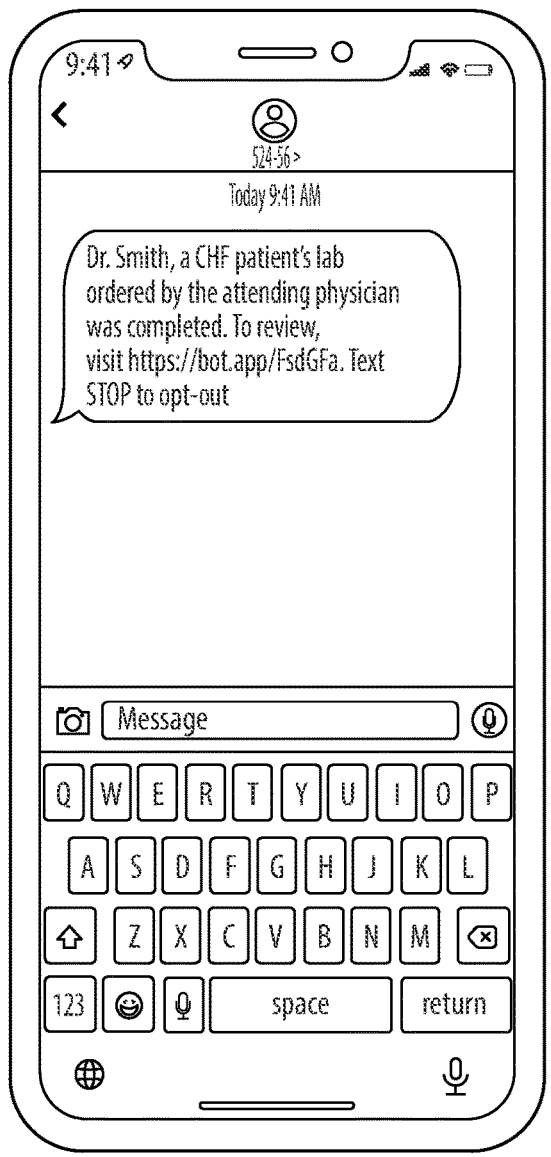
Figure 5D:
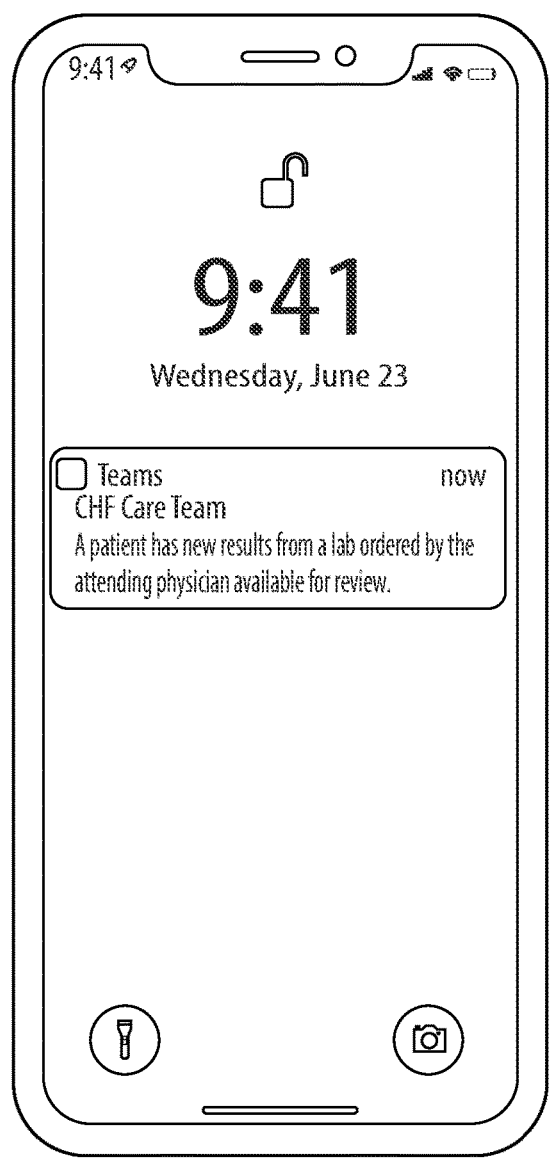
Figure 6A:
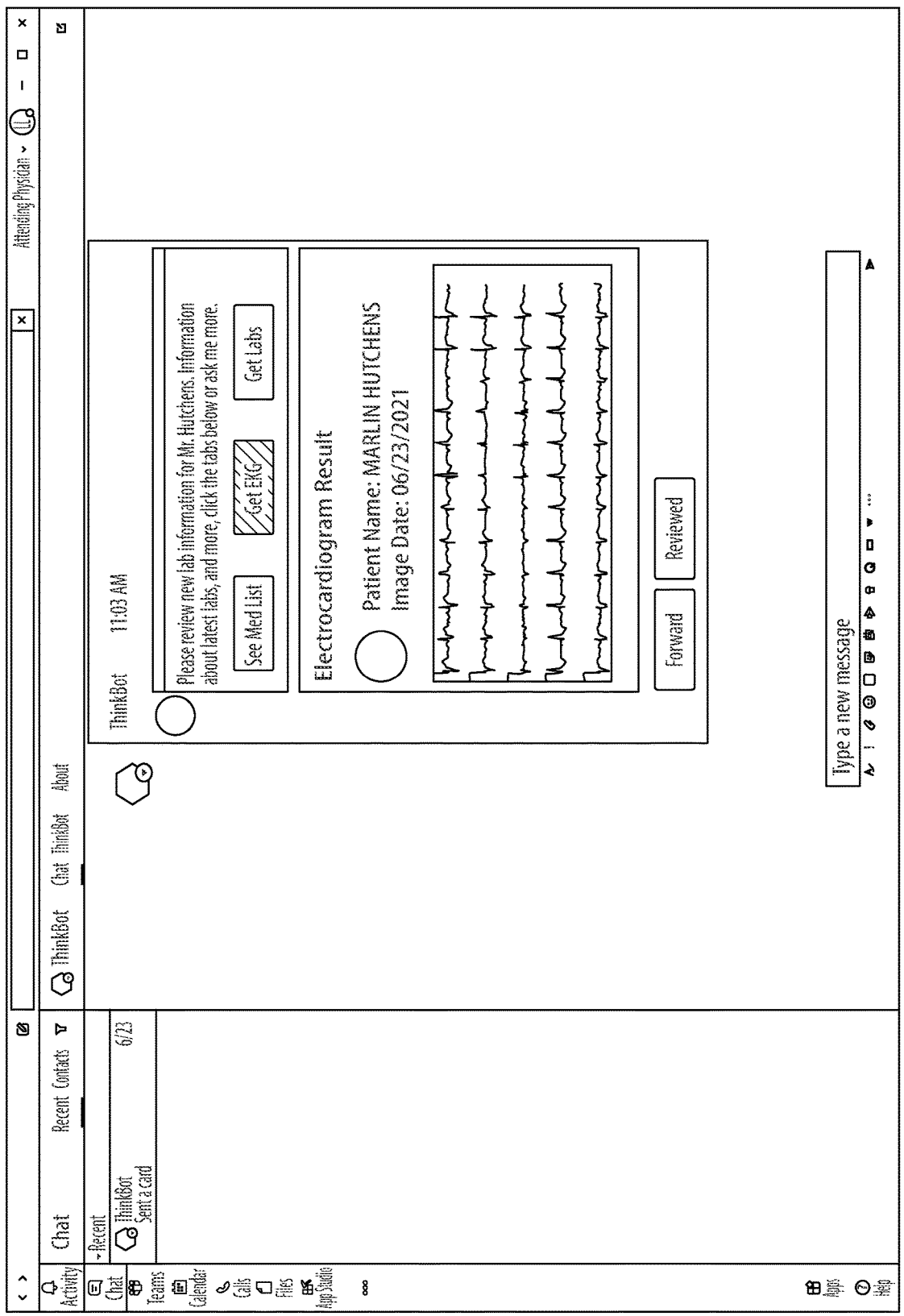
Figure 6B:
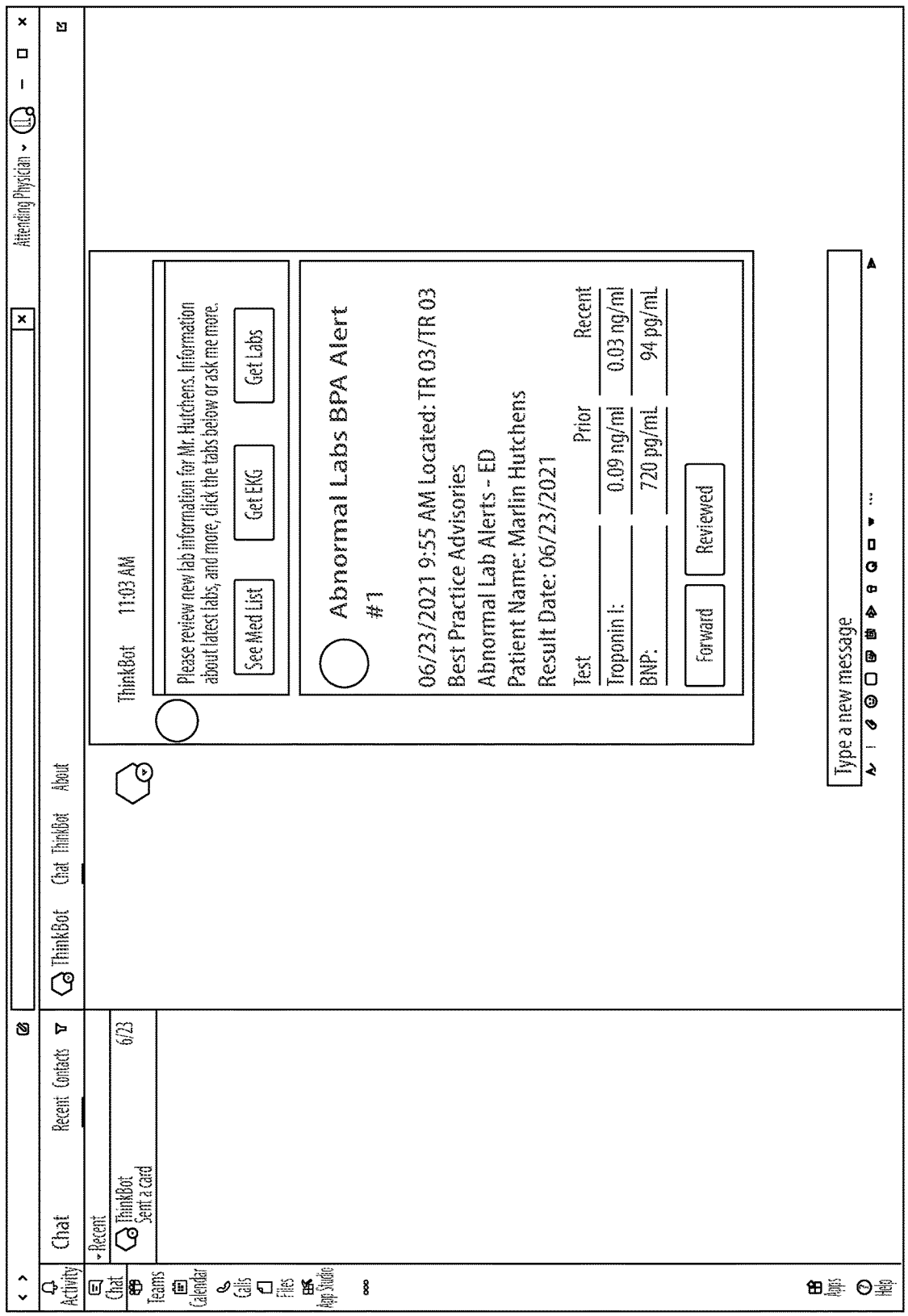
Figure 6D:
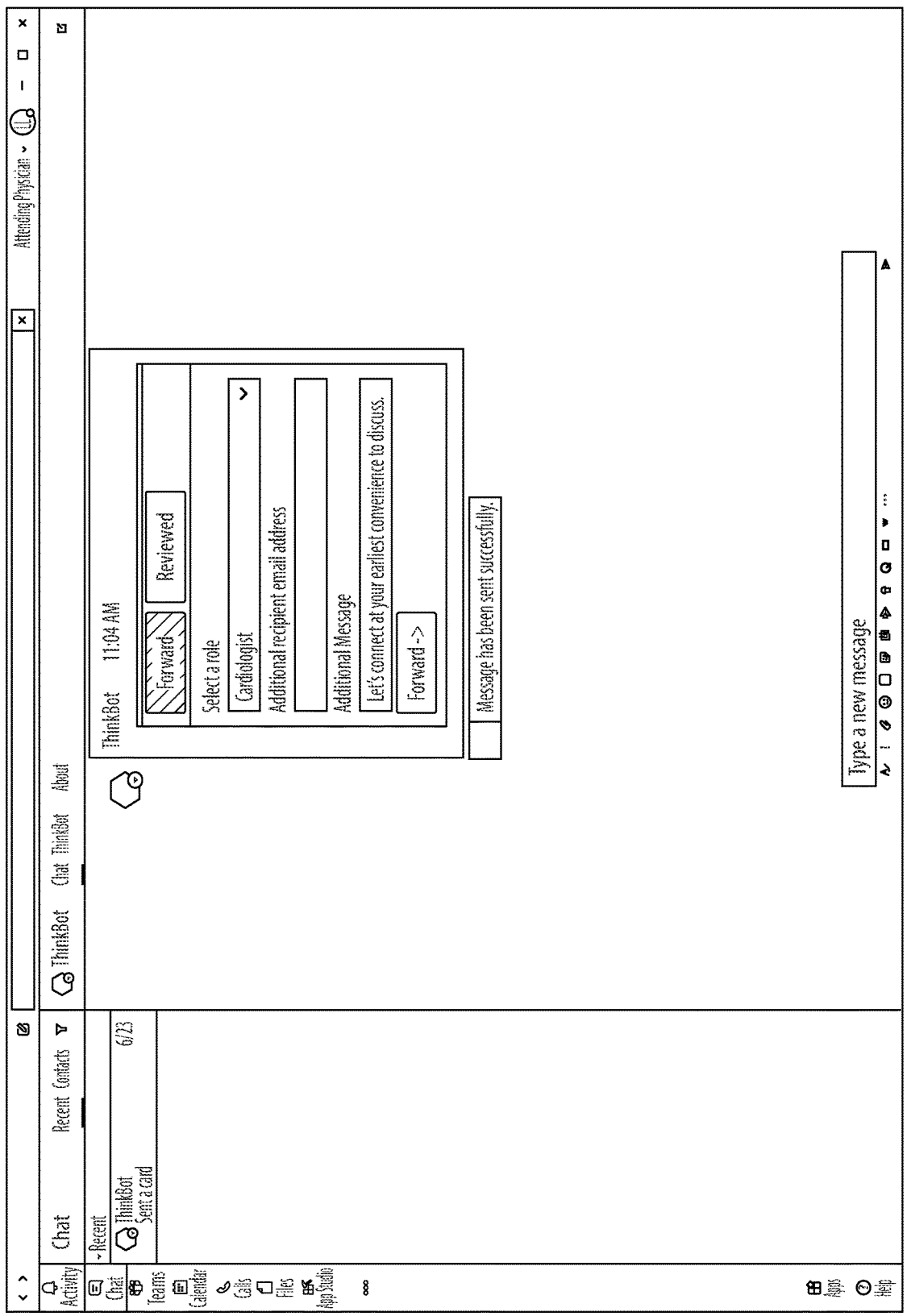

The method can include tracking (e.g., passively or actively) a patient electronic medical record (EMR) for updates using a virtual care system, receiving an admission record from the EMR indicative of the patient being admitted to a hospital, and sending an admission notification to a primary care provider of a patient upon receiving the admission notification (e.g., as shown in FIGS. 5A and 5B). The admission notification can include a hyperlink configured to redirect the primary care physician device to a website having admission details. The method can also include forming a care team by automatically selecting a plurality of care team members from a user database based on roles of each user (e.g., using artificial intelligence based on the input patient data/symptoms).

The method can include providing one or more secure clinical messages to one or more care team members (e.g., lab results as shown in FIGS. 6A-6D). The one or more secure clinical messages can be sent as a function of one or more triggers (e.g., abnormal lab data or other abnormal data that can indicate an emergent scenario).

As shown in FIG. 7, the method can include providing a virtual rounding list to a device (e.g., device 102*a*) of a care team member. The virtual rounding list can include the patient. Each patient on the list can be selectable to provide information on a selected patient and/or a videoconferencing link to connect the care team member to a patient device 110 (e.g., as shown additionally in a selected patient window in FIG. 9A and the meeting in FIG. 9B). Each user's rounding list can be user specific for system assigned patients, for example, based on roles and teams. The method can include adding outside parties to the meeting.

In certain embodiments, the method can include providing a patient with a discharge questionnaire interface as shown in FIG. 8. In certain embodiments, the method can include receiving a discharge record from the EMR, and sending a discharge notification to the primary care provider.

The method can include remotely monitoring the patient after discharge via one or more remote monitoring devices (e.g., physical sensors attached to the patient) and/or patient feedback. For example, as shown in FIGS. 10A-10D, the patient can be enrolled in a remote monitoring program via one or more messages. For example, a remote monitoring module of the above system can send messages having hyperlinks to health surveys that can be completed by the patient.

Figure 12:
FIG. 12 shows a screen shot of an embodiment of an RPM patient status pane (e.g., a popup pane) when a patient is selected.
Figure 13:
FIG. 13 shows a screen shot of an embodiment of a follow-up visit scheduling pane where the provider can send a message to the patient to schedule a follow-up visit in the system.
Figure 14A:
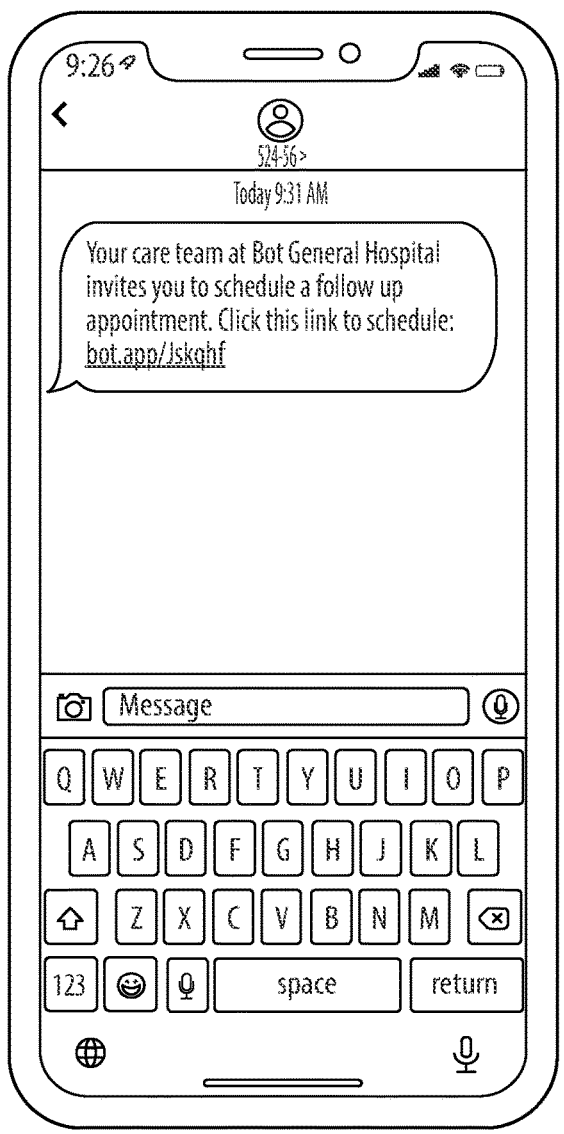
Figure 14B:
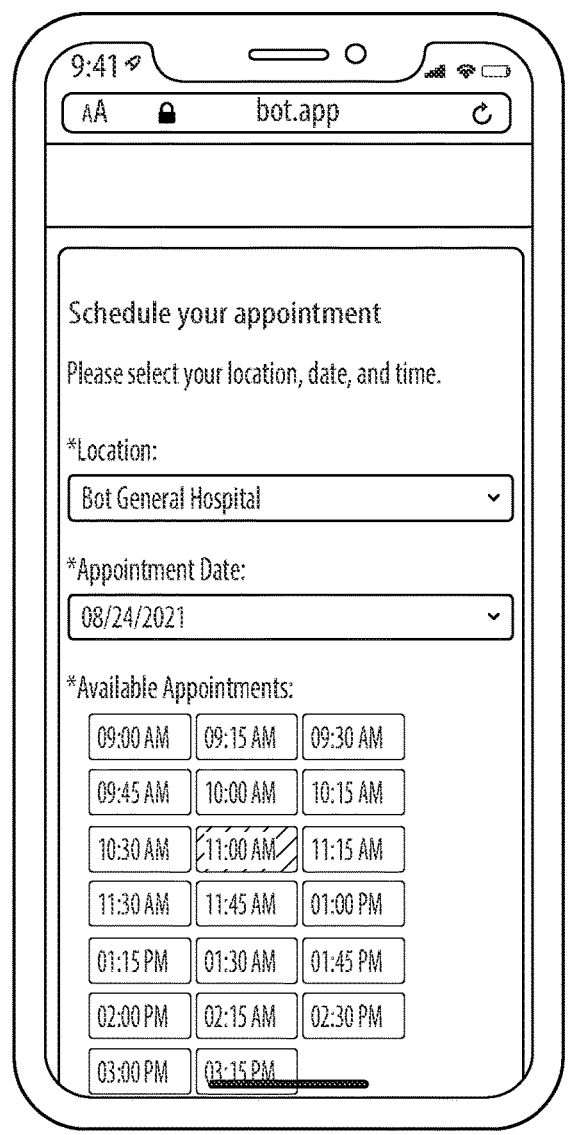
Figure 14C:
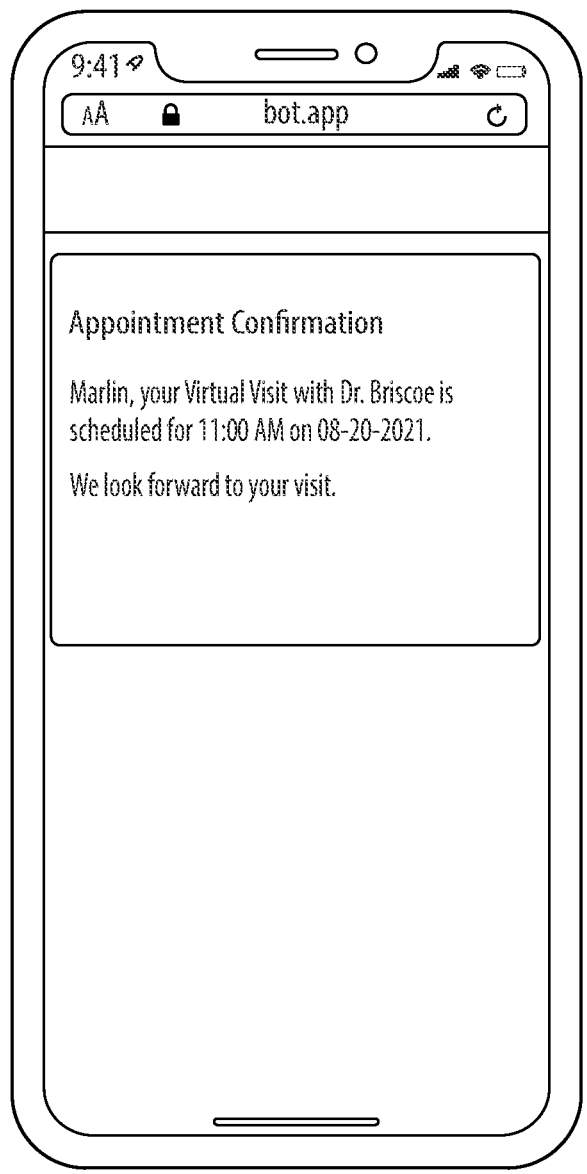
Figure 15:
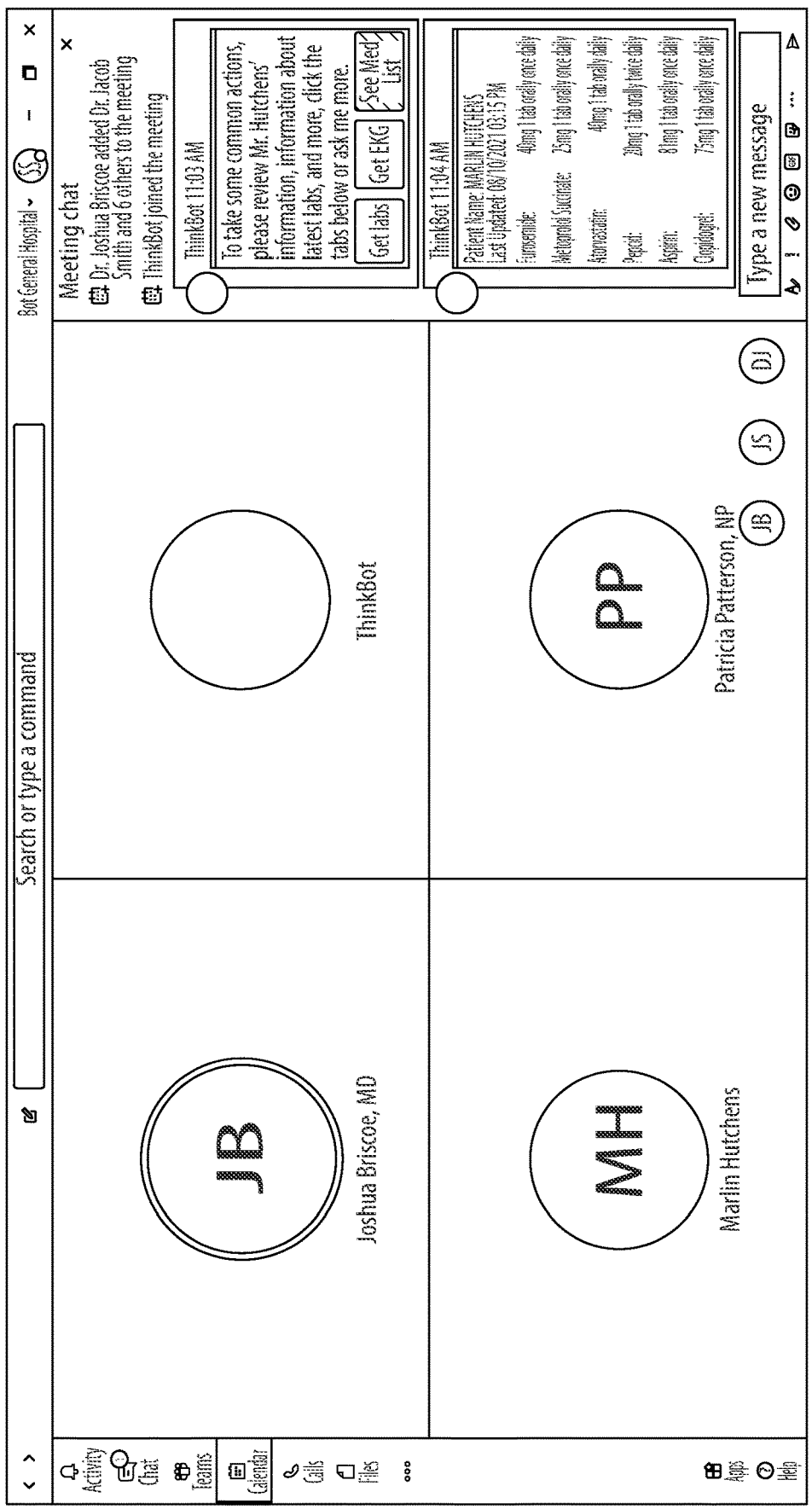
FIG. 15 shows an embodiment of a teleconference meeting platform, wherein the system allows patients and care providers to invite others (e.g., family members, other care providers) into an already scheduled telehealth visit.

As shown in FIG. 11, the method can include providing a remote monitoring interface having a remote patient list to the user, and providing an indication of priority based on responses to the health surveys. For example, an abnormal symptom or set of symptoms may trigger a high priority flag for the user to review, e.g., as shown in FIGS. 11 and 12. The user can review the results, e.g., in a popup pane for the particular patient, e.g., as shown in FIG. 12. The method can include presenting the user with an option to message the patient to schedule a followup remote visit (e.g., as shown in FIGS. 13 and 14A-14C), which can occur as shown in FIGS. 15, 16, and 17. FIG. 15 shows an embodiment of a teleconference meeting platform, such that the system allows patients and care providers to invite others (e.g., family members, other care providers) into an already scheduled telehealth visit. FIG. 16 shows a virtual assistant secure communication such that the virtual assistant pulls patient data for the care team to discuss and collaborate in a secure messaging platform provided by the system, for example. FIG. 17 shows an embodiment of a screenshot of a patient summary page such that the system can display summary information after patient has completed the entire treatment through the system, and the patient status can be edited from high or low priority to graduate of the program to remove the patient from RPM.

Figure 18A:
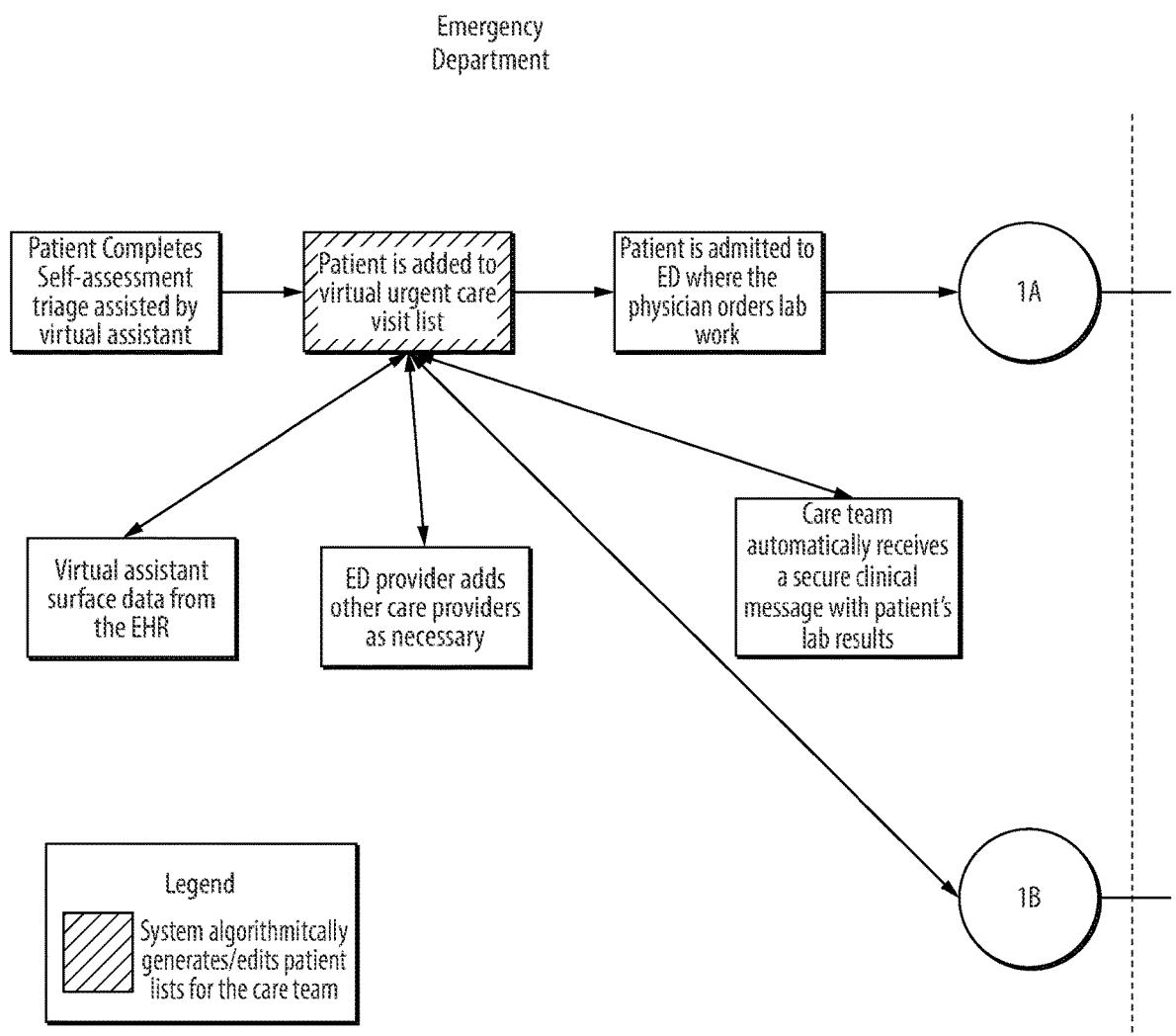
Figure 18B:
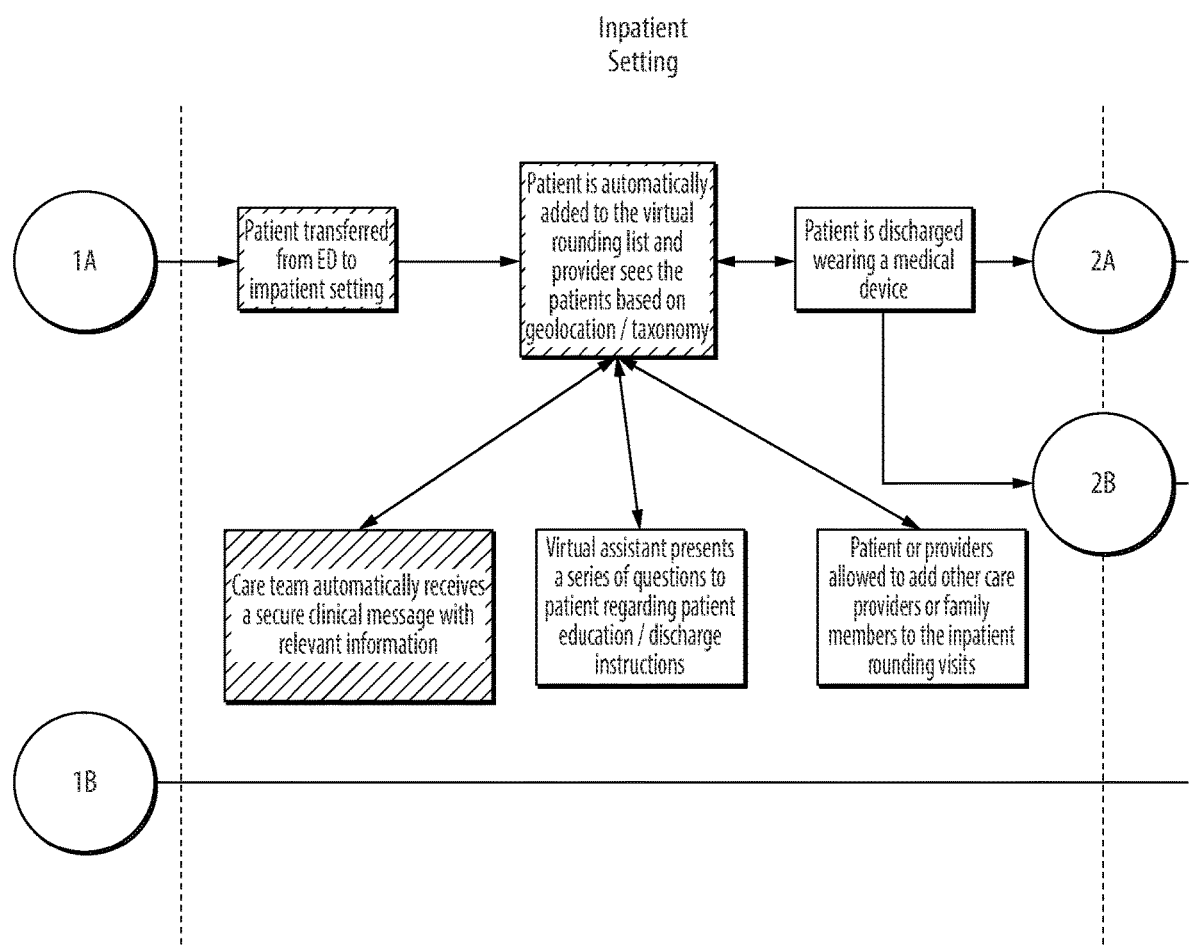
Figure 18C:
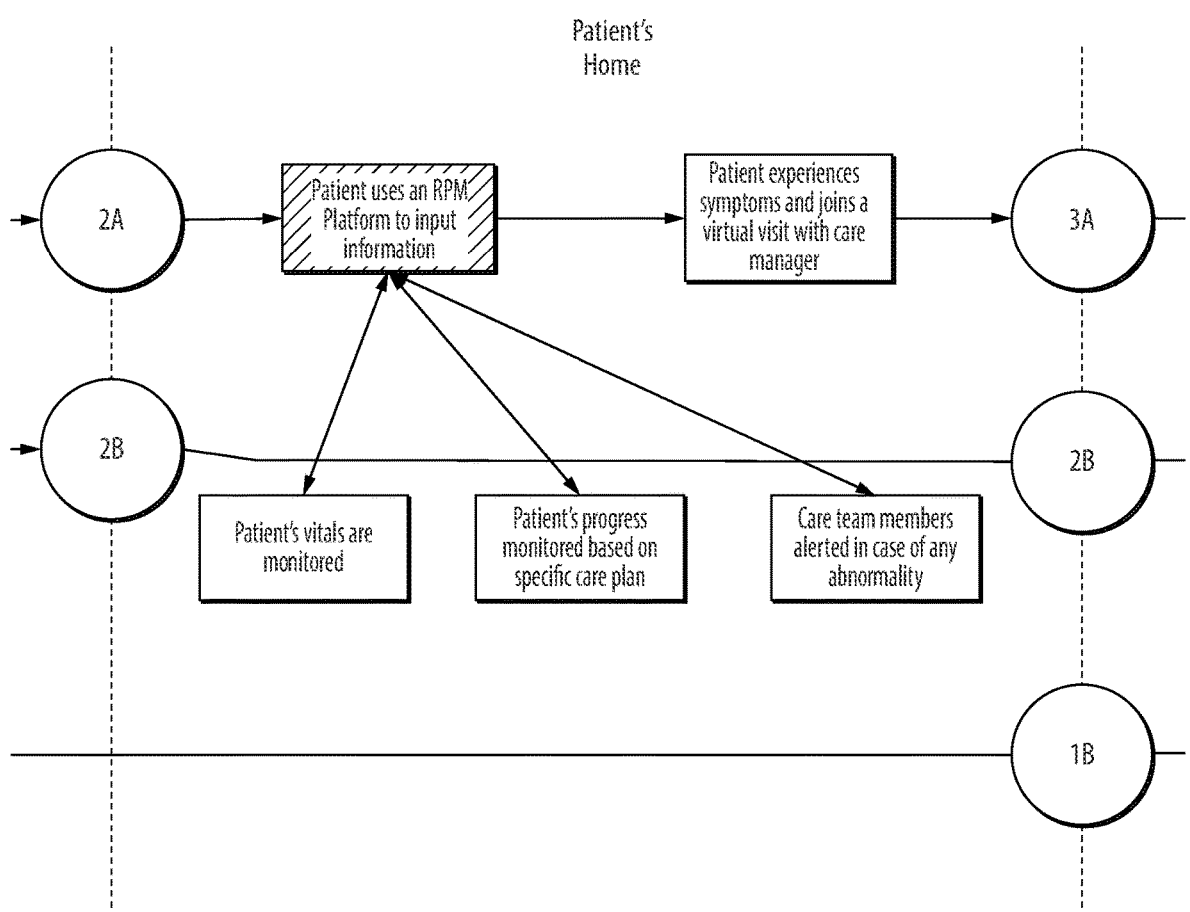
Figure 18D:
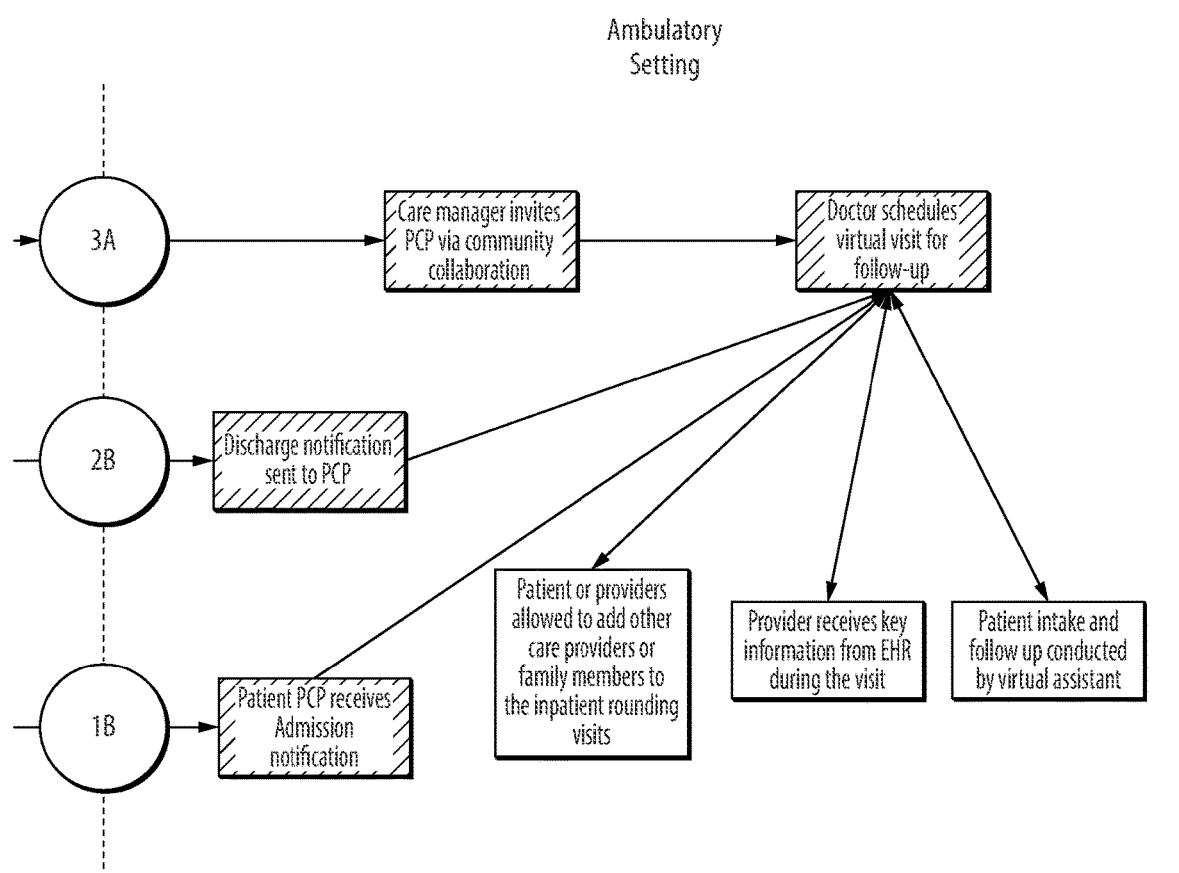

FIGS. 18A, 18B, 18C, and 18D schematically depict an embodiment of a workflow associated with and enabled by the system of FIG. 1. As shown, FIG. 18A shows the workflow in the emergency department setting. FIG. 18B shows the workflow in the inpatient setting. FIG. 18C shows the workflow in the patient's home setting. FIG. 18D shows the workflow in an ambulatory setting. The method can be or can include any suitable portion of the shown workflow in any suitable order.

The system 100 can be configured to enable the shown workflow. For example, as shown in FIG. 18A, a patient can arrive at an emergency room/emergency department (referred to herein as an ER or an ED) ED personal can log in the patient to the ER using the system, which can trigger the system 100 to send self-assessment form to the patient (e.g., as shown in FIGS. 3A-3D). The system can also receive data from the EMR system 106 relating to the patient. If necessary, the patient can have lab work done, and the system can assemble a care team and send a message to one or more of the care team members with results. The patient's primary care provider (PCP) can be notified that the patient has visited the ER and/or has been admitted (following track 1B as shown). If necessary, the patient can be formally admitted to the hospital (following track 1A as shown). As shown, the portions emanating from certain blocks can happen concurrently with other blocks of the workflow.

As shown in FIG. 18B, the system 100 can then transfer the patient to an inpatient setting and automatically add the patient to an inpatient virtual rounding list (e.g., where a provider can be presented with patients based on geolocation and taxonomy as disclosed herein). The system can send one or more secure clinical messages to care teams relating to the inpatient and/or patient data. The system can send questionnaires to the patient regarding symptoms to check for discharge readiness, and/or enable virtual visits with the inpatient. For example, a doctor can log in, and geolocation and/or taxonomy can be used to automatically take a doctor who is at the hospital to virtual rounding platform showing patients and enabling virtual meetings with each patient (e.g., with clickable virtual meeting buttons). The patient can eventually be discharged (e.g., wearing a remote monitoring medical device or not), and the workflow can follow track 2A and 2B (where the PCP receives a discharge notification).

As shown in FIG. 18C, the patient can be discharged certain remote patient monitoring devices and/or can be automatically enrolled patient in a remote monitoring program such that the patient is placed on a remote monitoring list for one or more providers to see and monitor (e.g., based on a care plan and vitals). The patient can be monitored via the device and/or via one or more check up questionnaires sent by the system. Quantitative information can be automatically provided to the system by the remote monitoring device(s), but the patient can also input qualitative information. For example, the patient can be presented with a survey in a suitable interval, and the patient can click a link in a message and complete the survey (without the need to log in to the system at all). The patient can be prompted to set up a follow up meeting (e.g., when symptoms occur) with a provider (e.g., a care team member monitoring the patient). As shown in FIG. 18D, the care team member can add the PCP into any meeting, and the PCP and/or patient can add in any other desired person (e.g., a family member).

Embodiments can include a virtual care team collaboration system with taxonomy and geolocation. Embodiments can include a dynamic tele-health platform that combines five pillars of virtual healthcare (virtual visits, community collaboration, secure clinical collaboration, virtual rounding, and remote patient monitoring), and actively computes taxonomy based on geolocation, care team, and patient context. In certain embodiments, the system can formulate a patient list from various existing medical record systems as soon a physician's geolocation indicates they have entered the facility, for example. In certain embodiments, artificial intelligence bots can dynamically update patient lists as patients are admitted, discharged, or transferred, while a virtual assistant notifies and brings appropriate content to the patient's care team. By organizing taxonomy according to facility, mode of interaction, and status, artificial intelligence assists the physician to maximize care. Additionally, care teams may utilize the system's secure clinical communication to collaborate with other physicians and the virtual assistant's patient lists, records, and live stats. Care teams can also oversee discharged patient's recovery process by using the system's remote patient monitoring and the adaptive patient lists.

Embodiments relate to the healthcare field, more specifically to medical practices and provider to patient organization. Implementing a single platform to access capabilities through the multiple pillars will reduce abandonment, improve patient care, and create a more uniform and efficient experience for healthcare providers to solve the current inefficiencies present in healthcare systems.

The five pillars include virtual visits/telehealth, secure clinical collaboration, community collaboration, virtual rounding, and remote patient monitoring. Telehealth and virtual visits entail patient-to-provider video communication via a unique link that connects patients to a secure virtual appointment. Secure clinical collaboration allows providers to discuss patient information while maintaining privacy and security of protected health information. Community collaboration can be important for clinicians to communicate with patient's care team, such as their primary care providers, specialists, when they get admitted, discharged, or transferred at a hospital facility. Virtual rounding provides convenient inpatient experience allowing the care team to monitor patients' progress in a timelier matter compared to in person rounding. Lastly, providers can oversee patients virtually through remote patient monitoring using medical devices that transmit data to the care-team.

Embodiments can include the process of pulling information from various existing medical record systems and computing a taxonomy based on the geolocation of the physician and patient. Embodiments can allow for care teams to efficiently triage and treat patients thereby saving valuable time that could be used towards the clinician interaction with the patient or with other clinicians.

In certain embodiments, the virtual assistant provides a self-assessment triage for the patient to complete prior to the virtual urgent care visit. The patient can input relevant information for the care team via a questionnaire. Each emergency department can have differences based on the location, capacity and the level of acuity that they can handle. Based on the requirements of each emergency department, the self-assessment triage can be configured to automatically navigate the patient into the emergency department setting or other care settings as needed.

The system can navigate the patient to a virtual urgent care visit, where the system can algorithmically curate a dynamic patient list for the care team to view their work schedule at an urgent care setting. During the urgent care visit, the virtual assistant can surface data from the EMR (Electronic Health Records) and other data sources to aid the provider in patient treatment (FIGS. 4A and 4B). Should the physician admit their patient to the ED for further evaluation, the patient's PCP will receive an Admission, Discharge, Transfer (ADT) notification from the system upon their ED admission (FIGS. 5A-5D). These notifications can be critical to care since they can be instantaneous and helps coordinate care with the patient's primary care provider or other care providers who are crucial to create an effective care plan for the benefit of the patient.

Figure 9A:
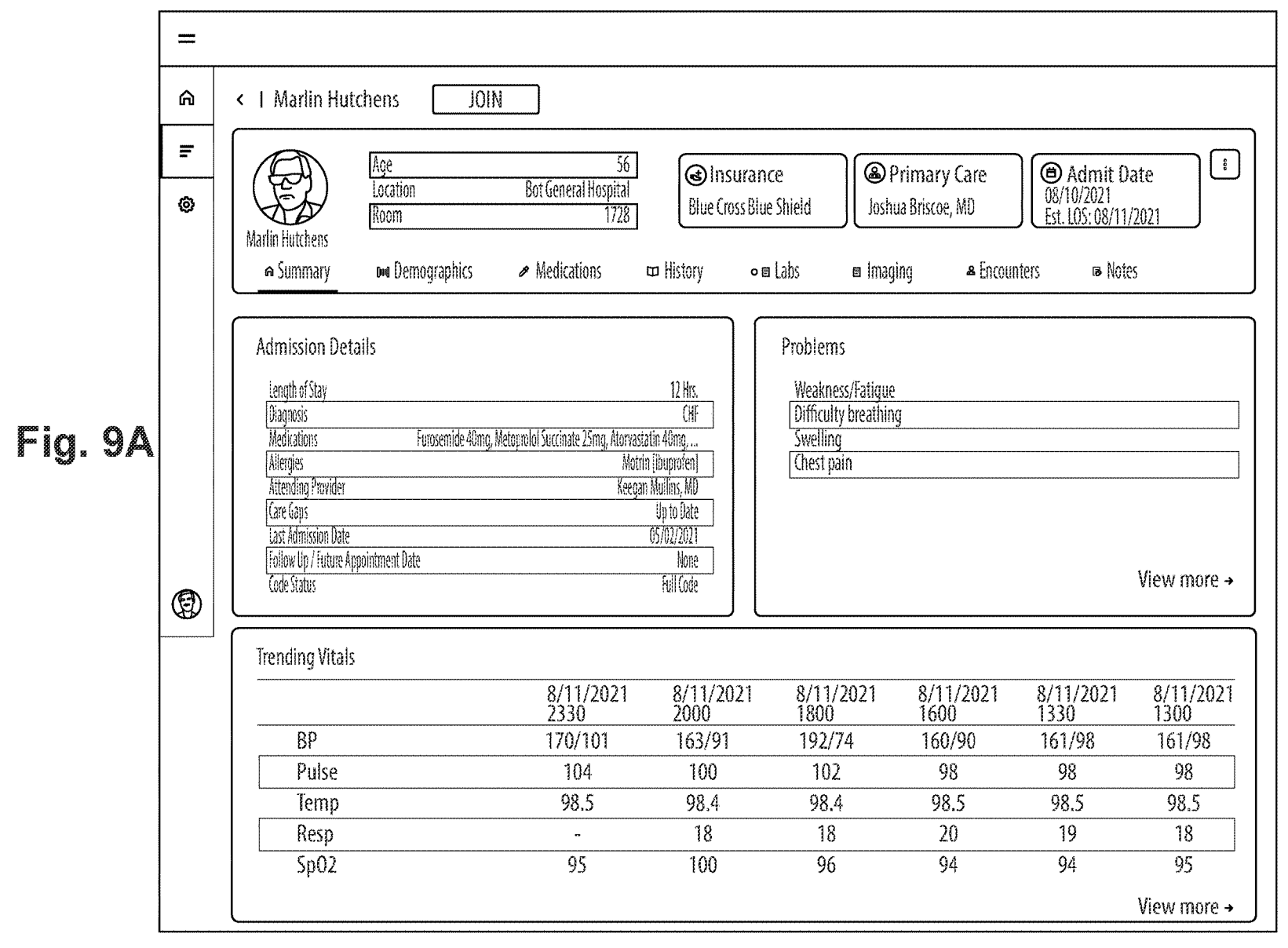
Figure 9B:
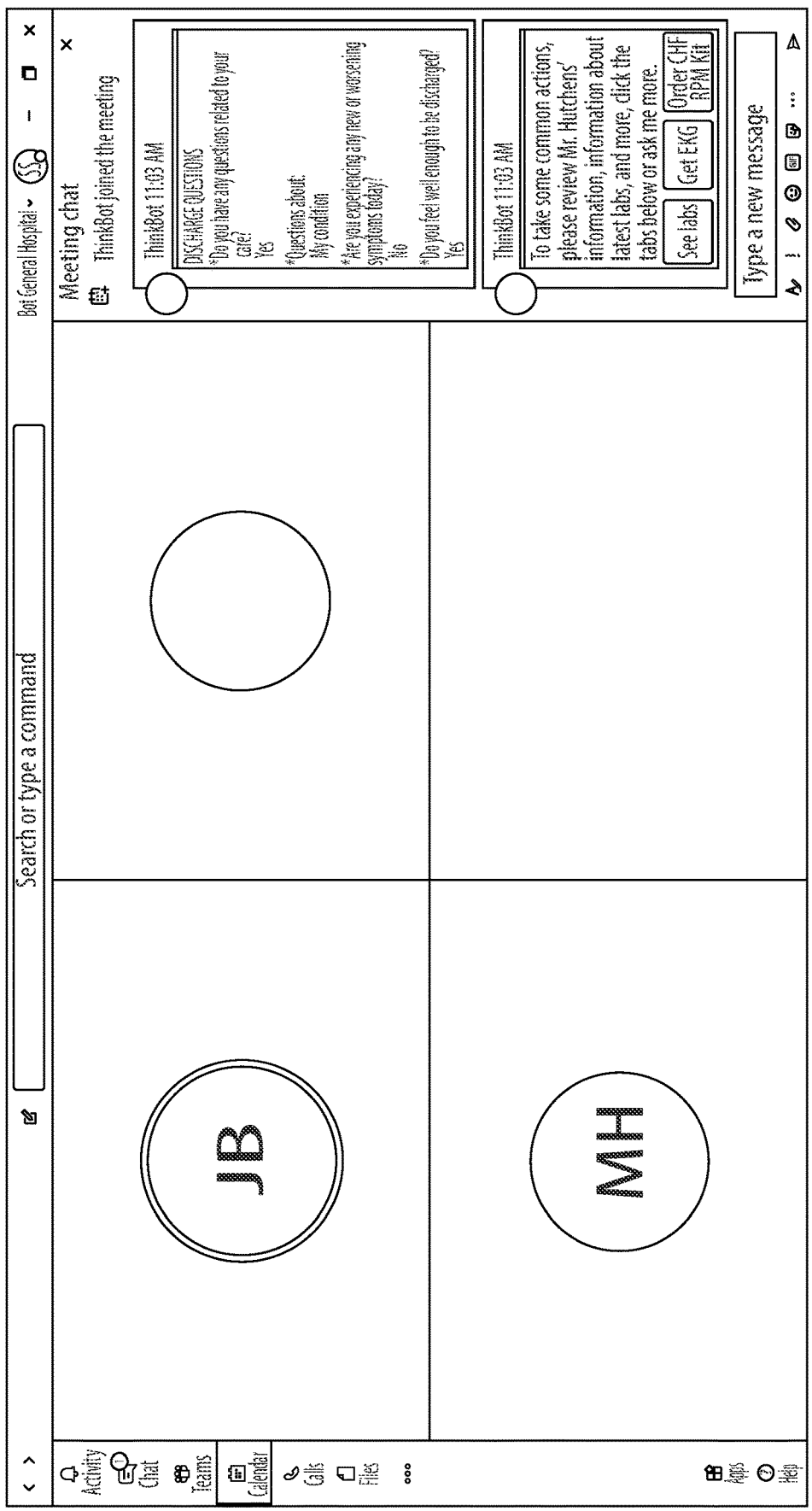
Figure 10A:
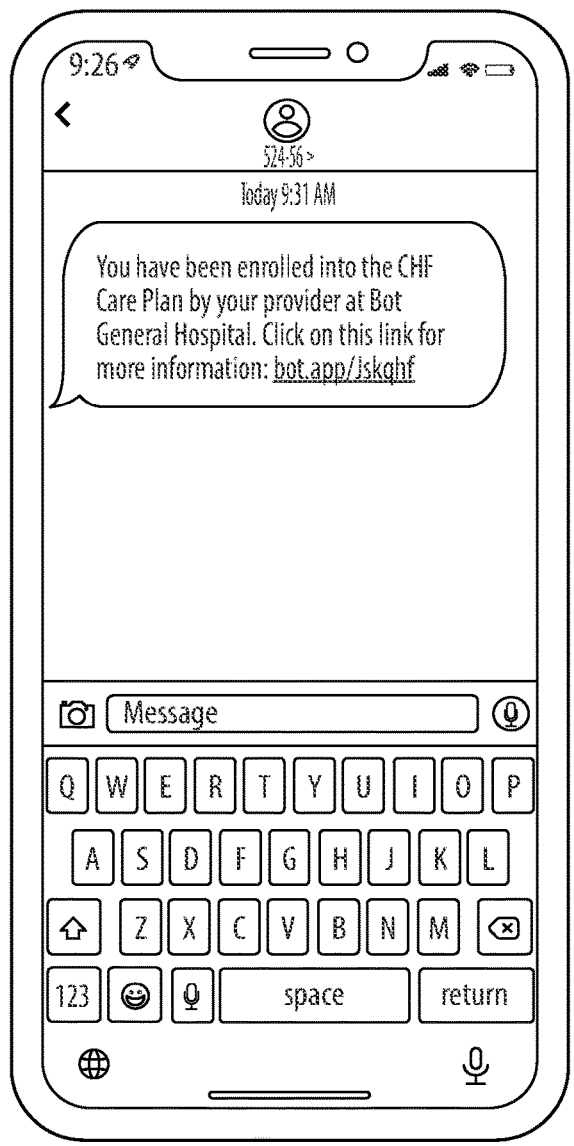
FIGS. 10A, 10B, 10C, and 10D illustrate remote patient monitoring (RPM) enrollment notification (FIG. 10A) where the system can notify patient of remote monitoring program enrollment, send an RPM update survey hyperlink message (FIG. 10B), and provide an RPM survey interface for the patient to access and use (FIGS. 10C and 10D)
Figure 10B:
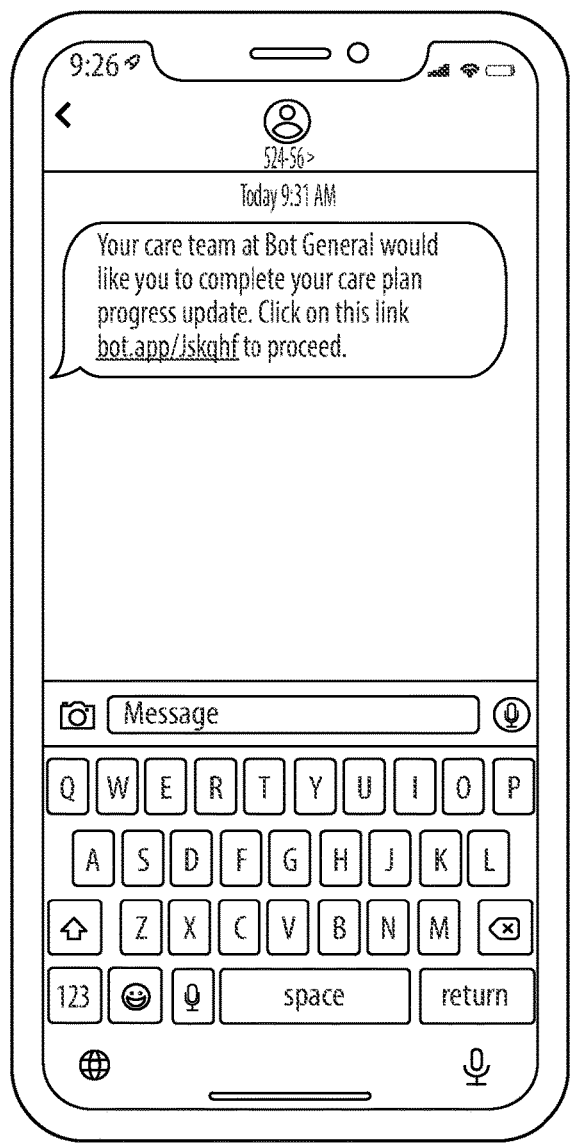
Figure 10C:
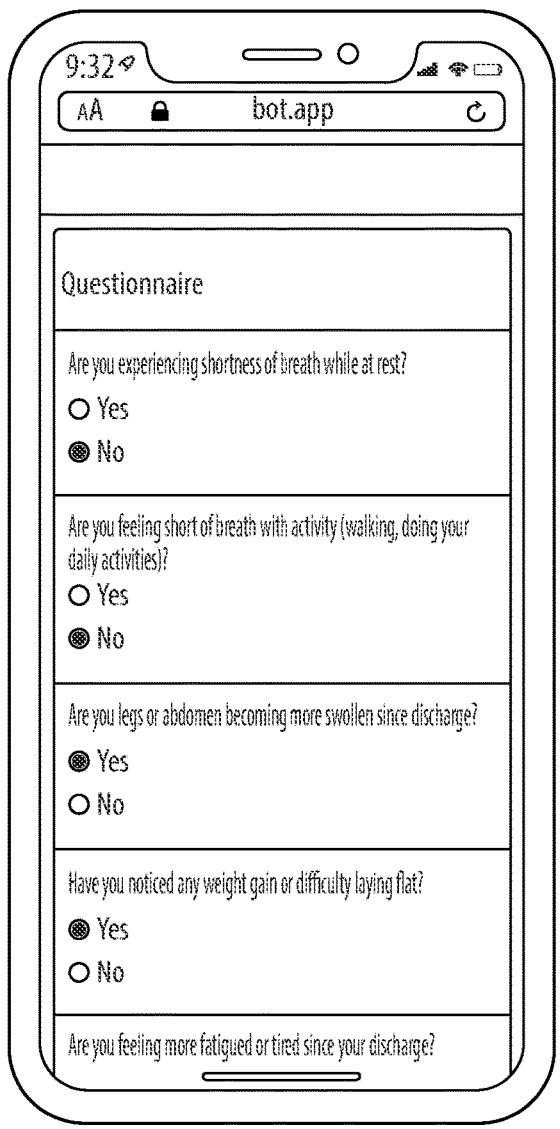
Figure 10D:
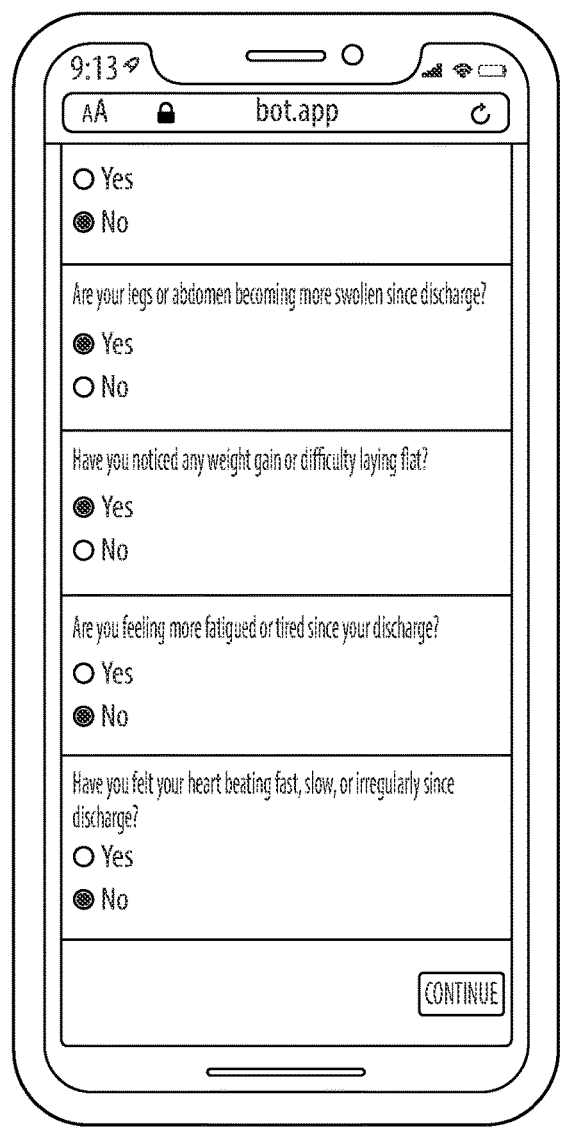

The system can then dynamically updates multiple patient lists for different care team roles based on priority for the ED or hospital care teams. Once the workup is completed, the system can automatically send the finished discharge summaries or care summaries to the patient's care team from the community. The system can also notifies the patient's care team of any lab orders that the attending physician may have ordered during the hospital episode (FIGS. 5A-5D). Within the hospital setting or the ambulatory setting for a scheduled visit, the system can allow the care team members to effectively communicate between them in a secure and safe communication environment. The system can allow the providers to accomplish this without having to leave the platform and allows the providers to exchange key clinical information between the team members (FIGS. 6A-6D). While the patient is still admitted at the hospital, the physician can use the system's virtual rounding platform to assess the patient's status (FIG. 7). The virtual assistant can presents a series of questions regarding the patient's well-being to facilitate the process (FIG. 8). The patient does not have to log in to web portal, and these surveys can be web forms and/or clicked links such that the patient need no account or data transfer/log in with the system. The system can output all the needed information to the patient without needing the patient to login providing an arms-length interface with patient. The provider can click on the patient in their auto-curated list to learn more about the patient status as depicted in FIGS. 9A and 9B. The system can send a notification not only for admission, but also at discharge, to providers from the community who provide care for the patient (e.g., the patient's PCP). Consequently, the dynamic patient lists can be further updated for the hospital care team to demonstrate the change in patient status.

After the patient is discharged, the system can allow the patients to be enrolled into the remote monitoring program. Based on the preferences of the hospital, the system can be configured to send out a customized enrollment form to sign up the patient into the program (FIGS. 10A-10D). Based on the provider's geolocation or their role at the facility, the system can curate a list of patients who are provided care by the provider using the remote patient monitoring system (FIG. 11). Embodiments can algorithmically organize patients into a user personalized list based on geolocation and priority for each care team member. Similar to the rounding system, the provider can click on patients to learn more information collected through connected devices and customized/configured forms specific to the care plan the patient is enrolled in (FIG. 12). The system can collect and presents patient information from the remote monitoring devices and questionnaires.

As part of the process the provider can invite other clinicians providing care for the patient including the patient's primary care provider or their specialist. By doing so, the patient and the provider can have the option to initiate a visit with each other (FIG. 13), the patients have the option to self-schedule for a visit (FIGS. 14A-14C) and/or invite other participants, such as other care team members, family members to the visit (FIG. 15). During this virtual visit, the provider can have the option to pull relevant clinical information, such as medication list, images, problem list right into the visit (FIG. 15). The providers can also have the option to pull information and forward it to other care members using the secure communication tool. (FIG. 16). This entire process completes the connected workflow, starting from the patient getting admitted to the hospital, getting the necessary care at the hospital to completely recovering utilizing the remote patient monitoring technology (FIG. 17).

Embodiments can include an AI based method to organize patients by geolocation for clinicians, where each clinician can access multiple patient lists that are personally tailored to them on the bases of their facility, location, role, shift, and patient attributes. Embodiments can include an algorithm which dynamically updates patient lists when patients are admitted, overseen, transferred, discharged, and remotely monitored; wherein, the patient lists change for each clinician role according to priority. Embodiments can include a system that displays multiple patient lists which clinicians can click through to organize workflows and the system can display patient information within an auto-curated list to the care team upon request. Embodiments can include a method in which an AI system dynamically builds care teams for advice and guidance.

Embodiments can include system that builds specific care teams for patients according to their specific symptoms. For example, if there is a patient that is meeting with their general physician and requires a certain specialist, the AI system can automatically determine which specialist to invite to the care team. Embodiments can include a method in which an AI system helps patients draw administrative tasks related to insurance and payments. Embodiments can include a system that effectively presents patients with a plethora of required forms and documentation that were previously facilitated by a member of the care team, compromising efficiency.

Embodiments include a user interface module (e.g., internet accessible software as a service for medical use) configured to determine or receive location information of a user and to modify a user interface as a function of the location (e.g., of a provider). Embodiments can change how the interface works, what functions are available, and the type of information that the provider and/or patient will see. For example, if a provider goes to a hospital, a hospital type dashboard can be provided giving them information relevant in a hospital setting. If in a home care setting, the provider may be able to see only a home care related dashboard, for example. Embodiments can include an option to manually switch between modes.

Either or both of the provider and the patient can be provided with different interfaces and/or information based on their location. Certain embodiments can include only location specific information for one or the other of the patient or the provider. Embodiments can be a cloud based service. Any suitable computer hardware and/or software module(s) are contemplated herein. As shown in FIGS. 18A-18D, embodiments of the system can include an emergency mode, and inpatient mode, a patient home setting mode, and an ambulatory setting mode. In certain embodiments, as shown in FIG. 18A, in an emergency mode, the system can send a notification that the patient has been admitted (e.g., based on being registered on a device at the hospital that is using the systems, e.g., at the hospital counter). The provider can be notified (e.g., via a text message) that their patient has been admitted.

In certain embodiments, as shown in FIG. 18B, the hospital can have a device (or the patient can use their own) that can connect to the system. In the inpatient mode, the system can be configured for the patient to use a device to allow the patient to talk with their provider and/or family/translator, etc. For example, this function can speed up and replace the traditional need for a doctor to visit a patient physically at their bedside, and allow multi party conferencing in a audio or video conference interface, for example. This can greatly improve inpatient care efficiency. On the provider's interface, inpatient relevant information (e.g., real time vitals, location in the hospital, nurse contact information, emergency diagnostic information, etc.) can be provided for the doctor to conduct a proper telehealth visit that is contextually meaningful.

In certain embodiments, as shown in FIG. 18C, on a device that the patient owns or the hospital provisions to the patient, a web link can be provided to access the system which can provide an at home care interface, and/or allow telehealth visits with ease. On the provider's interface, home care relevant information (e.g., recent medical data and diagnostic information, medications and dosage, etc.) can be provided for the doctor to conduct a proper telehealth visit that is contextually meaningful. This can allow for continued remote patient monitoring (RPM) for example.

In certain embodiments, as shown in FIG. 18D, in an ambulatory setting, the patient and the doctor can schedule and conduct tele office visits using a web accessible link. The providers interface can provide all relevant office visit information and the patient can be provided with a meeting invite and/or link to join the meeting. Any other suitable functions are contemplated herein.

Figure 19:
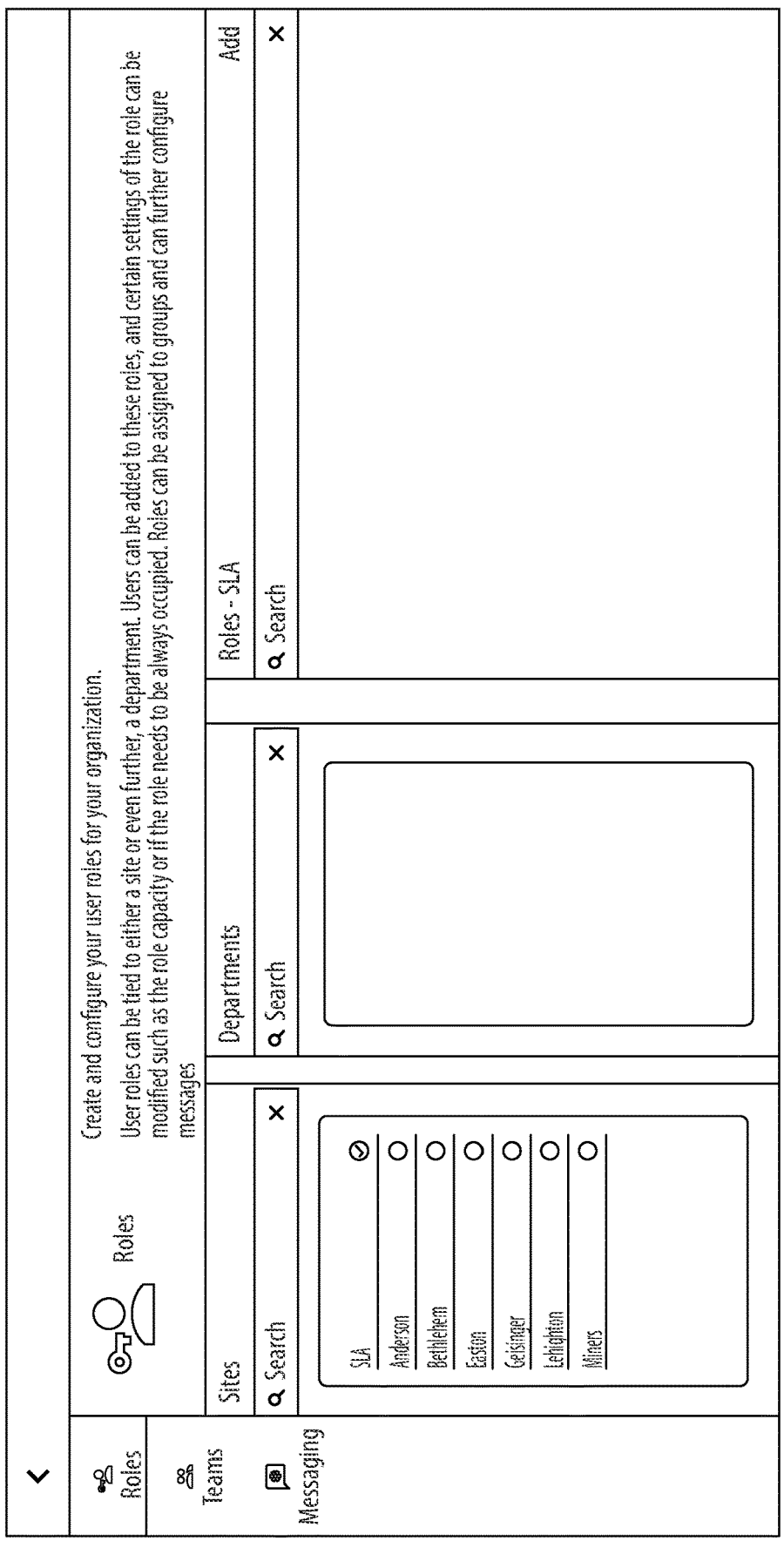
FIG. 19 shows a screenshot of an embodiment of a role interface, showing a pane having selectable options for sites such that when creating a role, the user (e.g., an admin) can select the organization site.

Referring additional to FIG. 19 and on, embodiments can include a virtual care team configuration system. For example, embodiments can include a dynamic tele-health platform that can configure care teams to assist providers in five pillars of virtual healthcare (virtual visits, community collaboration, secure clinical collaboration, virtual rounding, and remote patient monitoring). The system can read the organization, organization's site, and organization's location to create an enterprise taxonomy in a hierarchal list. The system can allow for users to utilize the taxonomy to assign care team members specific role(s) based on site, department (s), and shift. The system can link an executive enterprise user to each role for facilitated communication. By organizing roles into teams according to site, department, and shift the system can create an accessible care team to tend to any medical needs of the patient. With the system's team configuration, anyone necessary or desired for the patient's wellbeing can communicate to facilitate an allocation of updated information and discuss new steps to care for the patient. Care teams can provide the best possible care for patients by this rapid communication system and specifically organized roles to organize such taxonomy.

Embodiments can relate to the healthcare field, more specifically to medical practices and provider to patient organization. Embodiments can provide care team members with easy access to other providers and patient information through taxonomy configuration, which increases efficiency through streamlined communication.

Embodiments can include the process of gathering provider information such as site, department, schedule, and allows the enterprise to configure roles. The system can create/configure various teams. Embodiment can allow for easy provider-provider collaboration and provider-patient interaction within the five pillars of virtual healthcare.

In certain embodiments, the system can read site and department information to create and display a hierarchal list. Each list can be personalized to the organization, only displaying relevant sites and departments. The administrator (Admin) may select a specific site within their organization before choosing a department.

Figure 21:
FIG. 21 shows an embodiment of a role interface of FIG. 19, showing a pane having selectable options for existing roles such that the system displays roles already made in the department and organization site.
Figure 22:
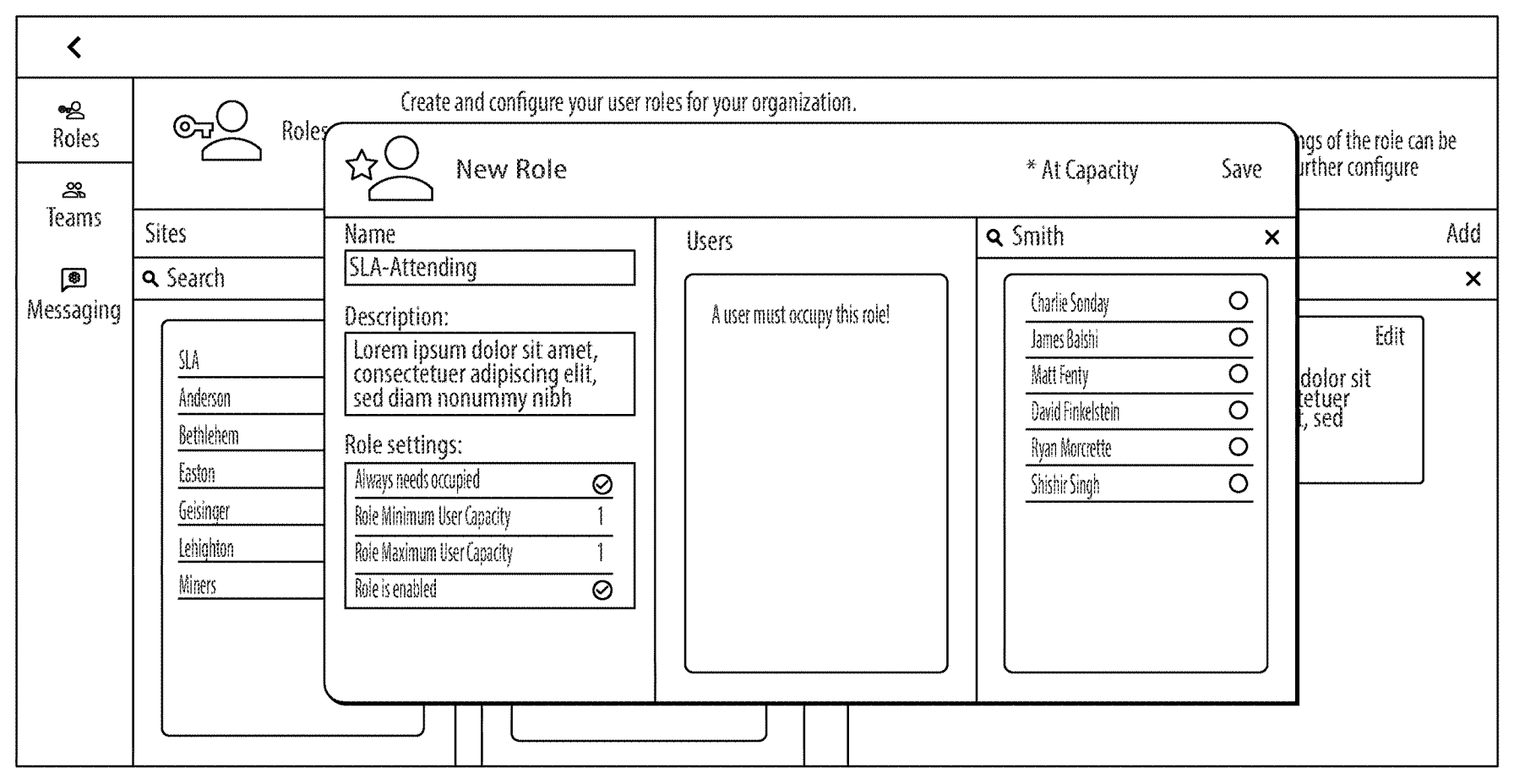
Figure 23:
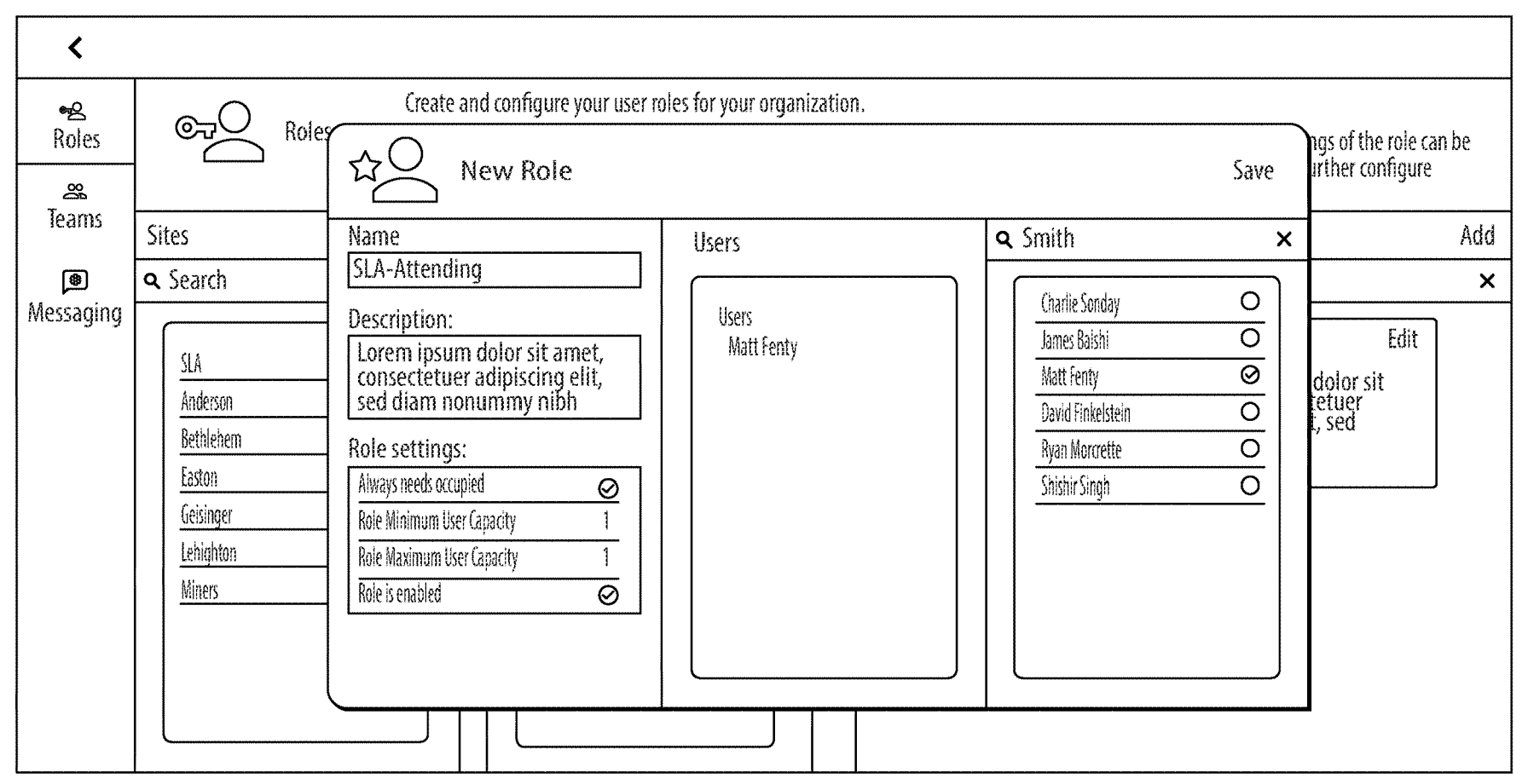
Figure 24:
FIG. 24 shows the embodiment of FIG. 21, showing the new role added to a list of existing roles.

Embodiment can includes the process of role creation and configuration. The admin can begin by selecting site(s) and department(s) from the preconfigured enterprise taxonomy (FIG. 19 and FIG. 20). Next, the system can display already existing roles before the admin chooses to create new role(s) (FIG. 21). When the admin chooses to create new roles, the solution can shows a list of healthcare providers that work in the selected department(s) for the admin to assign to roles. The admin can add a name, descriptors, and configures settings to each new role added. For each role, the system allows for the admin to attach an executive enterprise and certain shift hours (FIGS. 22-24). Embodiments, therefore, allow clinicians to save time and contact other members of the care team efficiently without having to reach out to multiple people to see who is working in a specific capacity that day.

Figure 25A:
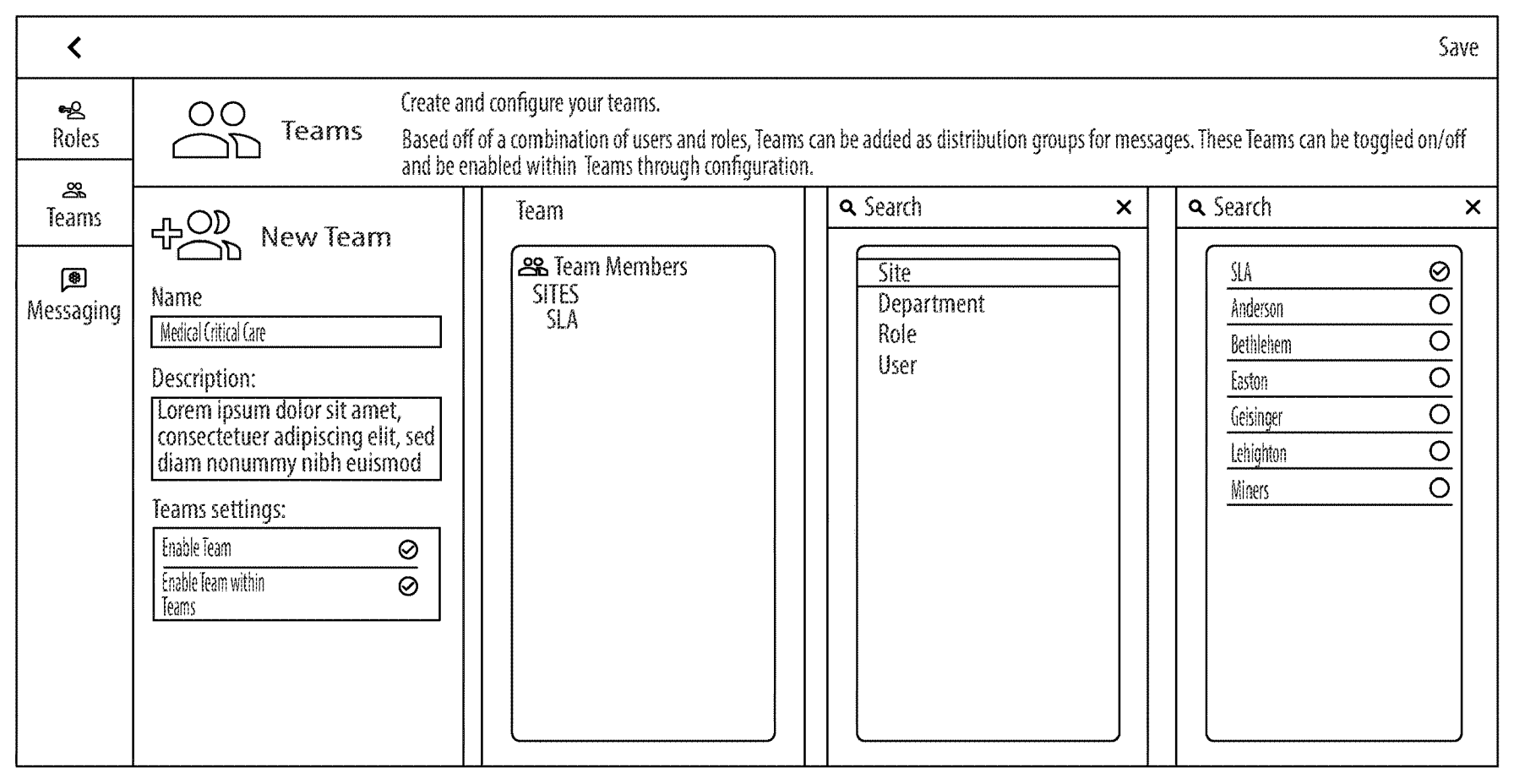
Figure 26A:
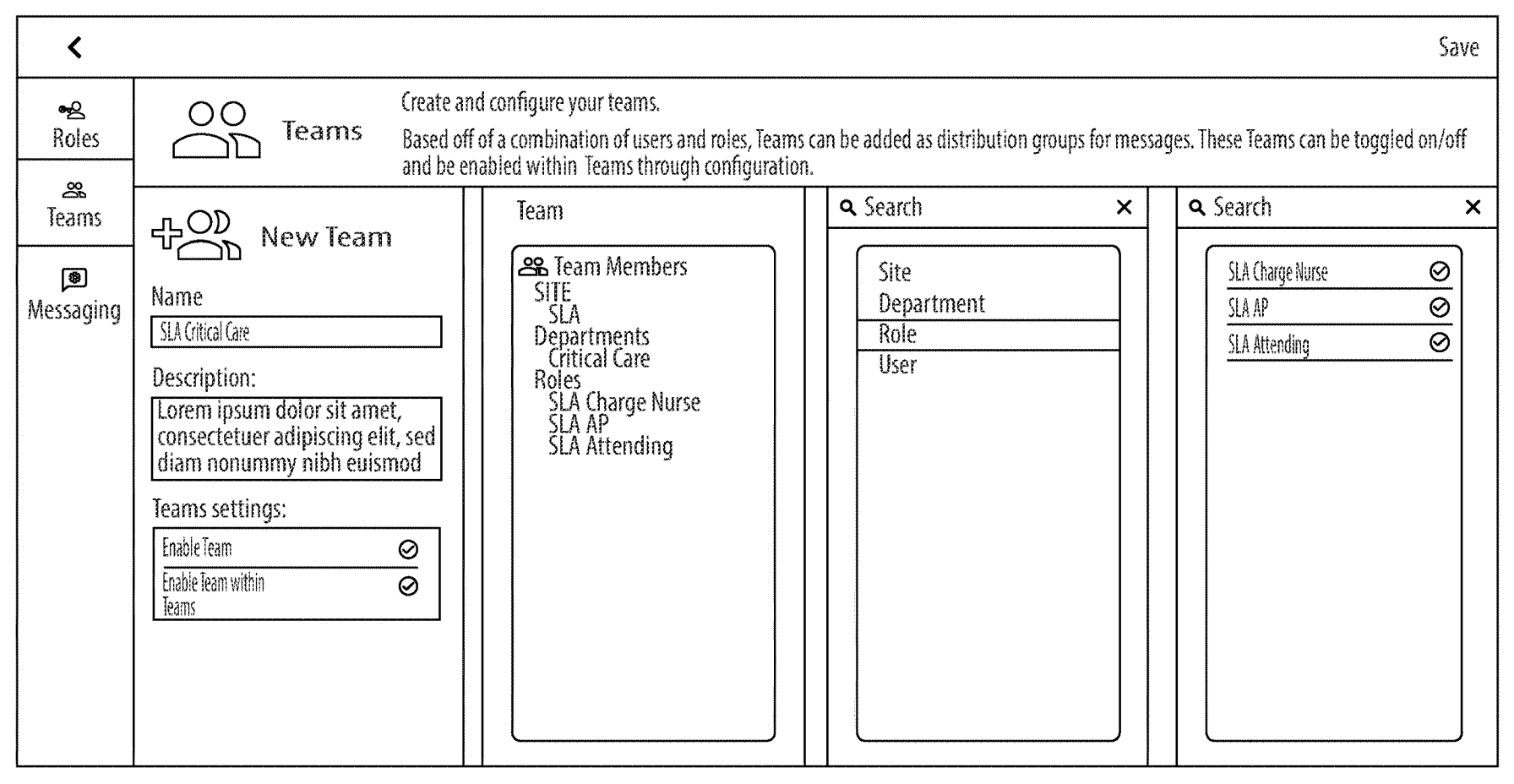
Figure 26B:
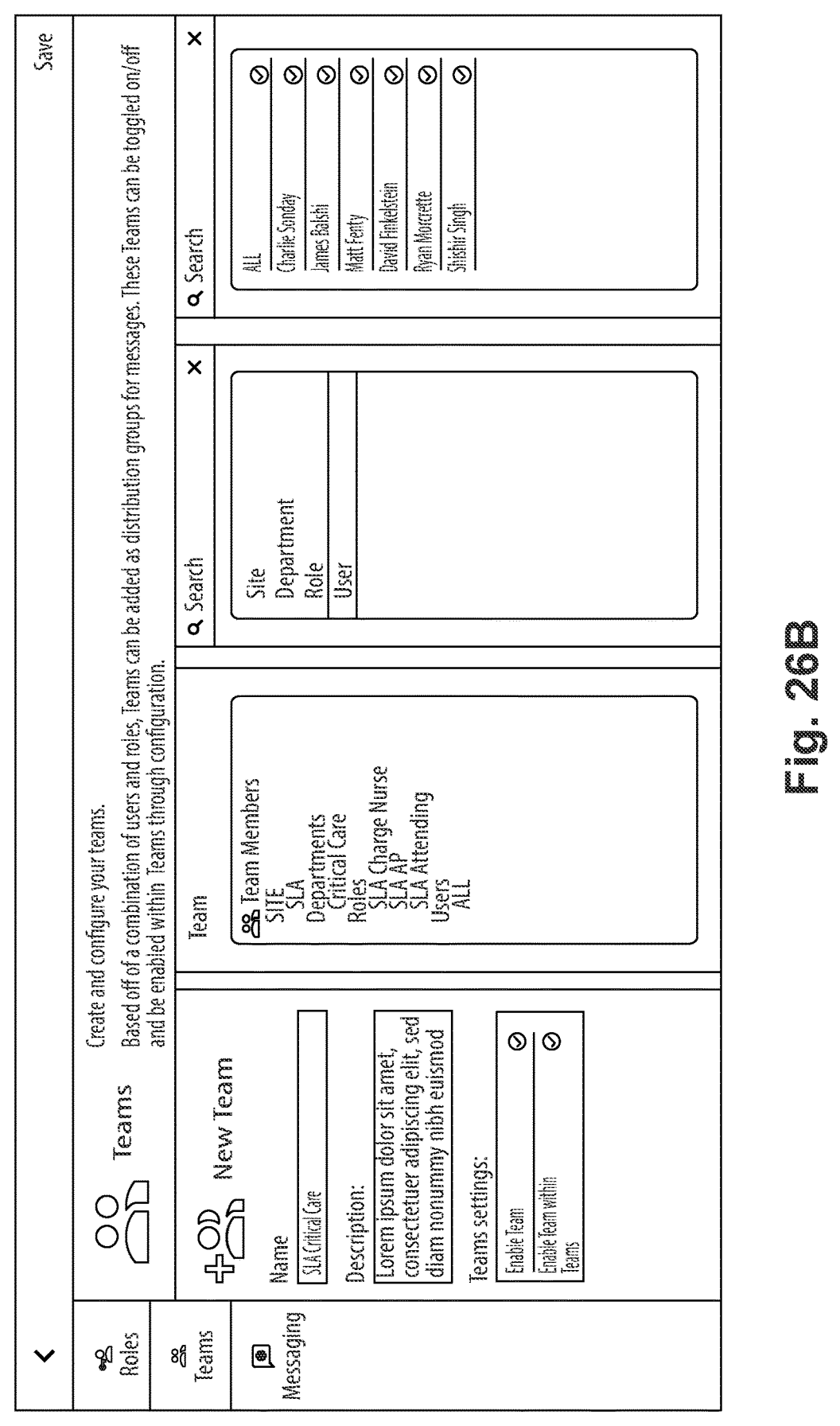
Figure 26C:
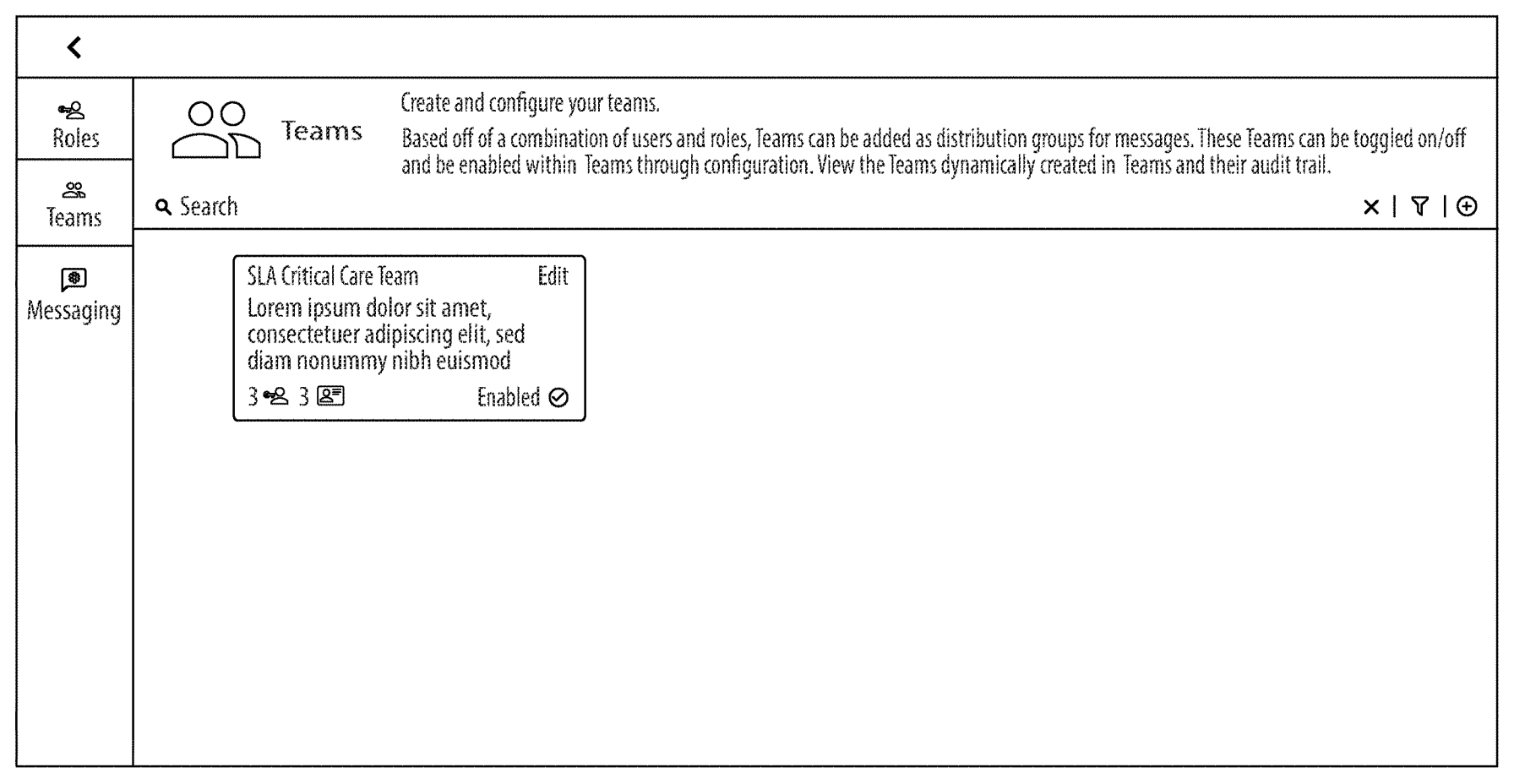

After creating roles, the system can allow for the admin to configure teams with the created roles. The admin specifies which site(s) and department(s) from the preconfigured enterprise taxonomy are relevant to the created team (FIGS. 25A and 25B). The admin can then adds a name, descriptors, and settings, before adding relevant roles and users to the team (FIGS. 26A-26C). Configured teams can facilitate many pillars of virtual healthcare.

The process of virtual rounding can be made easier with the solution's teams. When patients are being rounded by providers, they can be automatically put into meetings with configured care teams according to role and shift, rather than manually contacting and adding care team members. The solution can facilitate the rounding process by bringing in providers, translators, family members, and anyone relevant to the patient's care in a quicker and more efficient manner.

Remote patient monitoring can also be made more efficient by team configuration. When patients are being monitored from home, remote patient monitoring (RPM) devices can gather patient information to send to care providers in hospital. When patient data is gathered from RPM devices, the system can automatically forward information to pre-configured team members. Rather than manually choosing relevant care team members, embodiments save time and create efficiency by sending information to pre-configured teams.

Embodiments can aid the virtual visit process as well. When a patient schedules a virtual visit, scheduling with patient providers can be a long and tedious process to locate necessary providers and determine their availability.

Embodiments can provide an efficient team configuration system where patients can easily meet with specific care team members because the system can invite members based on roles, shift, and patient needs.

Figure 27:
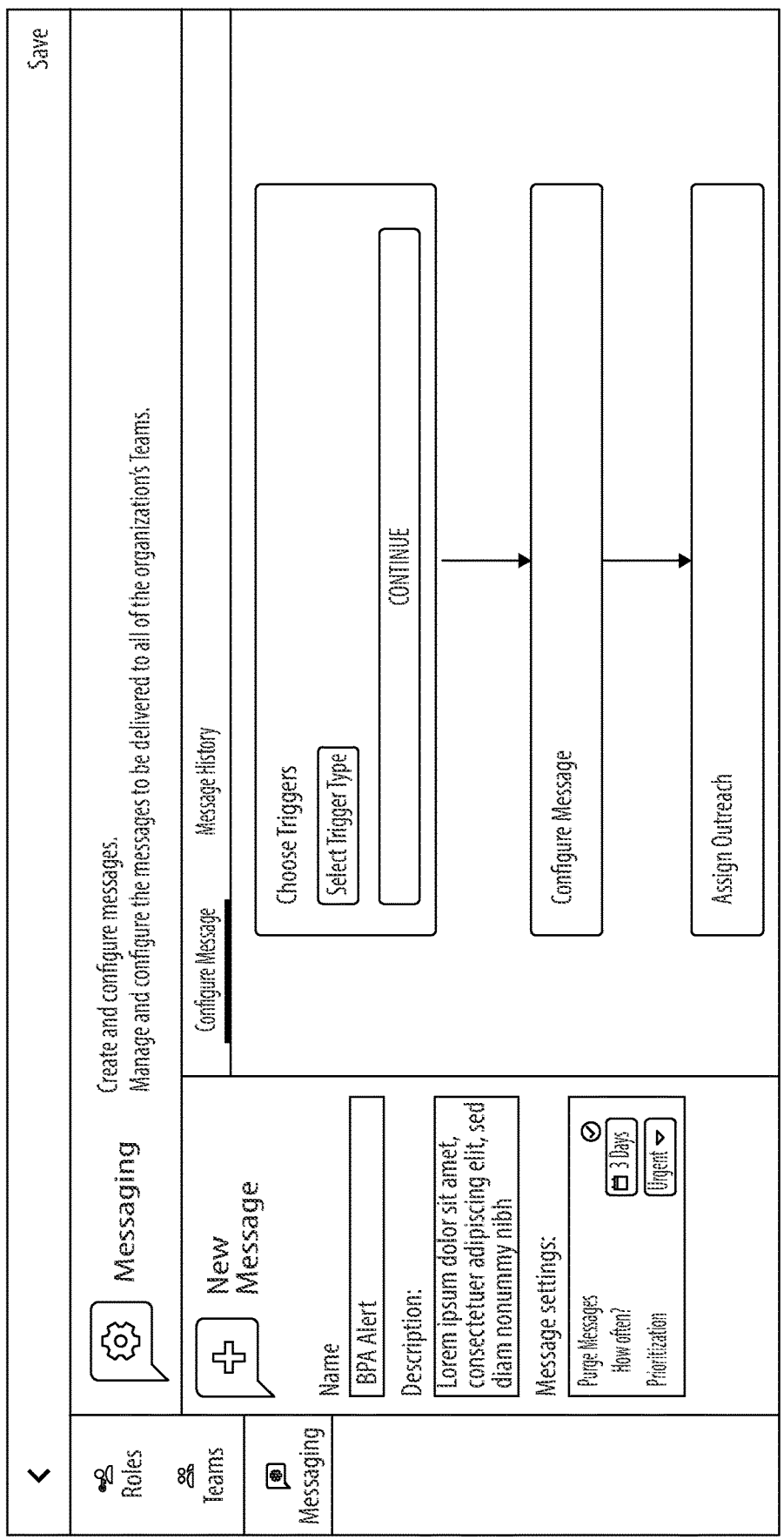
FIG. 27 is a screenshot of an embodiments of a messaging configuration interface showing creating a new message template, e.g., wherein the user can add a name and description and configure settings for the message.
Figure 28A:
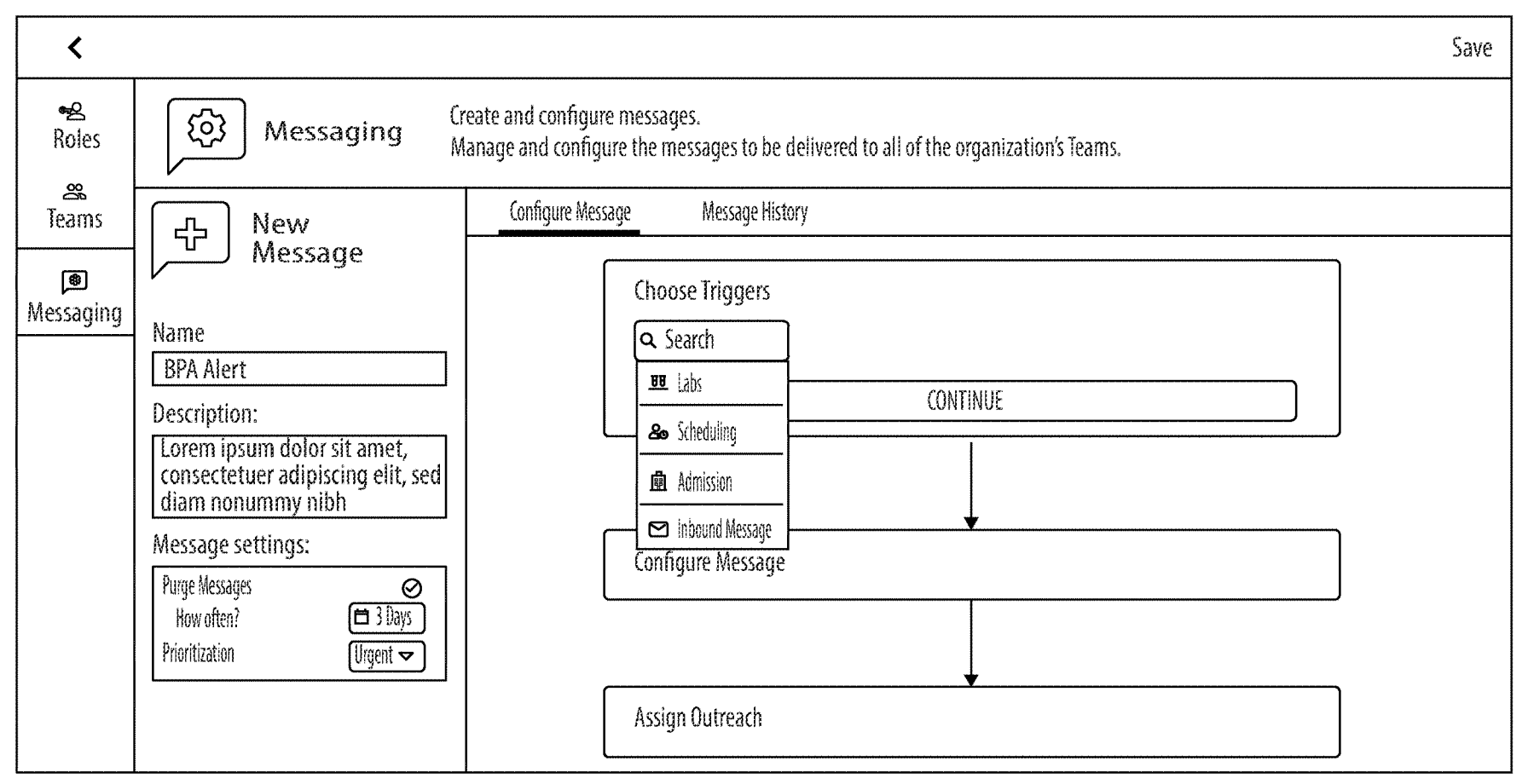
Figure 28B:
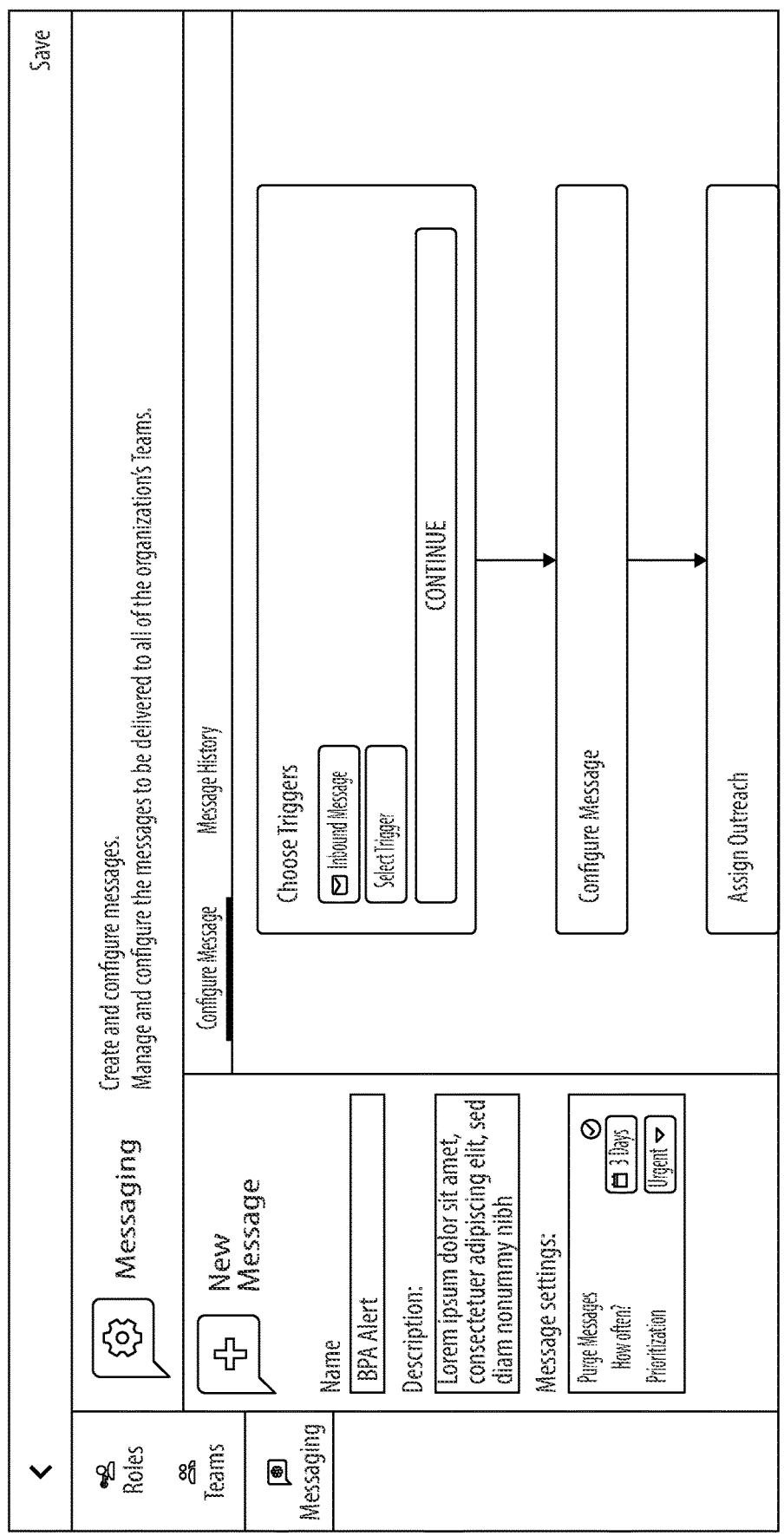
Figure 28C:
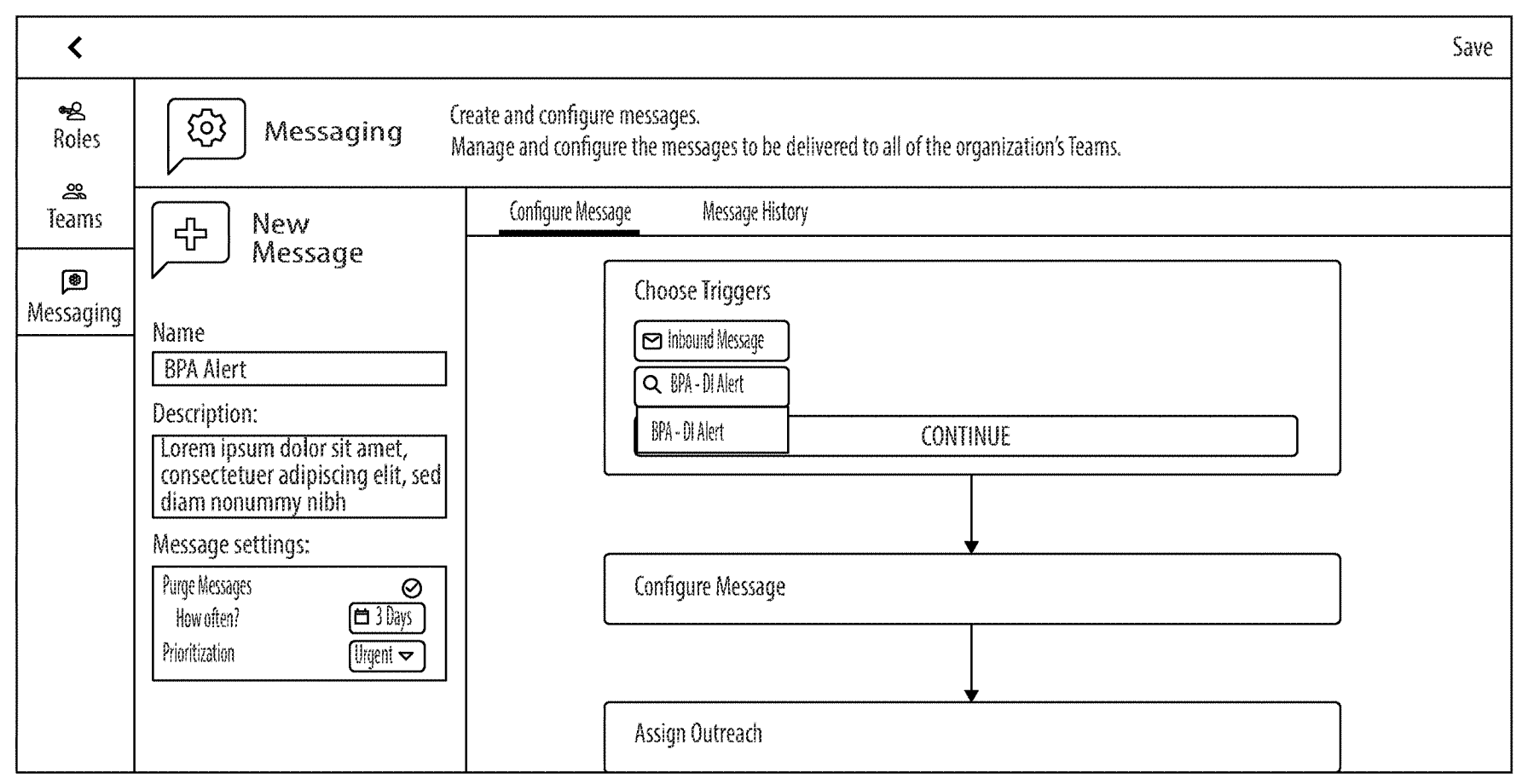
Figure 28D:
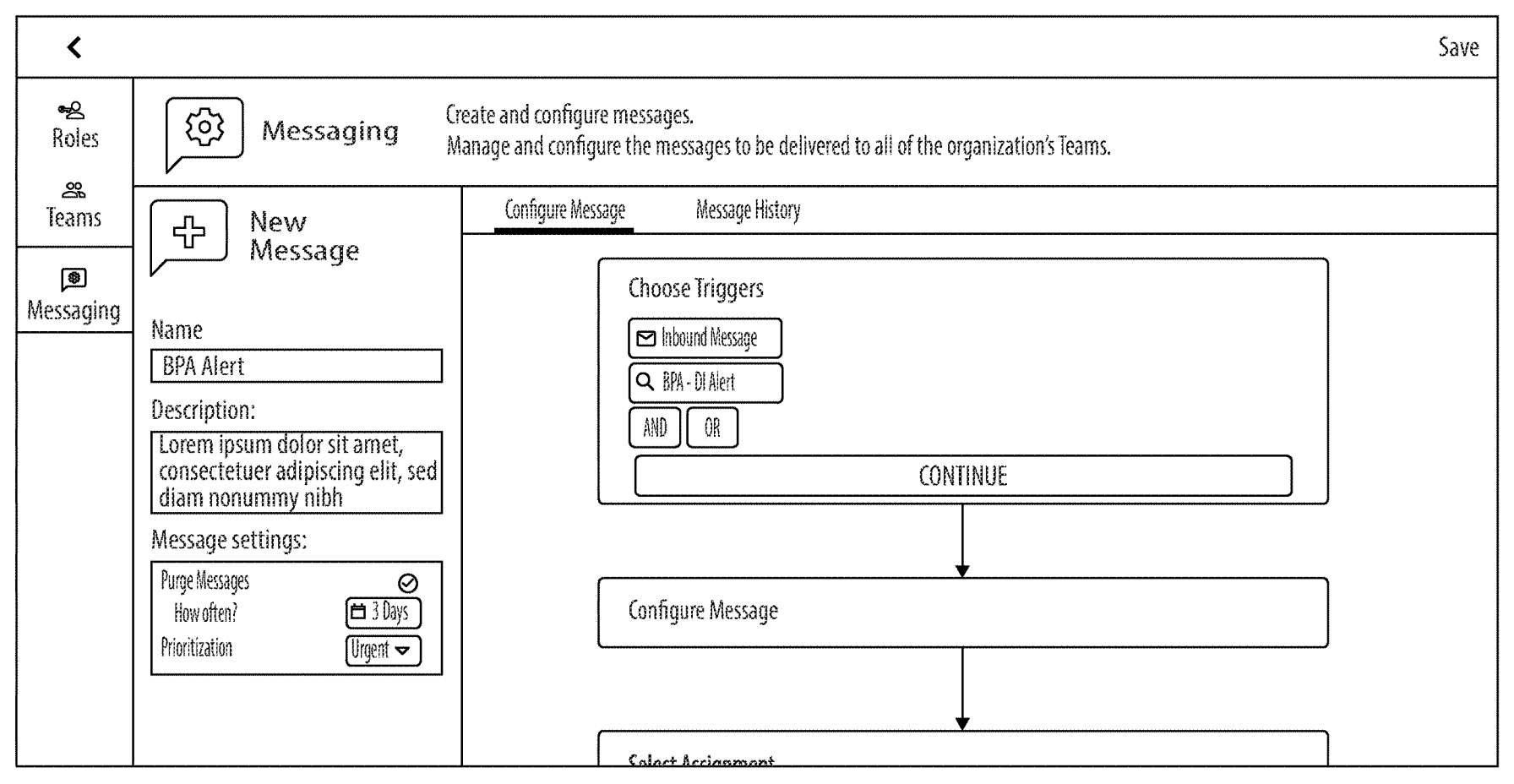
Figure 29:
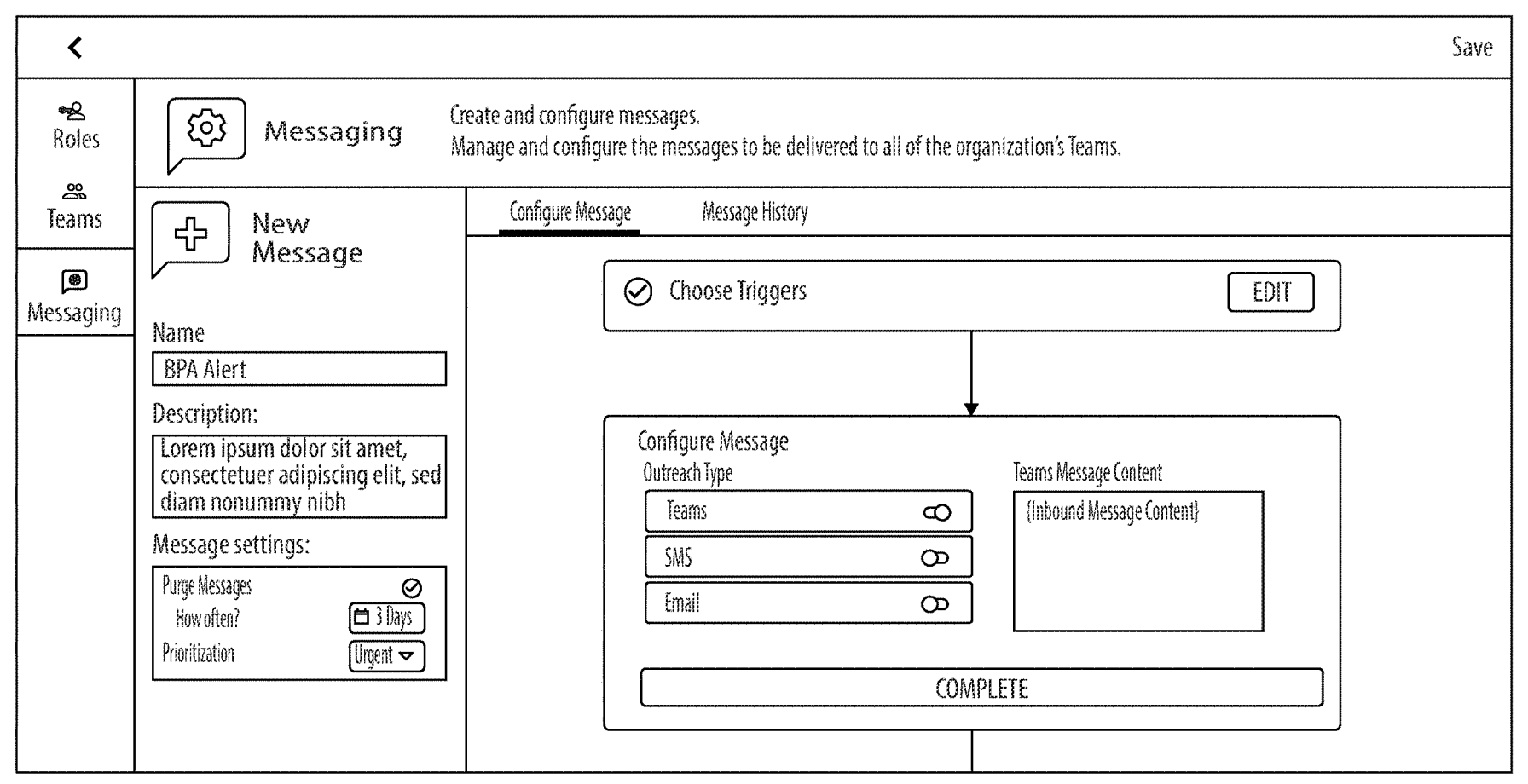
Figure 30A:
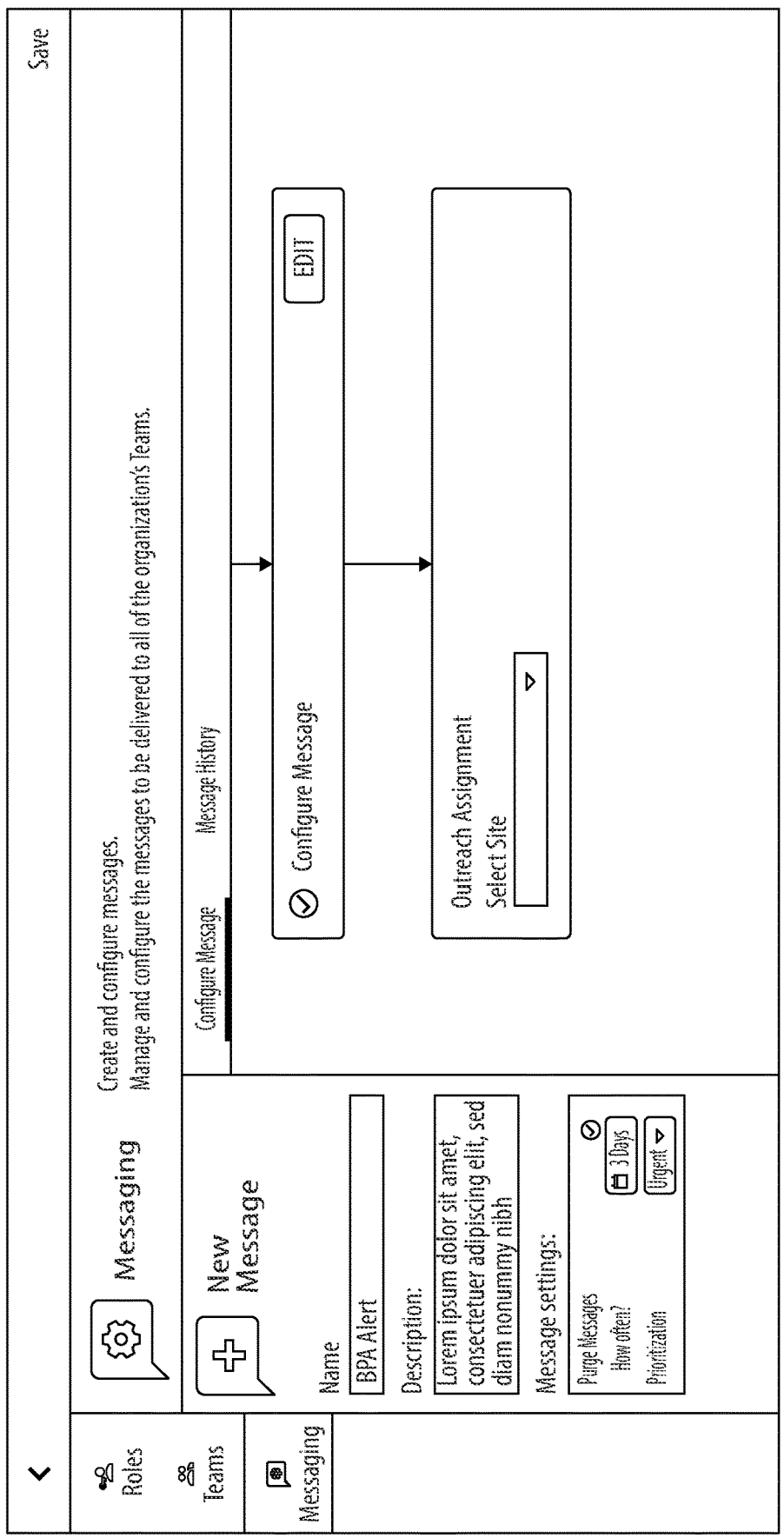
Figure 30B:
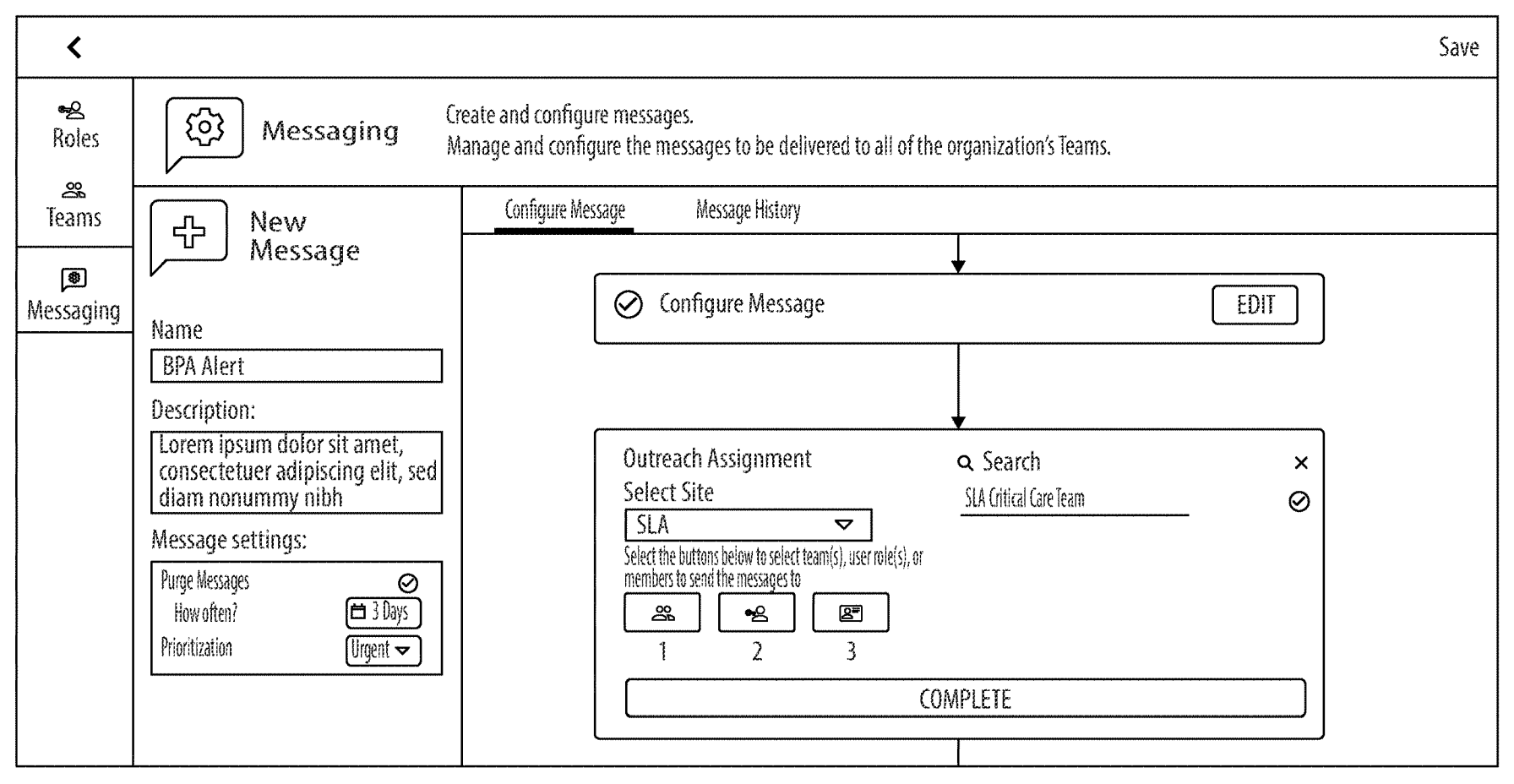
Figure 30C:
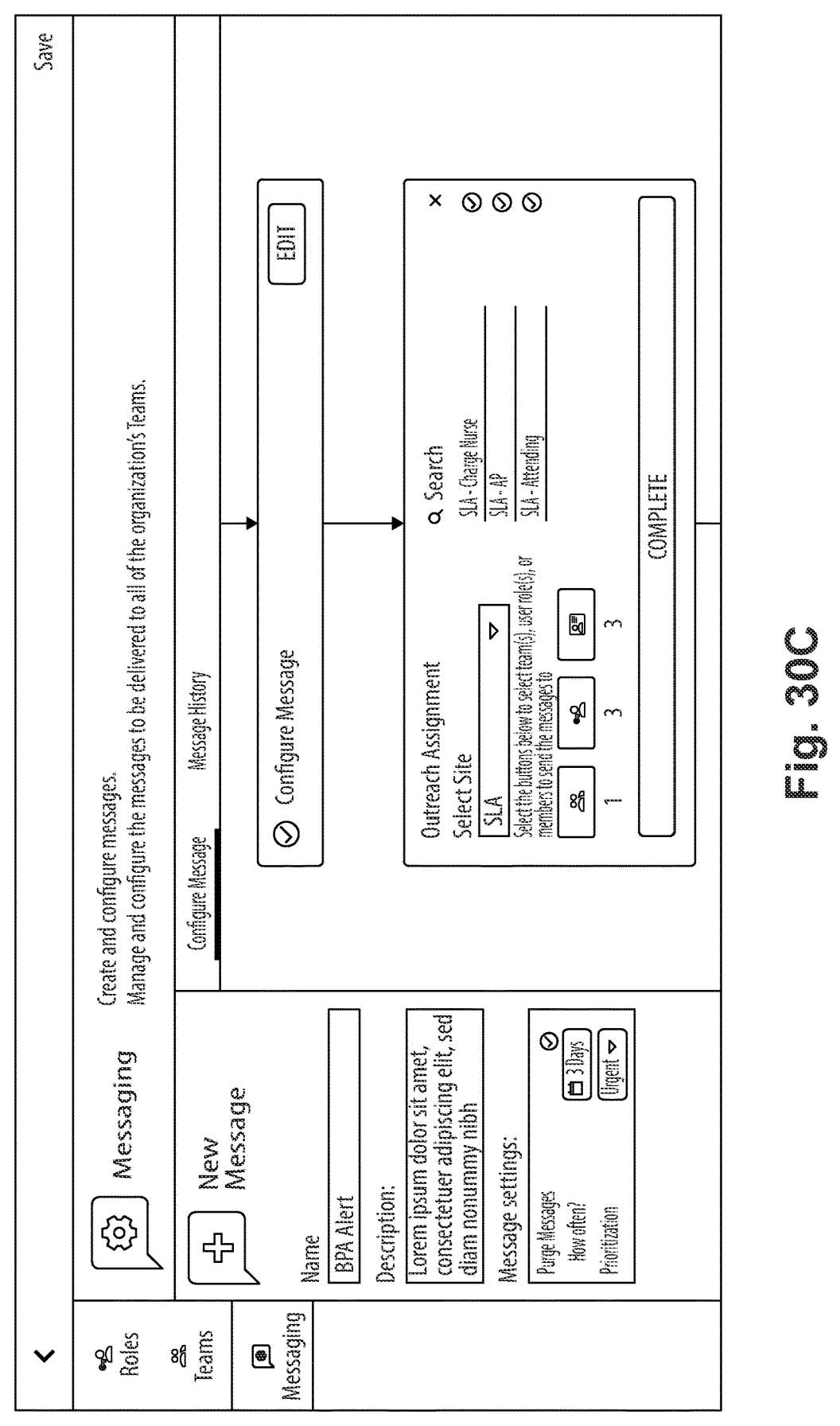
Figure 30D:
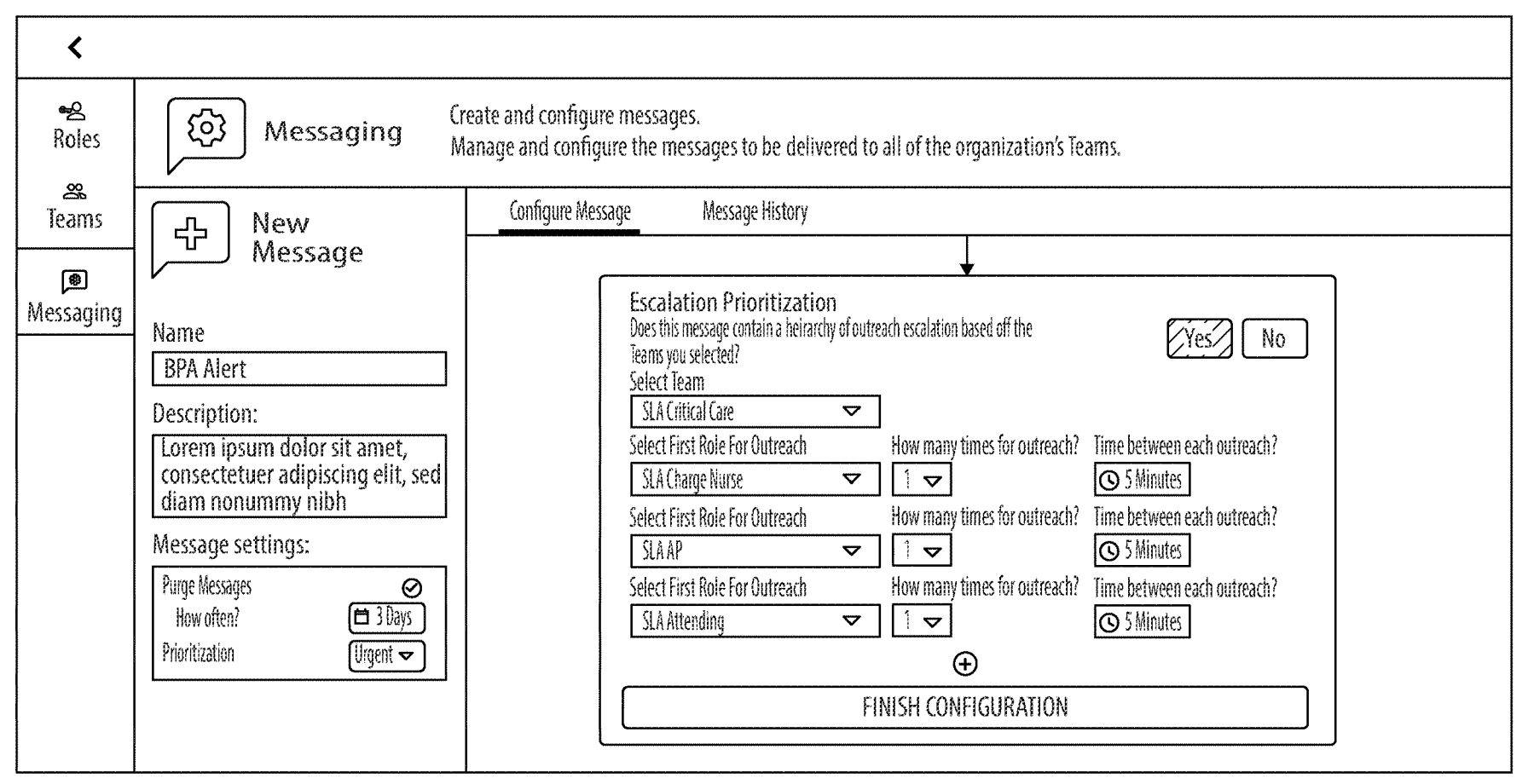
Figure 31A:
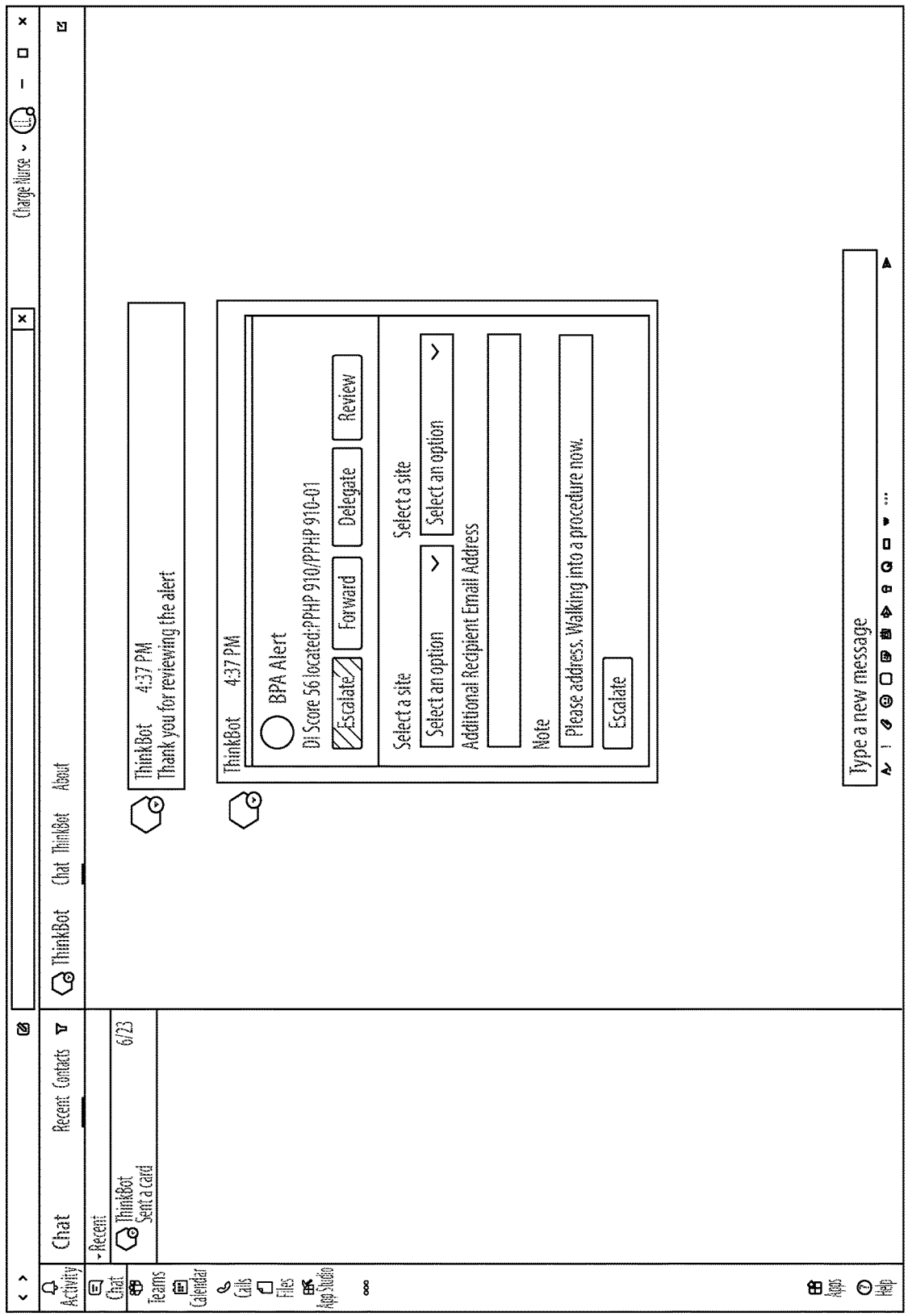
Figure 31B:
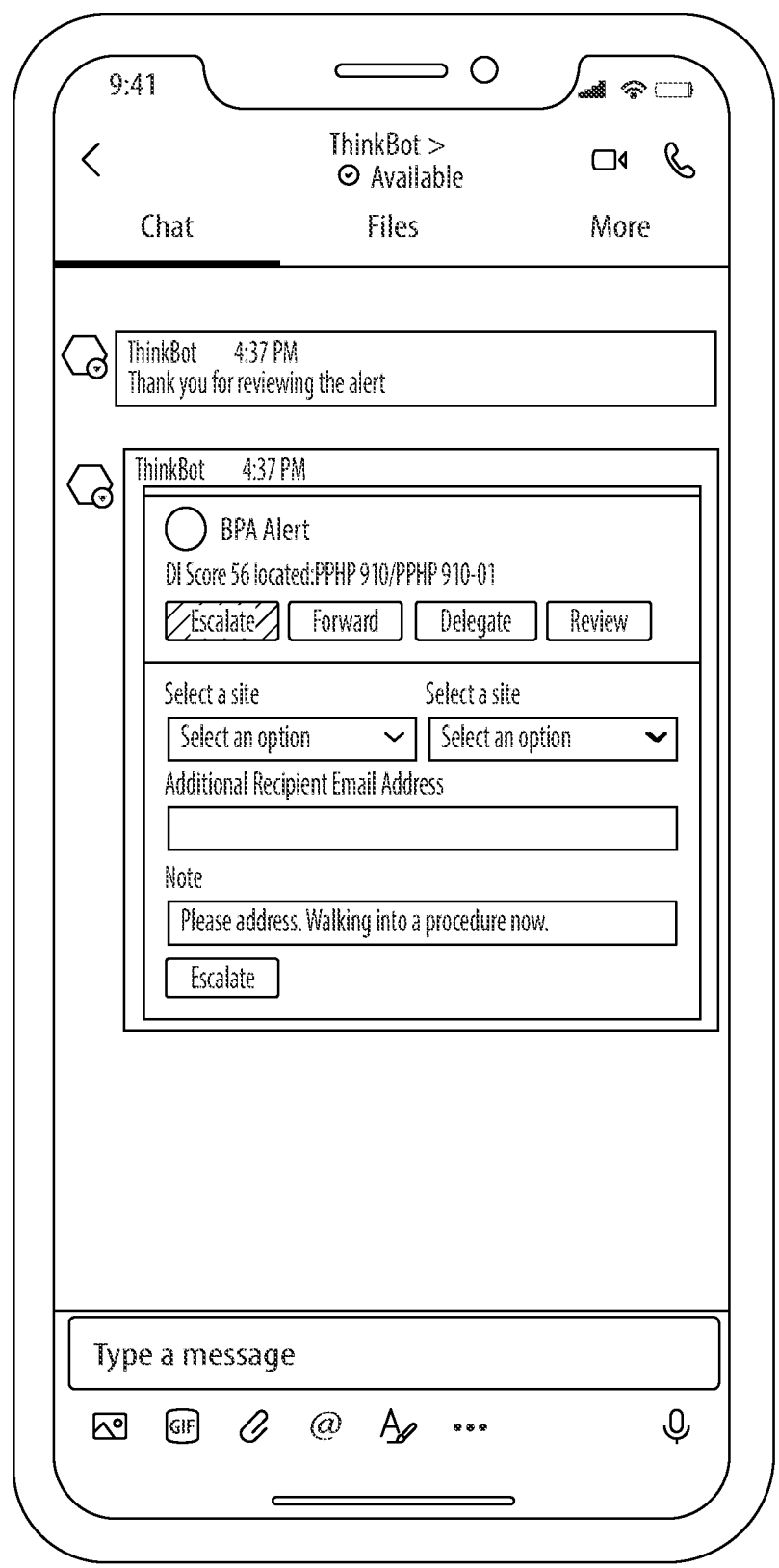
Figure 32A:
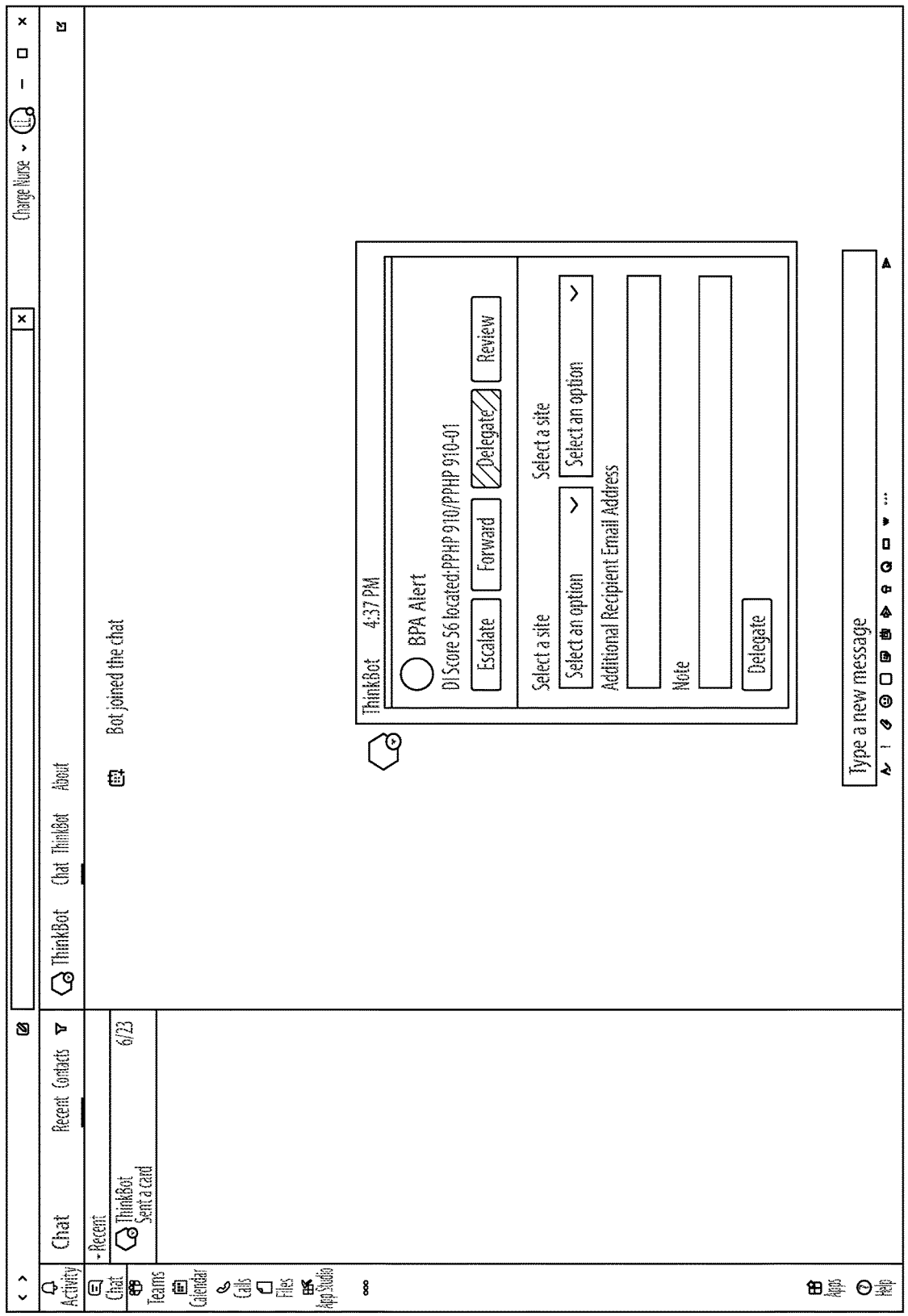
Figure 32B:
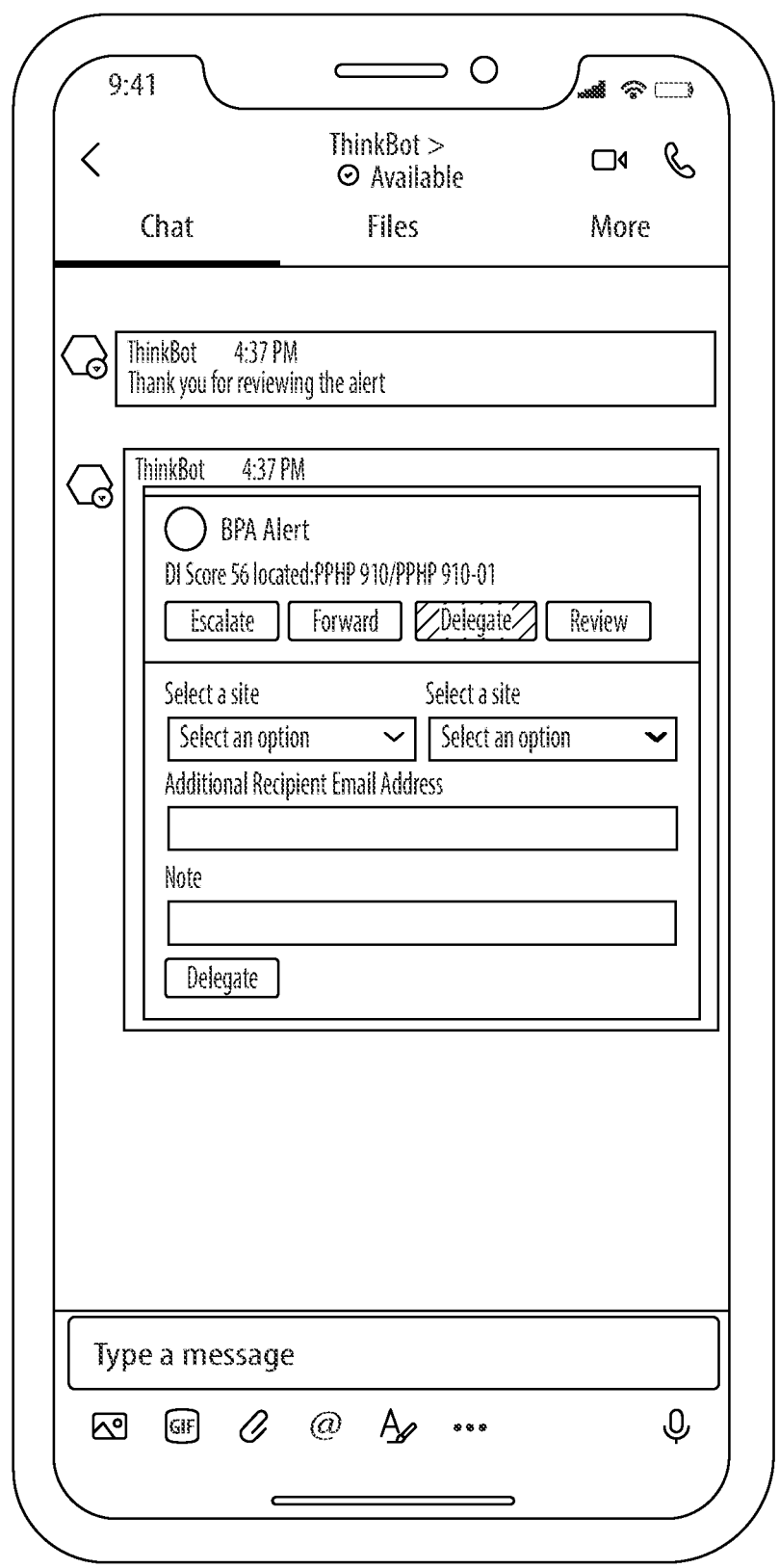
Figure 33A:
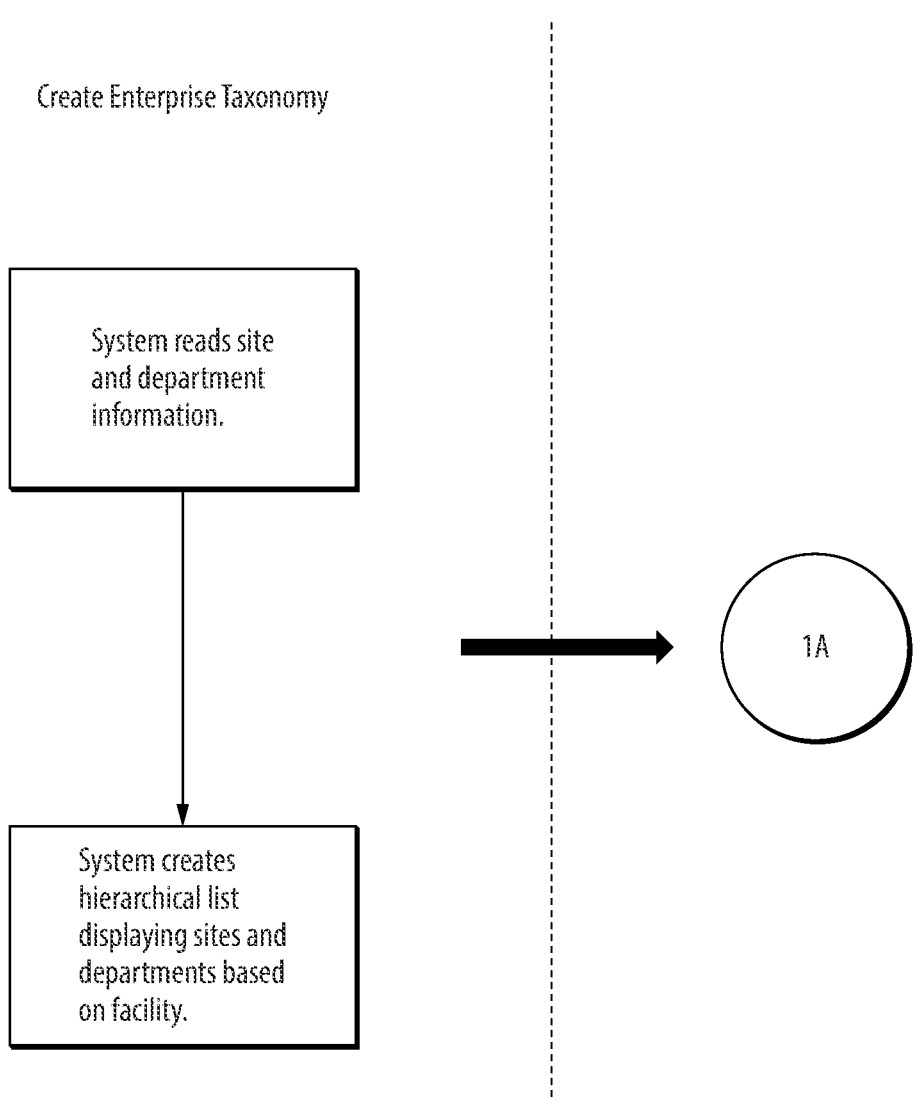
Figure 33B:
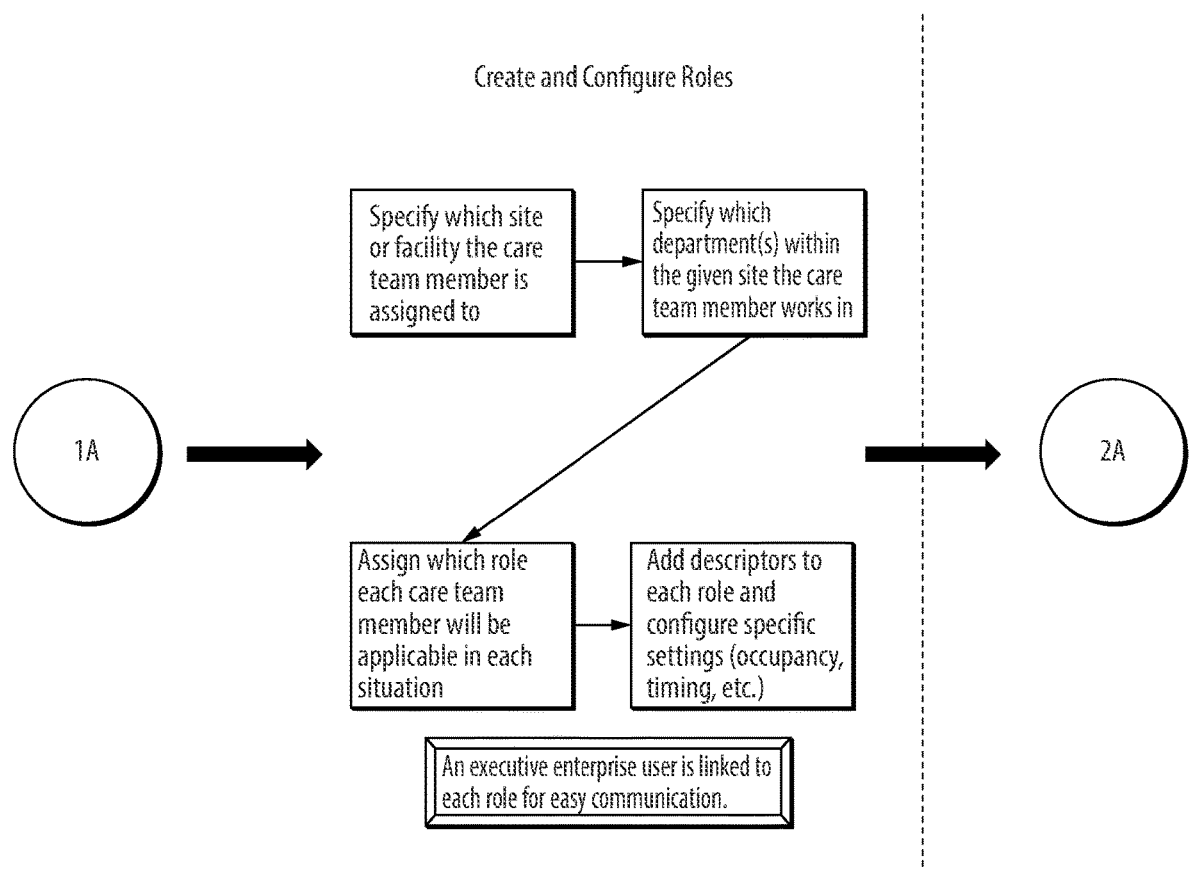
Figure 33C:
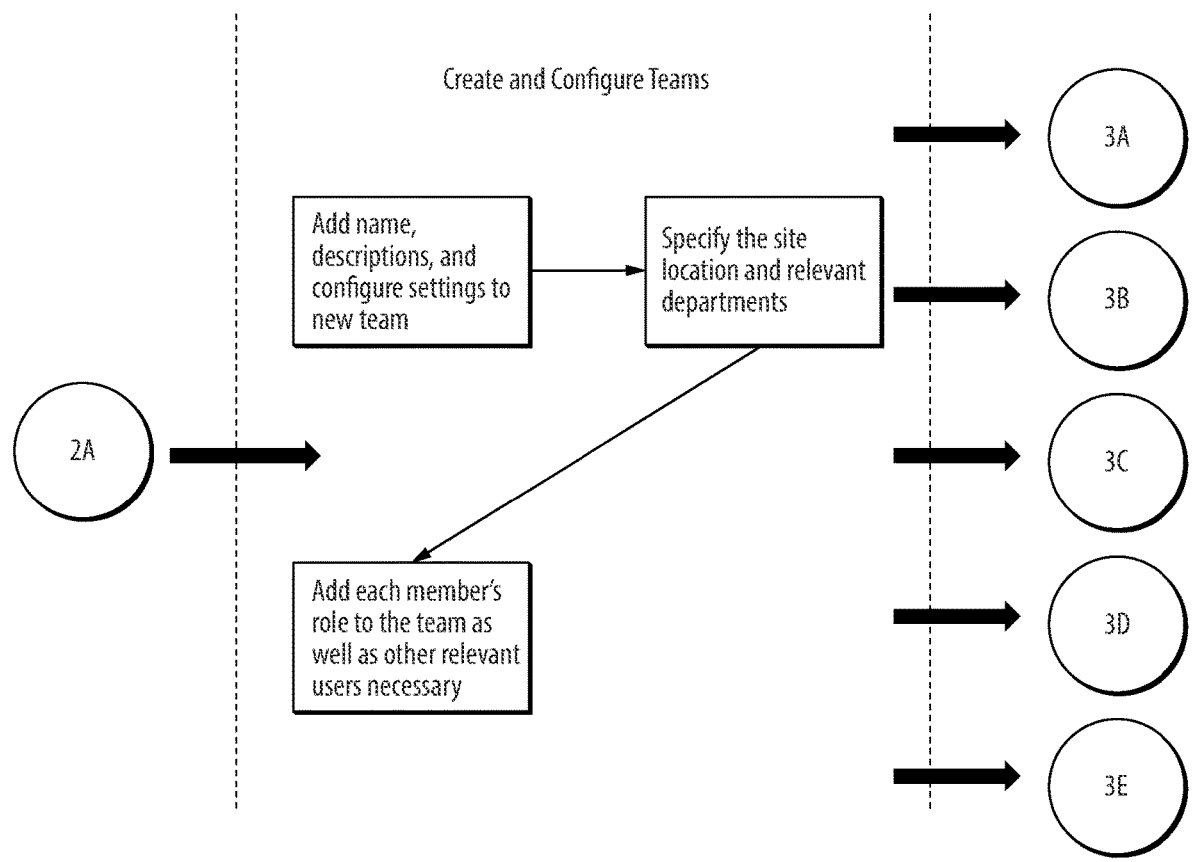
Figure 33D:
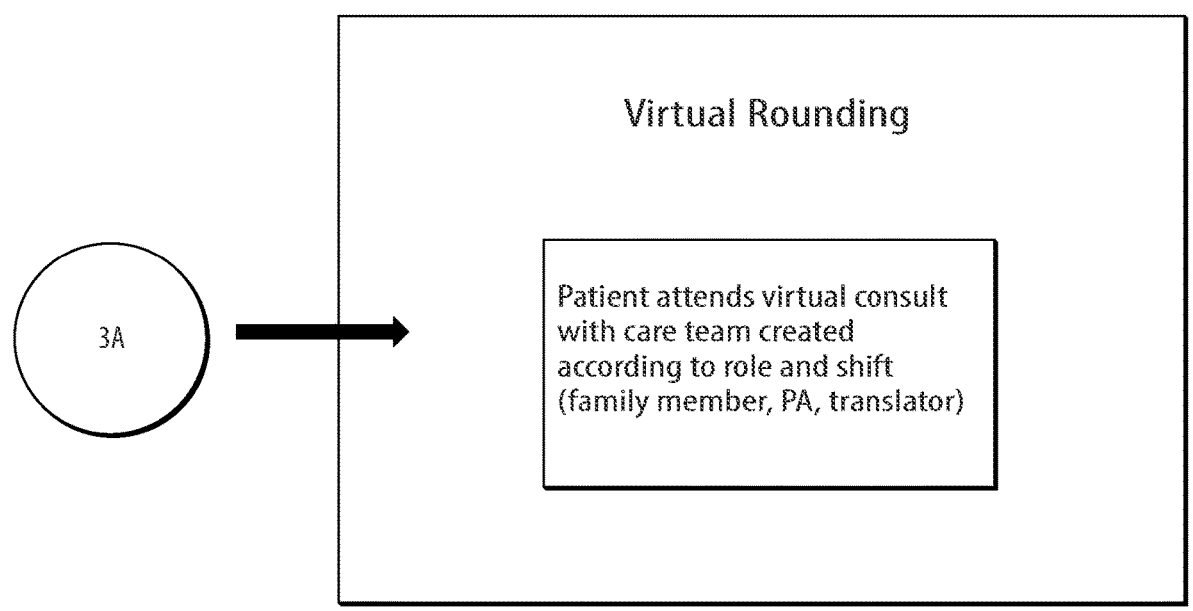
Figure 33E:
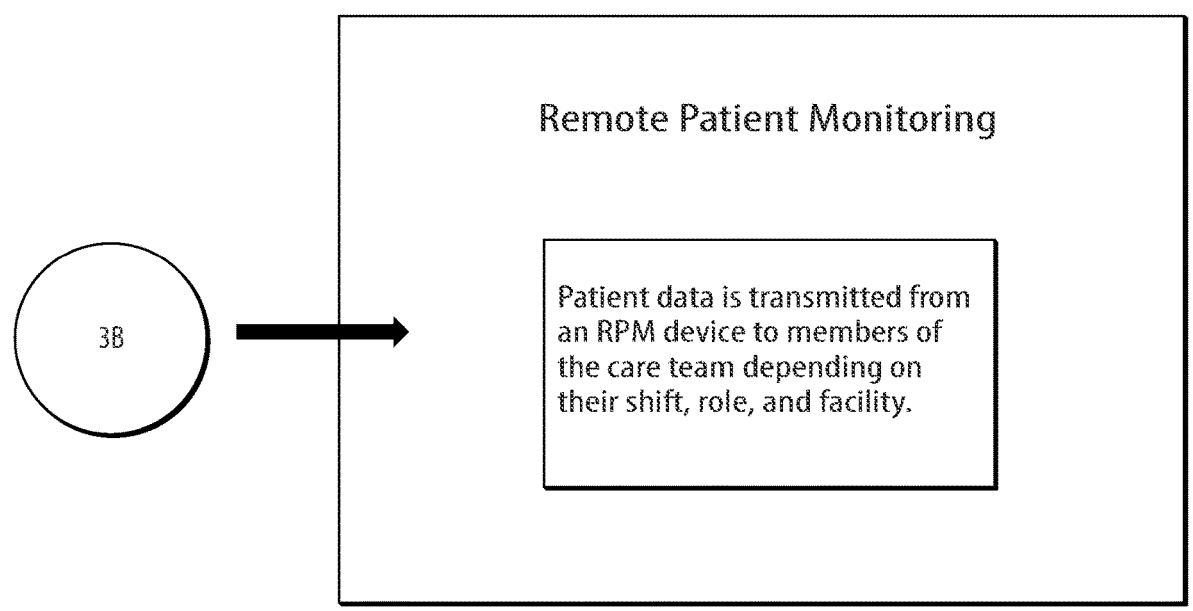
Figure 33F:
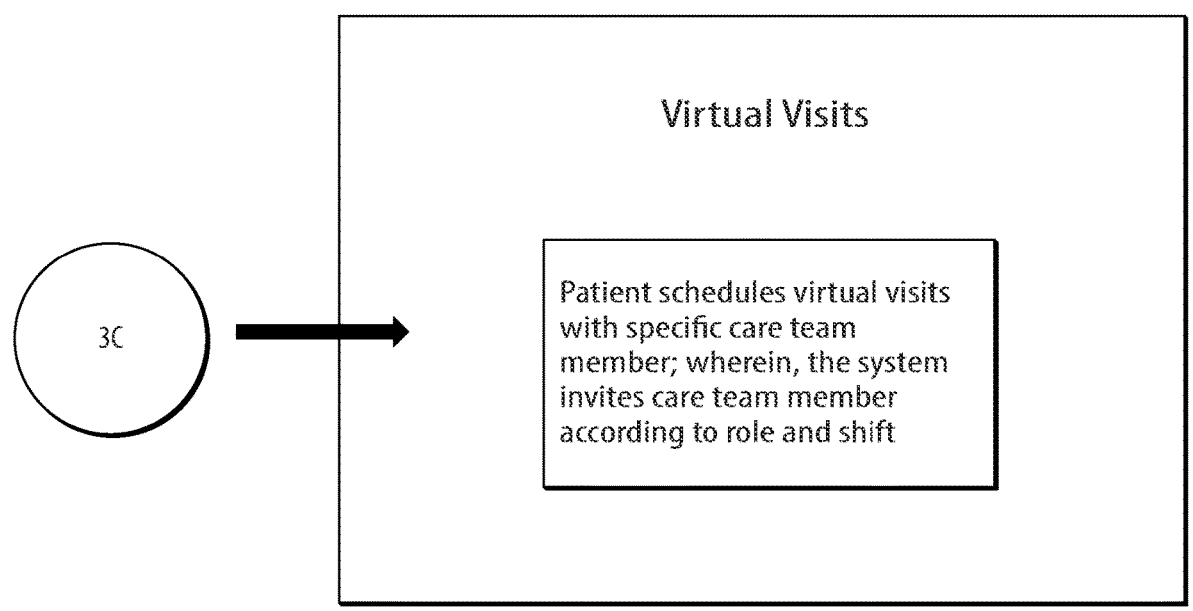
Figure 33G:
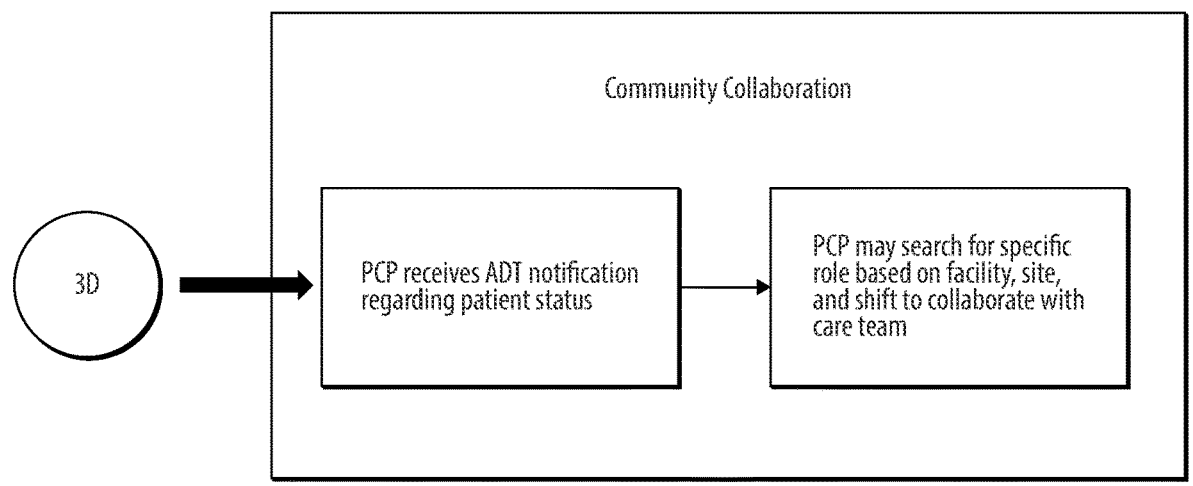
Figure 33H:
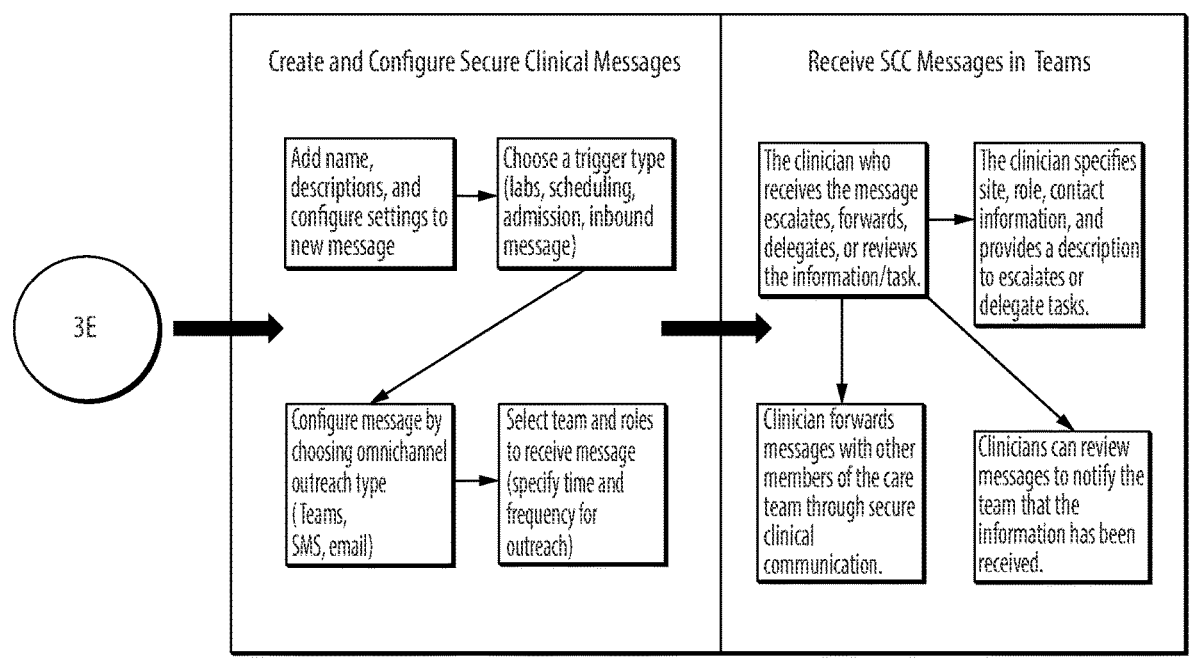

Community collaboration can be facilitated by embodiments as well. For example, if a patient is admitted into an emergency department, the primary care physician can receive an ADT alert notifying the physician of their patient's status. Should the physician want to collaborate with the attending physician in the emergency department, embodiments can allow the PCP to directly contact the attending physician through a search function, for example. Thus, embodiments provide a more efficient way to notify individuals based on their role and shift. The system can also aid secure clinical messages. When providers need to communicate with each other, they can be able to efficiently send secure messages that are HIPPA compliant. These are created by adding names and descriptions in the portal and configuring the message settings, such as repetition and priority (FIG. 27). Next, the user can be prompted to select a trigger type, such as labs, scheduling, admission, or inbound message (FIGS. 28A-28D). From there, the message can be configured by choosing an omnichannel outreach type, such as Microsoft Teams, SMS, or email (FIG. 29). Lastly, teams and roles can be selected to receive the message at specific times and frequency (FIGS. 30A-30D). The clinician who receives the message can escalate, forwards, delegates, or reviews the information or task. They can specify the site, role, and contact information, and provide a description to escalate or delegate tasks (FIG. 31A-32B). They can also forward messages with other members of the care team through secure clinical collaboration. Lastly, they can review messages to notify the team that the information has been received. Embodiments can provide an effective way to send mass messages at various frequencies, as well as being HIPPA compliant.

In accordance with the above, embodiments can include an AI-based method in which roles and shifts are assigned to members of the care team based on their schedule. Embodiments can include an algorithm which allows the system to understand the site, department, schedule, and allows the user to configure roles. Embodiments can include teams to facilitate coordination between various roles within the healthcare system. Embodiments can include an algorithm that dynamically allows for easy provider-provider collaboration and provider-patient interaction within the five pillars of virtual healthcare. Embodiments can include an algorithm that sends messages to specific roles and allows escalation, forwarding, delegation, or review of messages based on configurable logic.

While the trademark ANDOR, ANDOR HEALTH, THINKANDOR, the Andor Logo (the design shown), and/or other uses including the term ANDOR may be depicted in the drawings, it is noted that these are trademarks of the Applicant and are not descriptive of embodiments of this disclosure. Applicant reserves all trademark rights to all trademarks to the above marks and/or any other depicted marks.

Embodiments can include any suitable computer hardware and/or software module(s) to perform any suitable function (e.g., as disclosed herein). For brevity, each field and type thereof shown in the drawings are not described in detail. Any suitable fields (e.g., type fields, drop down menus, buttons, switches, etc.) for data input and/or selection are contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A virtual care system, comprising:
    a first device having first location information;
    a patient mobile device;
    a remote monitoring device;
    a location module configured to receive the first location information from the first device and provide a location status having a first value when the first device is located within a first area within a hospital setting and defined by a first geofence and a location status having a second value when the first device is located within a second area defined by a second geofence;
    a user database containing a plurality of users, wherein each of the plurality of users has an associated location, associated shift data, and associated role data;
    a patient information module adapted to provide a patient portal for receiving patient specific symptoms associated with a patient, to provide a link to the patient portal to the patient mobile device, to provide the patient specific symptoms to a care team module, and to receive data from a remote monitoring device;
    the care team module adapted to receive the location, role data, shift data associated with each of the plurality of users and provide a custom care team to the graphical user interface module based on the patient specific symptoms;
    a graphical user interface (GUI) module configured to receive the location status, to receive the custom care team, to receive the remote monitoring device data from the patient information module, to generate a first medical provider user interface accessible via the first device when the first device is located in the first area and to generate a second medical provider user interface accessible via the first device when the first device is located in the second area, to display the custom care team;
    wherein the first medical provider user interface includes a plurality of first interface characteristics associated with the first area, including a room in the hospital setting in which the patient is located;

wherein the second medical provider user interface includes a plurality of second interface characteristics associated with the second area, including information related to the remote monitoring device data; and wherein the second geofence is remote from the first geofence.

2. The system of claim 1, wherein the second area includes at least a portion of a medical office.

3. The system of claim 2, wherein the location information includes one or more of a GPS location, a preset physical device location associated with a MAC address, or a preset network location based on an IP address.

4. The system of claim 3, wherein the GUI module is configured such that when the device connects to the GUI module and is located within the first geofence, the medical provider user interface is automatically generated to have a hospital context dashboard having a patient rounding list and/or inpatient data associated with hospital inpatients at the hospital.

5. The system of claim 4, wherein the GUI module is configured such that when the device connects to the GUI module and is located within the second geofence, the medical provider user interface is automatically generated to have a remote context dashboard having a remote patient list and/or remote monitoring data associated with remote patients that are not at the hospital.

6. The system of claim 5, wherein the GUI module is configured to allow manual switching and/or navigation by the user between the hospital context dashboard and the remote context dashboard.

7. The system of claim 6, wherein the GUI module is configured to generate the medical provider user interface based on one or more of the role data, the shift data, and patient specific symptoms in addition to the location information.

8. The system of claim 1, wherein the GUI module is configured to populate and dynamically update the hospital context dashboard or the remote context dashboard with the patient specific symptoms such that displayed patient specific symptoms updates when a patient is admitted, overseen, transferred, discharged, or moved to remote monitoring.

9. The system of claim 8, wherein the GUI module is configured to provide priority based lists to a user based on the role data.

10. The system of claim 1, further comprising a role module configured to receive schedule information for each of the plurality of users, and to output the role data and the shift data to the care team module based on the schedule information.

11. The system of claim 10, further comprising a messaging module configured to send messages to each of the plurality of users based on the role data associated with each of the plurality of users.

12. The system of claim 11, wherein the messaging module is configured to receive at least one of an escalation response, forwarding response, or a delegation response from at least one of the plurality of users, and to forward the message to another one of the plurality of users based on the role data.

* * * * *